United States Patent
Cheruvu et al.

(10) Patent No.: US 12,153,722 B2
(45) Date of Patent: Nov. 26, 2024

(54) APPARATUS, SYSTEMS, AND METHODS TO PROTECT HARDWARE AND SOFTWARE

(71) Applicant: Intel Corporation, Santa Clara, CA (US)

(72) Inventors: Sunil Cheruvu, Tempe, AZ (US); Ria Cheruvu, Tempe, AZ (US); Kshitij Doshi, Tempe, AZ (US); Francesc Guim Bernat, Barcelona (ES); Ned Smith, Beaverton, OR (US); Anahit Tarkhanyan, Cupertino, CA (US)

( * ) Notice: Subject to any disclaimer, the term of this patent is extended or adjusted under 35 U.S.C. 154(b) by 700 days.

(21) Appl. No.: 17/132,748

(22) Filed: Dec. 23, 2020

(65) Prior Publication Data

US 2021/0117578 A1    Apr. 22, 2021

(51) Int. Cl.
G06F 21/85    (2013.01)
G06F 21/53    (2013.01)

(52) U.S. Cl.
CPC .............. G06F 21/85 (2013.01); G06F 21/53 (2013.01); G06F 2221/2149 (2013.01)

(58) Field of Classification Search
CPC .. G06F 21/85; G06F 21/53; G06F 2221/2149; G06F 30/32; G06F 21/14; G06F 21/31
See application file for complete search history.

(56) References Cited

U.S. PATENT DOCUMENTS 4,885,569 A    12/1989  Lellouche
8,860,197 B2   10/2014  Clark et al.
9,521,551 B2*  12/2016  Eisen ................... H04W 12/086
11,055,244 B1*  7/2021  Langner .............. G06F 13/4282
2008/0215862 A1*  9/2008  Haga ....................... G06F 21/14
                                                              712/E9.016
2014/0259125 A1*  9/2014  Smith ...................... G06F 21/57
                                                                    726/5
2019/0268317 A1   8/2019  Haelion
2020/0145220 A1*  5/2020  Chang ................. H04L 63/0861

OTHER PUBLICATIONS

England et al., "DICE: Device Identifier Composition Engine," Jan. 1, 2015 retrieved from https://www.microsoft.com/en-us/research/project/dice-device-identifier-composition-engine/, on Dec. 30, 2020, 8 pages.

(Continued)

*Primary Examiner* — Amie C. Lin
(74) *Attorney, Agent, or Firm* — Hanley, Flight & Zimmerman, LLC

(57) ABSTRACT

Methods, apparatus, systems, and articles of manufacture to protect proprietary functionality and/or other content in hardware and software are disclosed. An example computer apparatus includes; a first circuit including a first interface, the first circuit associated with a first domain; a second circuit including a second interface, the second circuit associated with a second domain; and a chip manager to generate a first authenticated interface for the first interface using a first token and to generate a second authenticated interface for the second interface using a second token to enable communication between the first authenticated interface and the second authenticated interface.

24 Claims, 30 Drawing Sheets

(56) References Cited

OTHER PUBLICATIONS

Chen et al., 2016. Shreds: Fine-grained execution units with private memory. In 2016 IEEE Symposium on Security and Privacy, 16 pages.
Hedayati et al., 2019. Hodor: Intra-process Isolation for High-throughput Data Plane Libraries. Proc. 2019 Usenix Annual Technical Conference (USENIX ATC '19), 16 pages.
Ching-Hsiang et al., Enforcing Least Privilege Memory Views for Multithreaded Applications Proc. 2016 ACM SIGSAC Conference on Computer and Communications Security (CCS '16), 13 pages.
European Patent Office, "Search Report," issued in connection with EP Application No. 21196602.3, Mar. 1, 2022, 9 pages.
European Patent Office, "Communication Under Rule 71(3) EPC—Intention to Grant," issued in connection with European Patent Application No. 21196602.3, dated Jul. 9, 2024, 120 pages.
European Patent Office, "Communication Under Rule 71(3) EPC," issued in connection with European Patent Application No. 21196602.3, dated Jul. 9, 2024, 120 pages.

* cited by examiner

APPARATUS, SYSTEMS, AND METHODS TO PROTECT HARDWARE AND SOFTWARE

FIELD OF THE DISCLOSURE

This disclosure relates generally to protecting hardware and software, and, more particularly, to apparatus, systems, and methods to protect hardware and software intellectual property.

BACKGROUND

Edge computing resources can be used to execute services and other applications on behalf of a variety of tenants. In certain circumstances different tenants can work together, such as in an Internet of Things (IoT) environment, to execute functions, analyze data, drive outcomes, etc. However, tenants often desire to or must maintain separability and confidentiality of at least some of their technology and/or information. In a shared environment, such as an edge-based IoT platform, separating one tenant's intellectual property from another tenant's intellectual property while engaging in joint execution can be impractical, if not impossible.

Figure 1:
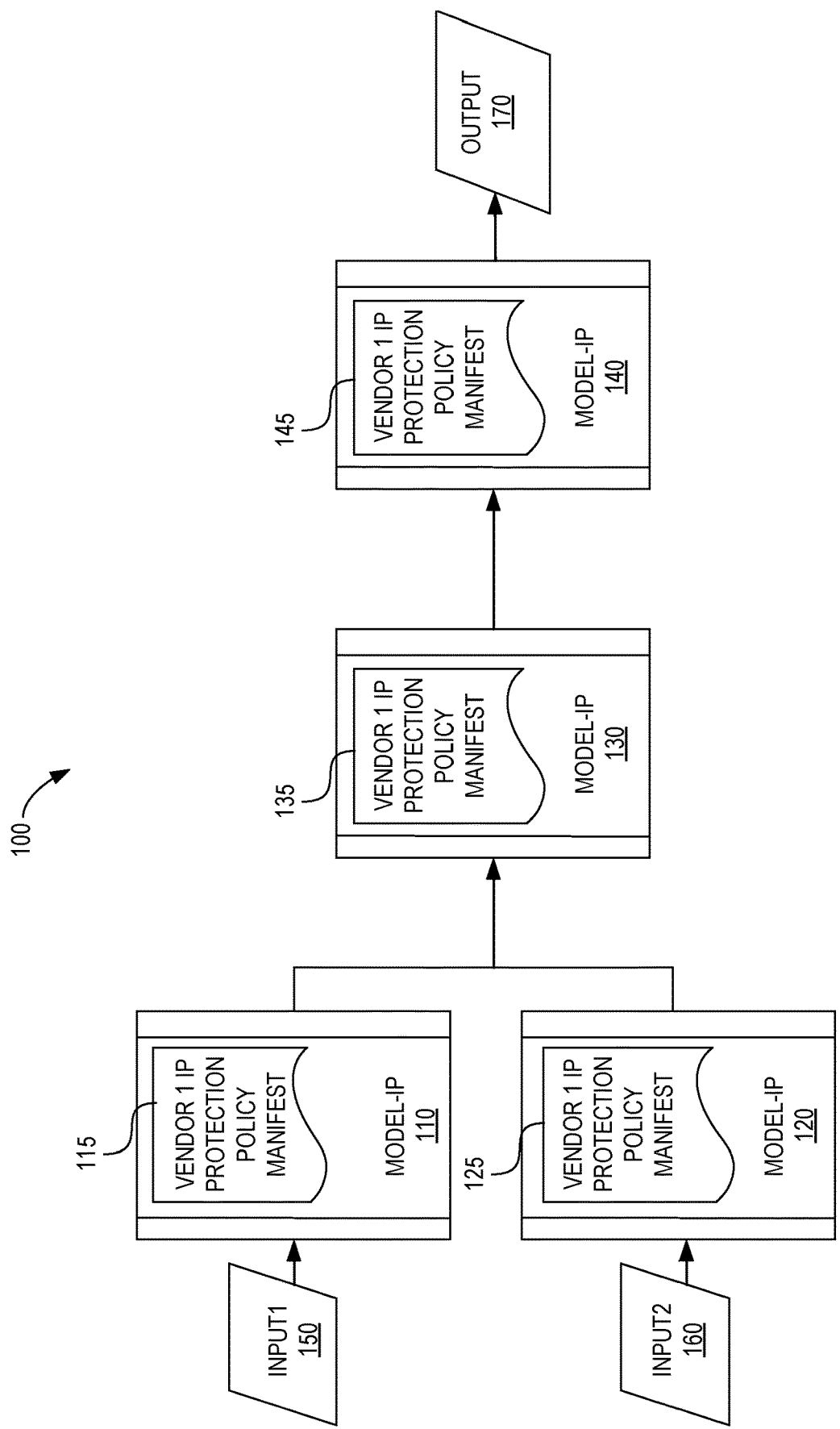
FIG. 1 is an example pipeline including a plurality of models representing or implementing proprietary content.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

DETAILED DESCRIPTION

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first"

may be used to refer to an element in the detailed description, while the same element may be referred to in a claim with a different descriptor such as "second" or "third." In such instances, it should be understood that such descriptors are used merely for ease of referencing multiple elements or components. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with Multi-access Edge Computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, satellite edge computing (e.g., edge nodes connected to the Internet via satellite), MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (e.g., devices, hosts, tenants, service providers, operators, etc.) are involved.

In a similar manner, Internet of Things (IoT) networks and devices are designed to offer a distributed compute arrangement from a variety of endpoints. IoT devices can be physical or virtualized objects that may communicate on a network, and can include sensors, actuators, and other input/output components, which may be used to collect data or perform actions in a real-world environment. For example, IoT devices can include low-powered endpoint devices that are embedded or attached to everyday things, such as buildings, vehicles, packages, etc., to provide an additional level of artificial sensory perception of those things. IoT devices have become more popular and thus applications using these devices have proliferated.

In some examples, an edge environment can include an enterprise edge in which communication with and/or communication within the enterprise edge can be facilitated via wireless and/or wired connectivity. The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to Edge, Fog, MEC, and IoT networks, devices, and services executing workloads on behalf of endpoint devices including establishing provenance to determine data integrity and/or data restrictions.

The present techniques and configurations may be utilized in connection with many aspects of current networking systems, but are provided with reference to Edge Cloud, IoT, MEC, and other distributed computing deployments. The following systems and techniques may be implemented in, or augment, a variety of distributed, virtualized, or managed edge computing systems. These include environments in which network services are implemented or managed using MEC, fourth generation (4G) or fifth generation (5G) wireless network configurations; or in wired network configurations involving fiber, copper, and/or other connections. Further, aspects of processing by the respective computing components may involve computational elements which are in geographical proximity of user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Edge computing is a developing paradigm where computing is performed at or closer to the "edge" of a network, typically through the use of a computing platform implemented at base stations, gateways, network routers, or other devices which are much closer to end point devices producing and consuming the data. For example, edge gateway servers may be equipped with pools of memory and storage resources (e.g., memory circuitry) to perform computations in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with computing hardware that performs virtualized network functions and offers compute resources for the execution of services and consumer functions for connected devices.

Edge environments include networks and/or portions of networks that are located between a cloud environment and an endpoint environment. Edge environments enable computations of workloads at edges of a network. For example, an endpoint device (e.g., a user device) may request a nearby base station to compute a workload rather than a central server in a cloud environment. Edge environments include edge services (e.g., an edge platform for hire (EPH)), which include pools of memory, storage resources, and processing resources. In some examples, edge environments may include an edge as a service (EaaS), which may include one or more edge services. Edge services perform computations, such as an execution of a workload, on behalf of other edge services, edge nodes (e.g., EPH nodes), endpoint devices, etc. Edge environments facilitate connections between producers (e.g., workload executors, edge services) and consumers (e.g., other edge services, endpoint devices).

Because edge services may be closer in proximity to endpoint devices than centralized servers in cloud environments, edge services enable computations of workloads with a lower latency (e.g., response time) than cloud environments. Edge services may also enable a localized execution of a workload based on geographic locations or network topographies. For example, an endpoint device may require a workload to be executed in a first geographic area, but a centralized server may be located in a second geographic area. The endpoint device can request a workload execution by an edge service located in the first geographic area to comply with corporate or regulatory restrictions.

Examples of workloads to be executed in an edge environment (e.g., via an EaaS, via an edge service, on an EPH node, etc.) include autonomous driving computations, video surveillance monitoring, machine learning model executions, and real time data analytics. Additional examples of workloads include delivering and/or encoding media streams, measuring advertisement impression rates, object detection in media streams, speech analytics, asset and/or inventory management, and augmented reality processing.

In some examples, edge services enable both the execution of workloads and a return of a result of an executed workload to endpoint devices with a response time lower than the response time of a server in a cloud environment. For example, if an edge service is located closer to an endpoint device on a network than a cloud server, the edge service may respond to workload execution requests from the endpoint device faster than the cloud server. An endpoint device may request an execution of a time-constrained workload from an edge service rather than a cloud server.

In addition, edge services enable the distribution and decentralization of workload executions. For example, an endpoint device may request a first workload execution and a second workload execution. In some examples, a cloud server may respond to both workload execution requests. With an edge environment, however, a first edge service may execute the first workload execution request, and a second edge service may execute the second workload execution request.

Additional infrastructure may be included in an edge environment to facilitate the execution of workloads on behalf of endpoint devices. For example, an orchestrator may access a request to execute a workload from an endpoint device and provide offers to a plurality of edge nodes. The offers may include a description of the workload to be executed and terms regarding energy and resource constraints. An edge node (e.g., an EPH node) may accept the offer, execute the workload, and provide a result of the execution to infrastructure in the edge environment and/or to the endpoint device.

Delivery of services in an Edge as a Service (EaaS) ecosystem (e.g., in an edge environment, via an EPH, via an edge infrastructure element, etc.) may include a business model where subscribers to the EaaS service (e.g., endpoint devices, user devices, etc.) pay for access to edge services. In some examples, the endpoint devices may pay for edge services (such as an execution of a workload) via micropayments, credits, tokens, e-currencies, etc. In some examples, revenue models may include mobile network operators (MNOs) that maintain subscriptions from a subscriber base (such as one or more networks) as a way to pay for edge services by entering into service-level agreement (SLA) contracts. An SLA can include one or more service level objectives (SLOs), for example. An SLO can include a metric such as uptime, response time, etc. In certain examples, SLA correspond to resources used to achieve a type of SLO. For example, SLA specifies a number of cores, memory bandwidth, etc., to achieve an SLO of 30 frames per second of an artificial intelligence model, etc. Accounting executed and/or managed by the MNO may determine billable services that are then applied to subscriber accounts.

In certain examples, a single resource or entity can negotiate and manage multiple SLA in an edge environment while managing its resources using one or more SLOs. A SLO is based in an edge cloud environment, for example. The SLO can be instantiated inside a service. The SLA is instantiated within an associated resource. Multiple SLA may compete for particular resources. In certain examples, SLAs can be grouped with an associated level of trust. Grouping of SLAs can be dynamic, based on requirement, trust, user/device type, etc. A group key can be associated with the SLAs, for example. In certain examples, different tenants, entities, resources, and/or other actors can work together to drive one or more SLOs, SLAs, etc.

As such, edge and IoT architectures may heavily rely on pipelines including blocks of circuitry and/or instructions that represent proprietary content or intellectual property (IP). Such IP blocks can be incorporated into design of circuitry (e.g., hardware, firmware, etc.) such as an application specific integrated circuit (ASIC), field programmable gate array (FPGA), etc., that runs in an accelerator (e.g. a graphics processing unit (GPU), neuromorphic computer, co-processor, Trusted Execution Environment (TEE), etc.), for example. Certain examples provide a connection between disparate sets of IP blocks running on the same platform and/or across different platforms (e.g., including peer to peer links between accelerators). In certain examples, a supply chain of can include integration of a plurality of such connections among IP blocks that are sourced as chiplets, systems on a chip (SoCs), line cards, etc., originating from different suppliers (e.g., original design manufacturer (ODM), original equipment manufacturer (OEM), original component manufacturer (OCM), etc.). A solution provider supply chain entity may further integrate into a platform, motherboard, SoC, etc. In this variety of configurations, trust relationships between suppliers can vary. As such, IP in blocks shared among different providers should be protected throughout a lifecycle of the associated chiplets, SoCs, line cards, etc.

The rapid growth of edge computing and associated IoT technology presents a challenge and an opportunity for trusted integration and/or interconnection of proprietary technologies, instructions, and/or data. Problems can be further complicated at the edge of the network, where the computing infrastructure is heterogeneous, different systems are maintained in different locations and subject to different failure profiles, timing anomalies are more likely due to non-uniform communication and non-localized placements, and other obfuscating factors, such as power-constrained and bandwidth-constrained distribution of tasks, exist. Adding to these complications is the problem that different edge locations can belong to different trust boundaries. As such, a chain of actions that spans different microservices in loosely-coupled interactions can also be transparent, semi-transparent, or opaque with respect to execution of software, for example. As used herein, the terms "microservice, "service", "task", "operation", and "function" can be used interchangeably to indicate an application, a process, and/or other software code (also referred to as program code) for execution using computing infrastructure, such as an edge computing and/or other IoT environment.

Examples disclosed herein provide separation of proprietary functional blocks in an interconnected platform. Certain examples provide an integrator to enable an interaction by which domain-to-domain scrambling of communication interfaces between circuitry or processor elements such as chiplets, IP Blocks, SoCs, multi-chip packages (MCPs), etc., is negotiated between each pair of interfaces that cross vendor or IP owner domains. Each domain (e.g., each proprietary or IP contributor) effectively controls exposure of its proprietary IP, which controls its own scrambling. For example, at different stages of an SoC lifecycle (e.g., development-and-testing stage, use in production environments, and controlled decommission points), a salt value used by the domain prevents other actors on the platform from replaying a proprietary instruction or value that was used at other points in the SoC lifecycle. As such, separation or selectively enabled interaction between elements can be used to enable input/output isolation from a virtual machine manager, encrypted images, protection of platform input/output links, etc.

Certain examples enable deployment of artificial intelligence (AI) models such as machine learning (ML) models, deep learning (DL) models, etc., without risking the loss or unauthorized disclosure of proprietary content or IP within the model. As such, benefits provided by interaction among multiple proprietary models can be gained without exposing proprietary content to unauthorized entities in the platform (or between platforms), for example.

While examples described and disclosed herein are applicable to a variety of processing platforms, circuits, computing architectures, etc., certain examples are described in the context of example SoCs formed of a plurality of chiplets. As used herein, a chiplet is a modular integrated circuit block that has been designed to perform certain function(s) and work with other chiplets to form a larger chip or circuit. For example, rather than an SoC implemented as a monolithic chip with all functionalities designed on a single piece of silicon with a single process node size, a chiplet architecture for the SoC includes chip functionalities divided into physically discrete pieces interconnected via a substrate. The separation of circuitry or chiplets allows varying node sizes to be used, which can allow different functions to be optimized separately in separate chiplets. Further, IP blocks can be swapped or adjusted in a chiplet architecture to allow an existing functional block to be adjusted to serve a new purpose, for example.

FIG. 1 is an example pipeline 100 including a plurality of AI models 110-140 representing or implementing proprietary IP. As shown in the example of FIG. 1, some of the example models 110-120 execute in parallel and some of the example models 130-140 execute in series. As such, the example model 110 receives an input 150, and the example model 120 receives an input 160. An output from both models 110, 120 provides an input to the example model 130, and an output from the example model 130 provides an input to the example model 140. An output 170 of the example model 140 can be used by other elements of a system such as an SoC, edge device, chiplet, etc. One or more control signals can be exchanged among the example models 110-140 of the example pipeline 100 of FIG. 1.

Proprietary content in the models 110-140 can be protected from intrusion, theft, exposure, etc., using a policy manifest 115-145 associated with each respect model 110-140. The policy manifest 115-145 specifies permissible and impermissible actions, exchanges, masks, attestation rules, etc., to protect vendor IP found in the model 110-140, for example. The policy manifest 115-145 can include rules governing different stages of a model's lifecycle (e.g., storage, execution, retirement, etc.). The example manifest 115-145 can include metadata (e.g., token, etc.) identifying one or more models 110-140 and specifying what is made available by a given model 110-140 for one or more other models 110-140. Attestation rules can specify who and how the model 110-140 can authenticate/verify other entities to access to certain aspects of the model 110-140, for example. In certain examples, the manifest 115-145 can be used to define an application programming interface (API) to govern interaction between associated models 110-140 to retrieve an input, provide an output, etc.

In certain examples, the example pipeline 100 can be implemented in a supply chain ecosystem. Model(s) 110-140 can come from different vendors, and vendors may impose liabilities on unauthorized use of their respective model(s) 110-140, including monetary liability, criminal liability, etc., that can fall on end customers/users, for example. While exposure or interconnection between models 110-140 provides integration to drive useful output 170, a level of trust may not exist to enable full transparency or sharing of model 110-140 content.

Figure 2:
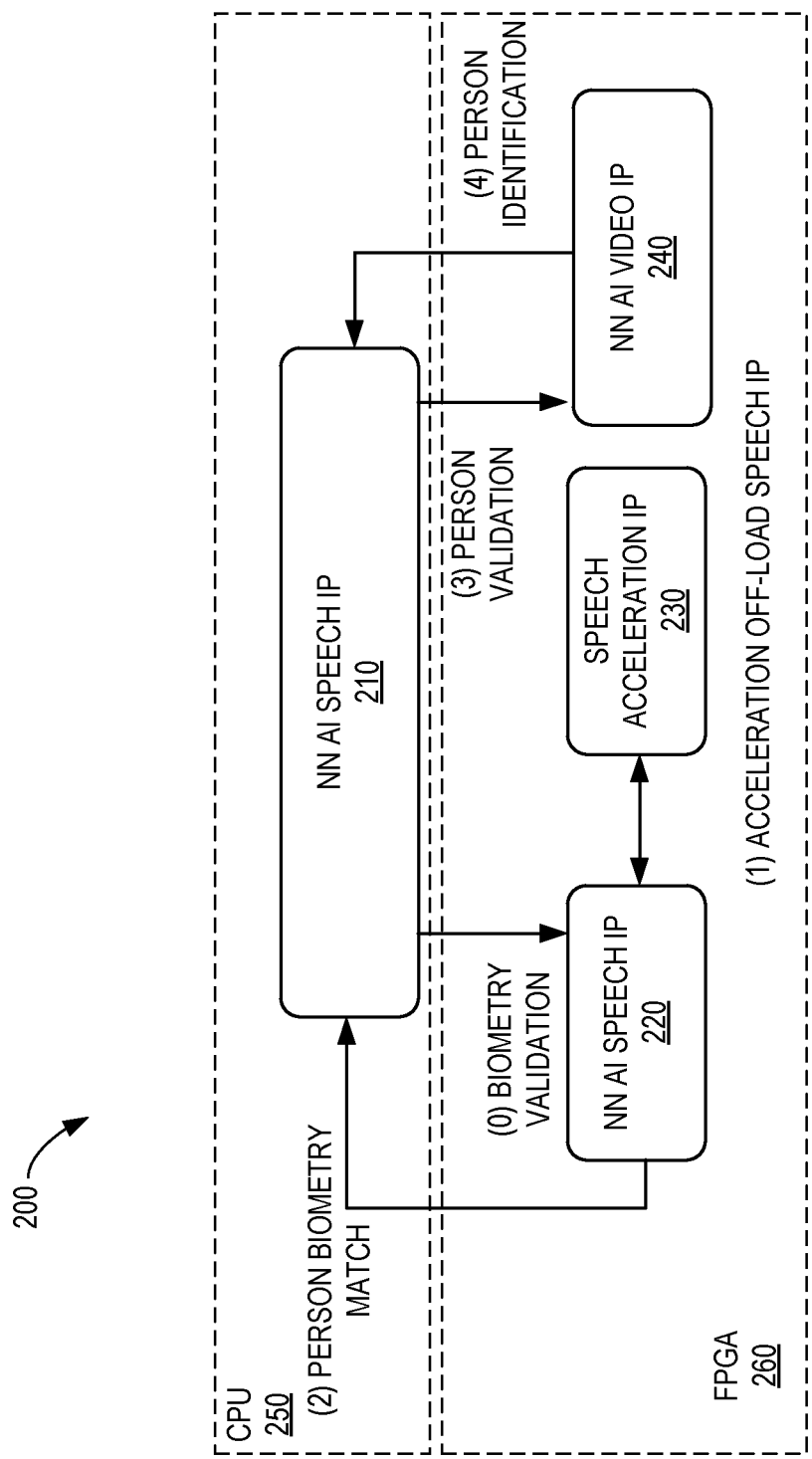
FIG. 2 illustrates an example architecture integrating proprietary models and content from a plurality of sources.

FIG. 2 illustrates an example architecture 200 integrating proprietary models and content from a plurality of sources. As shown in the example of FIG. 2, a plurality of AI models 210-240 are integrated to process speech and identify the speaker. As shown in the example of FIG. 2, a first speech neural network model 210 provides biometry validation (0) to a second speech neural network model 220, which matches personal biometry (2) with the first model 210 and off-loads speech information (1) to a speech accelerator 230. The speech accelerator 230 provides feedback to the second model 220 to aid in the validation and matching. The first model 210 also interacts with a video neural network model 240 to validate (3) and identify (4) a person associated with the speech.

In the example of FIG. 2, the first model 210 and the second model 220 are provided by Provider A, while the speech accelerator 230 is provided by Provider B. In the example of FIG. 2, the video model 240 is provided by Provider C. As such, proprietary information from Provider A is included in the models 210, 220. Proprietary information from Provider B is included in the speech accelerator 230. Proprietary information from Provider C is included in the video model 240. Further, as shown in the example of FIG. 2, the first model 210 can be implemented using a processor 250, such as a central processing unit (CPU), GPU, etc. The example second model 220, speech accelerator 230, and video neural network model 240 can be implemented on a separate chip such as an FPGA 260, etc. The CPU 250 forms a first domain, and the FPGA 260 forms a second domain, for example. Using the combination of models 210-240 and processing circuitry 250-260, the example architecture 200 can be used to limit trust, operate at a reduced level of trust, etc., and still provide integrated services across both the first domain of the CPU 250 and the second domain of the FPGA 260 via a cloud service provider (CSP), communications service provider (CoSP), etc. Rules and/or other interface specification stored by and/or with each model 210-240 can be used to govern interaction between models 210-240, between domains 250-260, etc.

In such an environment, multiple providers A, B, and C provide models 210-240 that cannot be isolated from one another and still perform the function(s) of the example architecture 200. However, competitor providers may be motivated to try to reverse engineer another provider's IP provided in the model 210-240. An analysis of system bus traffic, etc., can enable a provider to gain insight about another provider's IP, for example.

Circuit production (e.g., SoC production, etc.) involves coordinated testing and debugging, quality assurance and efficient communication such as timing critical signals exchanged among different logic modules from different parties with least added latency and/or vulnerability to side-channel analysis. However, firewalling chiplets from each other and/or encrypting signals between them is neither desirable nor practical. To address these limitations, certain examples provide anti-transparency measures that do not interfere with coordinated manufacturing and testing/debugging, combined with secure methods for decommissioning of chips, chiplets, and/or other circuitry.

In certain examples, domain-to-domain scrambling of communication interfaces, such as between chiplets, IP blocks or models, SoCs, MCPs (e.g., logical signals), etc., is negotiated between pairs of interfaces that cross vendor domains. For example, each domain (e.g., each IP vendor, etc.) controls exposure of proprietary information within its model(s) using a value (e.g., a key, a random number, a salt value, other content, etc.) to scramble, encrypt, or obfuscate the proprietary information of the model. For example, at different stages of a circuit's lifecycle, such as a development-and-testing stage, a production environment usage stage, and a controlled decommission stage, a salt value and/or other seed used by the domain prevents other parties from accessing or revealing proprietary content that was used at other points in the lifecycle. As such, proprietary content can be leveraged through one or more models through a platform's lifecycle without risking loss or unauthorized disclosure of the proprietary content.

Traditional data flow channel protection (e.g., encrypt-decrypt) is not desirable or effective, as tighter co-operation between parties in a supply chain involves trust when communicating values. Therefore, parties should be able to trust each other to a limited degree, while being able to prevent an abuse of trust that can occur from subverting a shared substrate during circuit testing and debugging. In other words, it should be possible to change rules governing communication at different stages of a lifecycle so that reverse engineering is made prohibitively cumbersome for key trade/design secrets. Certain examples provide adaptive security control through stages of a circuit or processing platform lifecycle.

Often, supply chain AI model components, trained from data, appear as black boxes to other components in a system. When inputs are presented to such a model, the target model is unlikely to detect that it is being gamed or attacked (e.g., using day zero attacks, improperly trained models, etc.) into revealing proprietary content in a contrived test scenario. Certain examples rely on a salt value or other seed to regulate access to proprietary content and/or functionality in a model. Certain examples enable regulated access across a circuit lifecycle and under evolving conditions (e.g., changing interconnection and/or communication between domains/circuit elements, enabled/disabled network AI models, etc.). The regulated access provides protection without sacrificing performance delivery or circuit efficiency, for example.

Figures 3A, 3B:
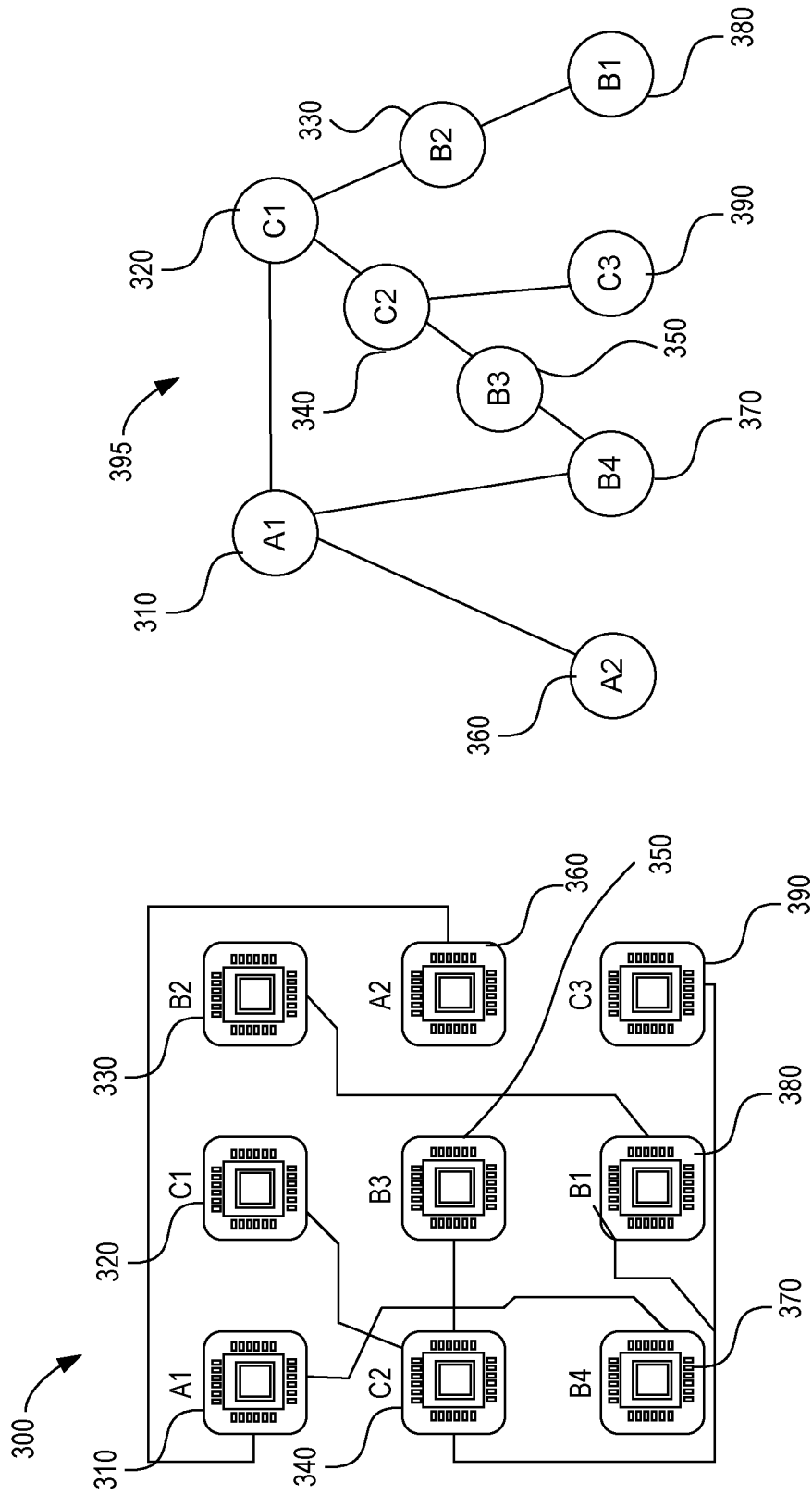
FIG. 3A shows an example system on a chip circuit including a plurality of chiplets provided by a plurality of vendors.
FIG. 3B depicts an example graph showing data and signal interconnections among the chiplets of the example of FIG. 3A.
Figure 4A:
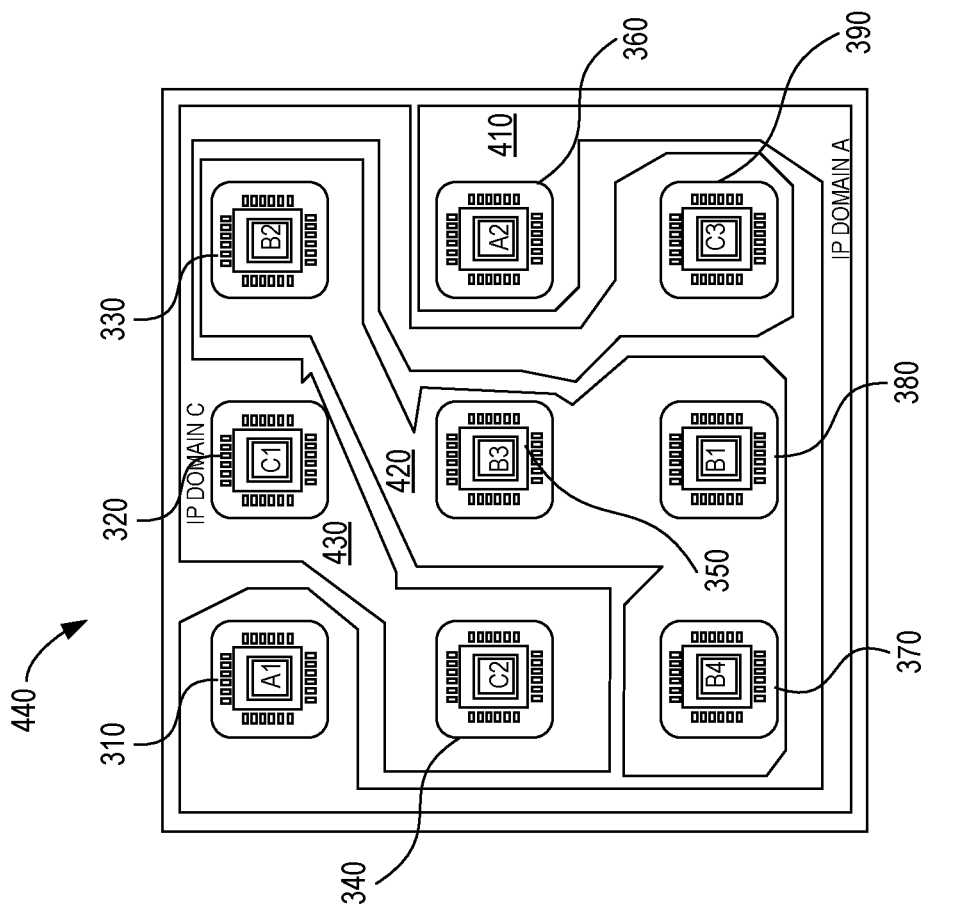
FIG. 4A shows the example system of FIG. 3A divided into separate domains based on vendor.
Figure 4B:
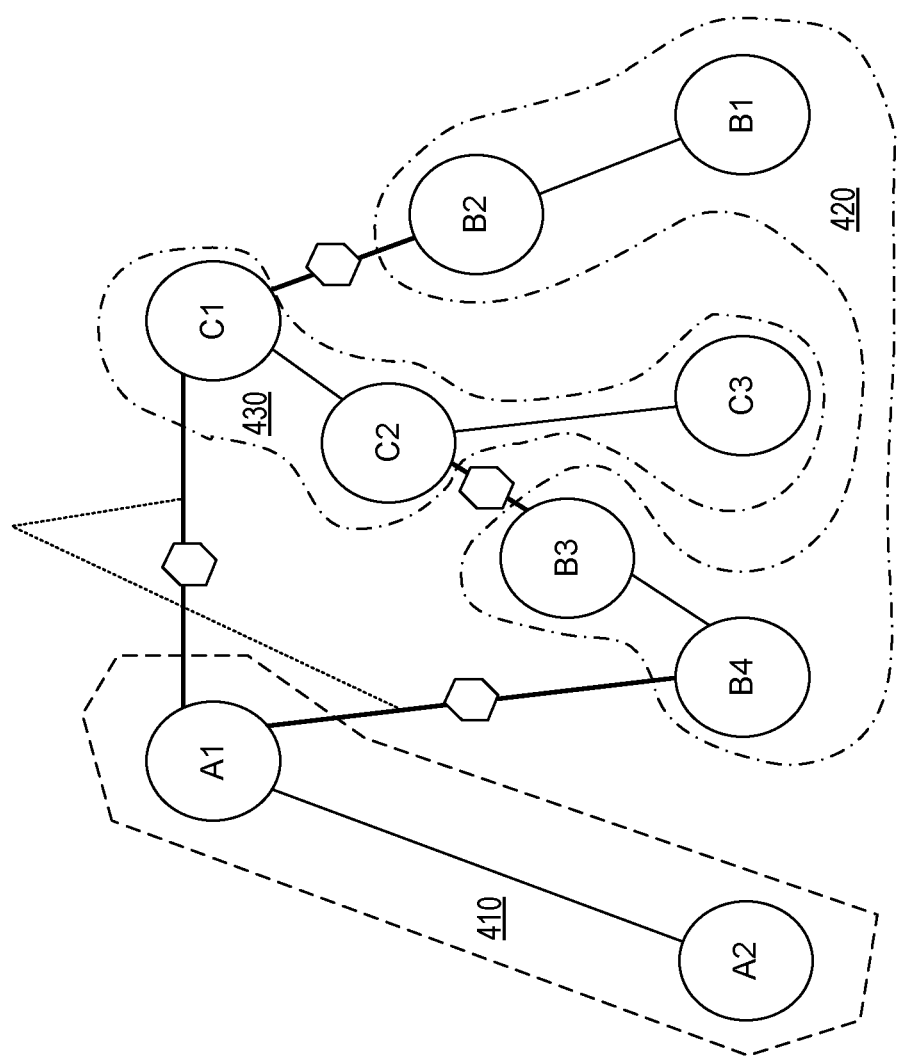
FIG. 4B illustrates example signal flows within a same domain and between domains of the example system of FIG. 3A.

FIG. 3A shows an example SoC 300 including a plurality of chiplets 310-390 provided by vendors A, B, and C. The chiplets 310-390 may be interconnected according to signal flows as shown in the example of FIG. 3A. FIG. 3B depicts an example graph 395 showing data and signal interconnections among the chiplets 310-390. FIGS. 4A-4B illustrate example signal flows within a same domain and between domains. For example, signal interconnection between ports of chiplets 310 and 370, between ports of chiplets 340 and 350, etc., occur across domains, and such signals are not easily interpretable or scrutinizable by either party because the signals cross domains. Signal interconnection occurring within a same domain (e.g., between ports of chiplets 310 and 360, between ports of chiplets 350 and 370, etc.) are more easily interpretable because they are within the same domain. Such intra-domain signal interconnect can be processed so that chiplets 310 and 360, for example, can be optimized to appear as two inseparable logical entities that are inlined without connecting ports, for example. No such optimization or inlining can be provided between domains.

As shown in the example of FIG. 4A, the example chiplets 310-390 are divided into different domains 410-430 based on which vendor A, B, or C provided the chiplet 310-390. The example of FIG. 4B represents the domains 410-430 according to inter-domain traces. Operations within a domain 410-430 (intra-domain operations) have different access rules and relationships than operations between domains 410-430 (inter-domain operations), for example. While the vendors A, B, and/or C may not trust each other, the vendor domains 410-430 trust a platform (e.g., an SoC, etc.,) 440 on which the chiplets 310-390 are implemented. The platform 440 can encode-decode signals flow between the chiplets 310-390, for example.

In certain examples, physical protections can be integrated into the platform 440 to mitigate physical attacks (e.g., through encapsulation, counter-measures in packaging layers, tamper detection and response measures (e.g., thermite charges, erasure of secrets, etc.), etc.). Such physical protections can be combined with software and/or AI model interface protection as disclosed herein. Using this combination of protections, compromised equipment such as test interfaces, remanufacturing protocols, manufacturing line testers, validation, remanufacturing, etc., can be protected from intrusion, abuse, and theft of confidential information, for example.

Security and protection can be provided in various forms at various stages in the lifecycle of a computing platform (e.g., an SoC, accelerator, FPGA, other processor, etc.). For example, a code or token can be used to determine a level of access to proprietary information in a model or circuit by another model or circuit. Alternatively or additionally, dynamic linkage can enable exchange of instructions, data, signals, etc., between elements without insight into details of structure or content of the respective elements. Circuits and/or models can be further hardened against intrusion by encryption, physical tamper-resistance, etc.

Certain examples provide a manager to integrate a plurality of circuits (e.g., chiplets, ASICs, FPGAs, etc.) across a plurality of domains into a processing platform (e.g., an SOC, etc.). The example manager facilitates communication between circuits across domains while obscuring or preventing transparency across domains to a model (e.g., a chiplet-based IP block, etc.). Such anti-transparency thwarts reverse engineering and safeguards IP in the model, for example. By introducing an isolation layer between entities, illegitimate probing actions disguised as test actions, etc., can be defeated, for example.

In certain examples, to establish trust, the example manager communicates with other platform circuits (e.g., chiplets, etc.) that are configured to include root of trust capabilities. In certain examples, the manager can interact with the manifests 115-145 of models 110-140, such as shown in the example of FIG. 1, to regulate access to functionality, content, etc. The manifest 115-145 can include a root of trust (RoT) for the respective model 110-140.

For example, an IoT root of trust (e.g., a device identifier composition engine (DICE) root of trust, etc.) is a set of functions in a trusted computing module that are trusted by the manager, circuits, and operating system of the example computing platform. The root of trust can be built into or otherwise included in chiplets and/or other circuitry through including of a trust anchor at manufacture, for example. When the circuits are incorporated into a platform (e.g., when chiplets are placed in an SoC package, etc.), authentication token values are negotiated. The authentication token values are used to (logically) scramble interface pins to prevent access by another circuit to details internal to the respective circuit or model behind the interface pin(s), for example. However, the chip manager can corrected decode an interface by applying an authentication token ($\mathcal{AT}^{[0]}$). For example, for a given interface $I$ =pins ($p_0, p_1, \ldots, p_\mathcal{N}$), an authenticated interface ($\mathcal{AI}^{[0]}$) can be determined using a one way function (OWF) as follows:

$$\mathcal{AI}^{[0]} = \text{OWF}(\mathcal{AT}^{[0]}, I^{[0]}) \quad \text{(Equation 1)}.$$

Using Equation 1, once a pin in the interface I has been logically mapped to a pin in the authenticated interface $\mathcal{AI}^{[0]}$, the mapped pin is removed for subsequent mappings such that no passthrough mappings are permitted. That is, for each x, the OWF maps x to a pin in the interface I to which no other x has been mapped. Further, the OWF does not map pin x to itself (e.g., for no x in $I$, the OWF is passthrough).

In certain examples, a circuit can be configured to exhibit a larger number of possible pins in $I$ and in $\mathcal{AI}^{[0]}$ than are actually required by the logic in that element. As such, the true pin count can be masked behind an artificially enlarged $\mathcal{N}$.

Alternatively or additionally, a circuit (e.g., a chiplet, FPGA, SoC, other processor, etc.) can negotiate an $\mathcal{AT}^{[1]}$ that is specific to the circuit to drive interfaces and interactions for that circuit. Similarly, other pairwise interactions can have associated authentication tokens. For example, pairwise interactions can be associated with authentication tokens $\mathcal{AT}^{[2]}, \ldots, \mathcal{AT}^{[M]}$ for M different domain-domain interactions. In comparison with these authentication tokens, if an attack tester were successful in programming attack logic on a peer circuit (e.g., chiplet, etc.) during manufacturing, the attack logic would result in a different DICE $\mathcal{AT}$ value than that of the authentication token, for example.

Further, a manager can broker issuance of authentication tokens to help ensure a policy in which trusted vendors are allowed to occupy space in a circuit platform or package (e.g., an SoC package, etc.) without anticipating all possible allowable components (e.g., all allowable SoC package chiplets, etc.). After being deployed, a circuit (e.g., an SoC, etc.) can isolate or insulate itself from possible attack by adding a random or seed value, such as a salt value, to the authentication token $\mathcal{AT}^*$ computation. For example, a salt value can be supplied by a customer that takes ownership of the SoC after manufacturing. The authentication token(s) can then be calculated as follows:

$$\mathcal{AI}^{[\cdot]} = \text{OWF}(\mathcal{AT}^{[\cdot]}, \text{salt}, \text{pins}) | (p_0 \to \mathcal{AI}^{[\cdot]}(0),$$
$$p_1 \to \mathcal{AI}^{[\cdot]}(1), \ldots, p_\mathcal{N} \to \mathcal{AI}^{[\cdot]}(\mathcal{N})) \quad \text{(Equation 2)},$$

where the superscript [ . . . ] refers to different post-shipment authenticated interfaces and authentication tokens. Thus, previously obtained authentication tokens ($\mathcal{AT}$ s) generated during testing and validation of the circuit become useless when an attacker tries to use them with the deployed, post-shipment circuit device. As such, an effective $\mathcal{AT}$ that produces the correct authenticated interface is a combination of an adjusted $\mathcal{AT}$ and the salt value supplied by the customer or other end user.

By enabling generation of a customized $\mathcal{AT}$ with the salt and/or other random seed value, a customer or user can reset the circuit to a manufacturing default state before returning the circuit to a manufacturer or vendor for re-manufacture. In the default state, tests or operations (e.g., Joint Test Access Group (JTAG) operations, etc.) that are not permitted in a deployment state or mode. Additionally, a salt or seed value can be domain-specific such that only domains that share the salt correctly are able to generate correct $\mathcal{AT}$ values, for example.

In certain examples, a sequence of salt values may be applied to capture an expected flow of AI models and/or associated circuits through a supply chain. For example, if a first vendor in domain A generates a first salt (s0) and a second vendor generates a second salt (s1), a sequence in which the domain A qualifies the circuits and/or models can produce a unique salt value. For example, a domain-specific salt value ($S_{DA}$) can be calculated as follows:

$$\text{Domain-}A \text{ Salt: } S_{DA} = \text{OWF}(s0, s1, \ldots, sn) \quad \text{(Equation 3)}.$$

The Domain-A salt value $S_{DA}$ can be shared with a manager and/or other circuits (e.g., chiplets, etc.) such that control and validation of Domain A circuitry can occur exclusive to Domain A, even the overall processor platform or circuitry (e.g., an SoC, etc.) includes circuits or blocks (e.g., chiplets, etc.) from other domains. A production salt ($S_P$) that combines domains can further be computed as follows:

$$\text{Production Salt: } S_P = \text{OWF}(S_{DA}, S_{DB}, \ldots, S_{Dn}) \quad \text{(Equation 4)}.$$

A customer specific, production level authenticated interface can be determined by computing an appropriate salt value such as follows:

$$\text{Customer Salt: } S_C = \text{OWF}(s_C, S_P) \quad \text{(Equation 5)}.$$

An attacker must then recreate all of the salt values to successfully descramble the interface. For this to occur implies that the attacker is able to infiltrate every layer of a supply chain. Alternatively, the attacker can try to reverse engineer the scrambled interfaces. However, reverse engineering can be detected by sampling the interface behavior and matching samples to expected interface patterns. As such, attempted intrusion and/or other interference can be detected.

Figure 5:
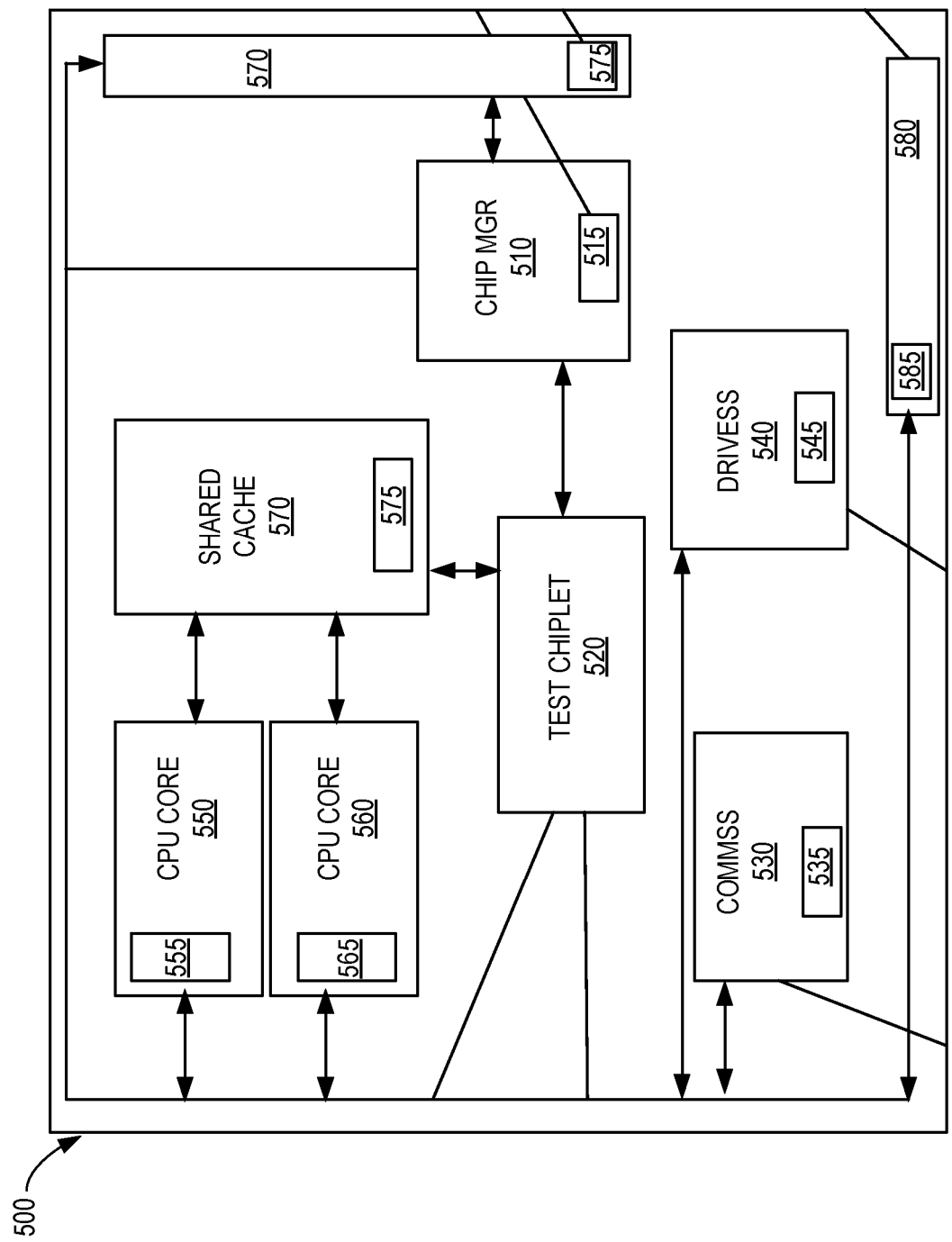
FIG. 5 is an example multi-chiplet system on a chip in which security policies and techniques described herein can be implemented.

FIG. 5 is an example multi-chiplet SoC 500 including a plurality of chiplets 510-560 configured to perform various functions for the SoC 500. For example, as shown in the example of FIG. 5, the set of chiplets 510-570 can include a chip manager 510, a test chiplet 520, a communication subsystem 530, an autonomous drive controller subsystem 540, one or more processor cores 550-560, a shared cache 570, etc. The example chiplets 510, 530, 540, 550, 560, 570 include interfaces 515, 535, 545, 555, 565 to enable communication within the SoC 500. The example SoC 500 also includes external interfaces 580, 590 to communicate with circuitry outside the SoC 500 (e.g., off-SoC logic, etc.). The external interfaces 580, 590 communicate within the SoC 500 using internal interfaces 585, 595, for example.

The example chip manager 510 provides primary control for primary-secondary interactions with the other chiplets 520-570, for example. The example test chiplet 520 implements a plurality of validation workloads to test the elements 530-590 of the SoC 500. The example chip manager 510 and the example test chiplet 520 can be used to prevent attack staging. As such, the chip manager 510 and the test chiplet 520 are to be trusted by the communication subsystem chiplet 530, the autonomous drive controller subsystem chiplet 540, the processor core(s) 550-560, etc. Upon deployment, the test chiplet 520 may be disabled, for example. The test chiplet 520 may be inhibited from inducing certain stimulus-response patterns that are not allowed after testing and upon deployment, for example. The chiplets 530-570, alone or in conjunction with the chip manager 510 and/or the test chiplet 520, can compute the authenticated tokens, In certain examples, the chip manager 510 can manage or help individual chiplets 530-570 manage access across domains established within the example SoC 500. The example chip manager 510 negotiates authentication token values with the chiplets 530-570, and, as described above, the $\mathcal{AT}$ values can then be used to logically scramble chiplet interface pins and regulate access to chiplet 530-570 functions. The example chip manager 510 can decode interfaces 515-595 by applying the $\mathcal{AT}$ such as described above with respect to Equation 1. In certain examples, the chip manager 510 can broker issuance of authentication tokens to help ensure that trusted chiplets occupy space in the SoC package 500. The example test chiplet 520 can also negotiate $\mathcal{AT}s$ specific to the test chiplet 520 for interaction with the interfaces 515-595 of the SoC platform 500.

In certain examples, the chiplets 530-570 can introduce a salt and/or other seed value to customize $\mathcal{AI}^{[0]}$, such as described above with respect to Equations 2-5. Thus, after testing, the SoC 500 can disable the test chiplet 520, and new values can be generated such that the prior $\mathcal{AT}$ values negotiated with the test chiplet 520 no longer provide access to the example interfaces 515-595 of the SoC 500. The chip manager 510 can interact with the chiplets 530-570 and interfaces 580-590 to communicate with the interfaces 535-595 according to the updated, customized $\mathcal{AI}^{[0]}$.

Figure 6:
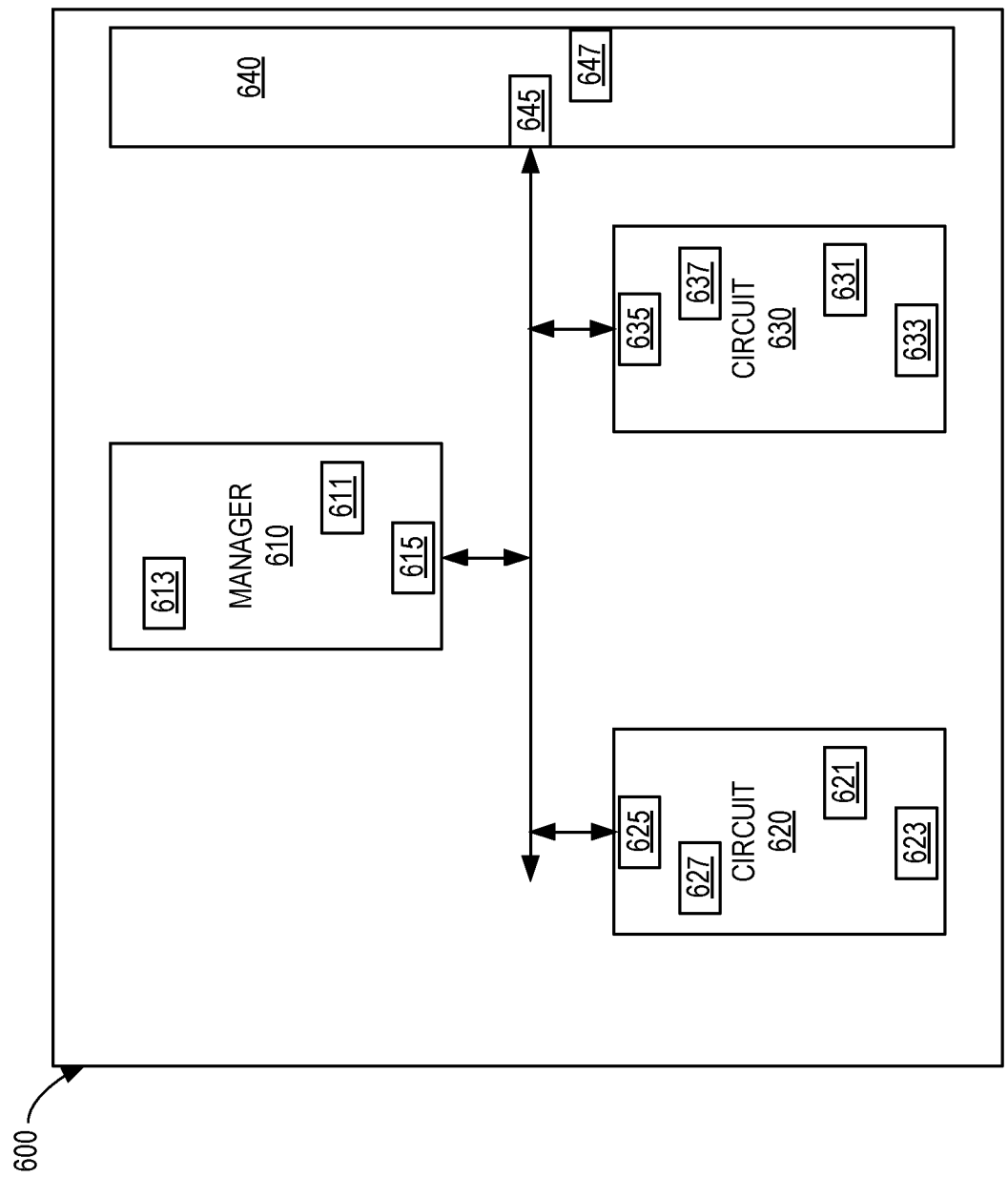
FIG. 6 is an example computing apparatus in which security policies and techniques described herein can be implemented.

While FIG. 5 illustrates a particular SoC 500 example implementation, the $\mathcal{AT}$ and $\mathcal{AI}^{[0]}$ interface encoding and security examples using tokens described above can be reflected in an example computing or processing apparatus 600 shown in the example of FIG. 6. The example computing apparatus 600 of FIG. 6 includes an example manager 610, example circuits 620-630, and an example communication interface 640. The example manager 610 includes an example processor 611, an example memory 613 (also referred to as memory circuitry), and an example interface 615. The example circuits 620-630 include an example processor 621-631, an example memory 623-633, and an example interface 625-635 for communication with each other and with the manager 610. The example communication interface 640 includes an internal communication interface 645 to communicate with the example manager 610 and circuits 620-630 within the computing apparatus 600 and an external communication interface 647 to communicate with circuits and other elements outside the example computing apparatus 600.

The example circuits 620-630 further include example models 627-637 representing AI models and/or other proprietary content, functionality, etc., of the example circuit 620-630. The example models 627-637 can be stored in the example memory 623-633 and/or be implemented using the example processor 621-631, for example. The example models 627-637 are accessed via the respective interface 625-635 of the example circuit 620-630 (e.g., using authenticated tokens, via an authenticated interface, etc.). As such, circuits 620-630 in different domains (e.g., from different suppliers, vendors, sources, etc.) can negotiate (e.g., directly or through the example manager 610) communication through their interfaces 625-635 to leverage the capabilities of the respective circuits 620-630 to execute and/or otherwise instantiate computing functions in the computing apparatus 300 while protecting proprietary content from being revealed.

In certain examples, model parameters, which reflect proprietary content/information, are to be protected from disclosure as well. Even with attested interfaces between domains inhibiting exchange of sensitive IP, if the model parameters have to be fine-tuned in the field, or wire-updated or over-the-air updated into the SoC 500 and/or other computing apparatus 600, such an opportunity update provides a potential attack surface to be protected. Even if communication up to the SoC 500 and/or other computing apparatus 600 is encrypted, it is desirable that on-chip storage of model parameters and/or other sensitive values) be protected.

In certain examples, the manager 610 provides memory 613 which serves as an encrypted values store, which also stores encryption and operational secrets (such as salt values, attestation keys, etc.). Each domain that accesses the encrypted values store in the memory 613 presents an authentication token that is tied to an electronic signature of the component itself (and is therefore unclonable or unforgeable), to access the encrypted values store, for example. Offline physical tampering of the SoC 500 and/or other computing apparatus 600 fails to reveal these parameters in the memory 613 at least because the parameters only materialize during operation of the SoC 500/computing apparatus 600. Once decrypted and used in live operation of the SoC 500/computing apparatus 600, the sensitive values remain internal to each component and are not decipherable through interface operations, whether or not the interfaces 515-595, 615-645 are scrambled.

Certain examples provide isolation between applications executed by the circuits 620-630 and/or their models 627-637 (e.g., using Software Guard Extensions, Multi-key Total Memory Encryption, Container Encryption Technology, Trust Domain Extensions, etc.). Alternatively or additionally, thread-level memory protections can be applied for intra-address space protection to help enforce software access control within address spaces.

In certain examples, controlled exposure to IP is facilitated through a plurality of lifecycle stages including developing, testing, tuning, deploying, decommissioning, and resetting IP, particularly where the different types of IP from different vendors are intertwined (e.g., in non-encapsulated interfaces, communication through memory variables, etc.). Controlled exposure makes improper access difficult to execute and very difficult to conceal at various stages of integration, deployment, or retirement of software IP.

Certain examples provide module-level software protection. Modules belonging to the same IP domain may be pre-linked and resolved at or prior to load time for direct linkage. These modules effectively become a single virtual module that includes multiple internal modules that can call each other efficiently within the domain. For modules outside the domain, a trampoline mechanism (e.g., indirect jump vectors) can be used to call the single virtual module, for example. Function calls or access between modules Ma and Mb that both belong to the same IP vendor/supplier do not cross sensitive boundaries (e.g., are in the same domain), static linking functions properly. Even under a dynamic loading scheme, intra-domain calls can be pre-resolved and optimized. However, inter-domain calls and accesses between modules that are meant to be in the same address space involve indirect access resolution.

Modules from different domains that are to interact (e.g., call each other) can be treated as dynamically loadable libraries. The libraries/modules are assumed to be compiled for relocatability (e.g., with an -fPIC option, etc.) or are rebased at load time with a relinking loader to resolve inter-module accesses in an allocated address space. Address resolution can be facilitated in pre-linking, resolved at load time, resolved at run time, etc.

Figure 7:
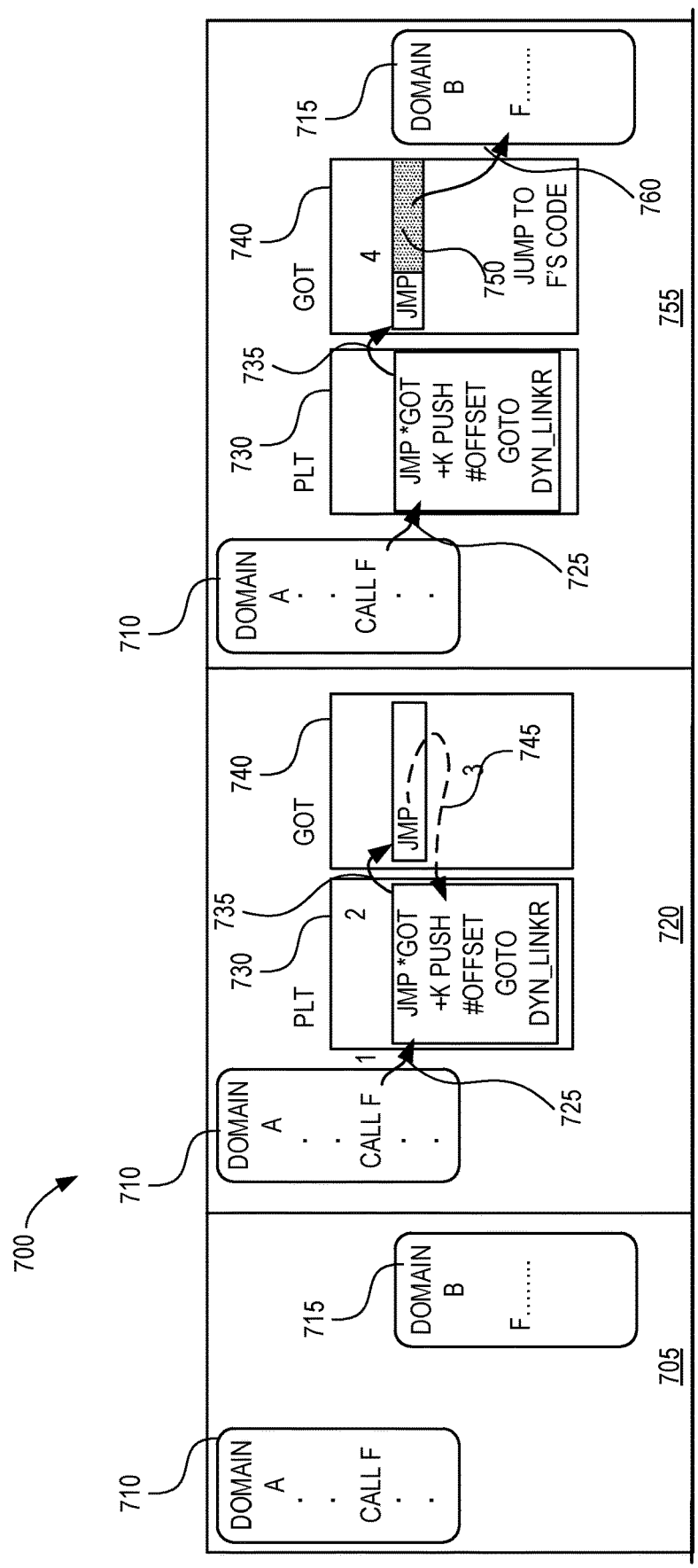
FIG. 7 illustrates an example address resolution execution sequence executed by the example apparatus of FIG. 6 to execute program code and/or other instructions across domain boundaries while protecting proprietary content.

FIG. 7 illustrates an example address resolution execution sequence 700 executed by the example manager 610 and/or circuit processor(s) 621-631 to execute program code and/or other instructions across domain boundaries while protecting model/circuit IP. Block 705 depicts an example sequence of program instructions in a domain A 710 and a domain B 715 before a first function call F. As shown in the example of FIG. 7, the call to function F is from domain A 710, while the program code for function F is in domain B 715. As such, the call to function F crosses domains from A to B when executed.

During a first call of function F, instruction flow proceeds according to block 720. As shown in the example of block 720, the call to function F from domain A 710 triggers an access 725 to a procedure linkage table (PLT) 730. The PLT 730 includes a jump 735 to a global offset table (GOT) 740. The interaction between the PLT 730 and the GOT 740 allows for dynamic relocation/resolution while allowing sharing of code pages across address spaces, for example. The jump 735 to the GOT 740 triggers a dynamic linker which determines and provides 745 an actual address 750 of a callee (a target) into the GOT 740. Then, as shown at block 755, subsequent calls bypass the remainder of the PLT 730 stub for that callee and indirectly jump 760 through the GOT 740 to the callee address at which the code for function F is located in domain B 715.

As such, certain examples invoke, when a function is first called, resolution of a target address by a trusted relinking stub (e.g., included in the dynamic linker) to resolve the target address when the function or circuit in the calling domain is validated and/or authorized for the target domain. The dynamic address resolution can be used in conjunction with or instead of the authentication token and authenticated interface circuit protection described above. The authenticated interface with authentication token can be used to regulate access to a circuit or model, for example, and the dynamic address indirection can be used to obscure a source of a model, other code functionality, other content, etc., within the circuit or model, for example.

Figure 8:
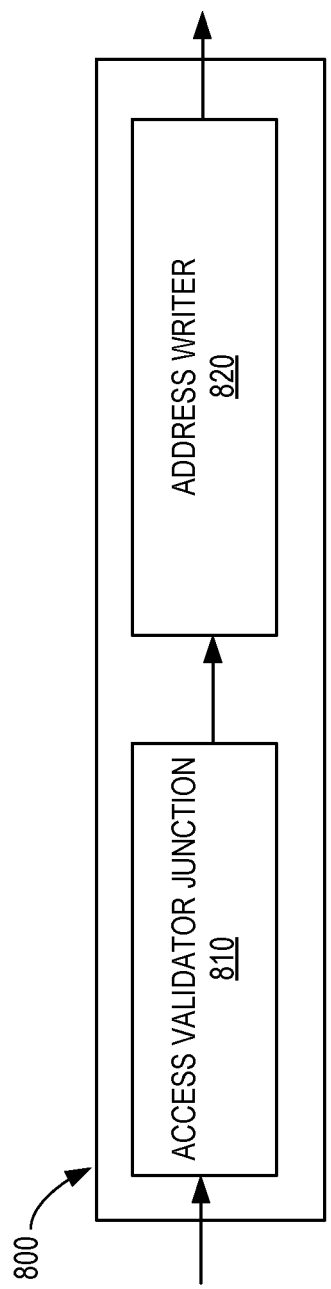
FIG. 8 illustrates an example dynamic linker to facilitate the address resolution of the example of FIG. 7

FIG. 8 is an example implementation of a dynamic linker 800 to dynamically generate an address for function F in domain B 715 to be placed in the GOT 740 for routing of the function call from domain A 710. The example dynamic linker 800 is a trusted relinking stub that includes an access validator junction (AVJ) 810 and an address writer 820. The example dynamic linker 800 receives a redirected request at first execution for each target of a function call. The example AVJ 810 checks that the caller domain (e.g., domain A in the example of FIG. 7, etc.) is permitted to make the call to the callee domain (e.g., domain B in the example of FIG. 7, etc.). If the call is permitted for the caller domain to the callee domain, then the AVJ 810 permits forward resolution of an address for called function F. If the call is not permitted for the caller domain to the callee domain, then the AVJ 810 denies address resolution and traps (e.g., stops, errors, flags, etc.) code execution.

In certain examples, the AVJ 810 determines access permission (e.g., yes or no, 1 or 0, etc.) by making a far call into a privileged host function to verify the caller domain (and the callee domain). In certain examples, the AVJ 810 can be implemented as a virtual dynamic shared object (VDSO) entry point of an operating system for the manager 610, circuit(s) 620-630, etc. Internally, the AVJ 810 calls a privileged function that cannot be called or manipulated prior to execution from outside the operating system. The AVJ 810 can be immutable such that one domain cannot artificially manufacture calls into other domains for which they are not permitted to call. As such, a check for a first function call provides an unforgeable check to verify access right(s) and obscure a target function location in another domain.

Similarly, variables meant to be accessible within an address space across domain boundaries can be resolved via the GOT 740 after mediation by the AVJ 810. When permission is established or granted, the example address writer 820 provides the determined callee address to the GOT 740 for insertion into a GOT stub and usage to route 760 code execution to the target function, variable, etc. 715.

In certain examples, the indirect address resolution can be combined with Address Space Layout Randomization (ASLR). Combining dynamic linkage with ASLR makes it difficult for a vendor of IP in one domain to intentionally perform non-permitted accesses into another domain without perfectly guessing entry point addresses. Information extracted in one case cannot be replayed elsewhere. In certain examples, an ASLR mechanism is fortified at runtime with random, time-varying salt values for different sessions. The PLT 730 can be wired and write-protected at a user level, for example, such that modifications permitted in the PLT 730 are from the trusted relinking loader 800, for example.

In certain examples, a supply-chain for a composable platform may cooperate to construct a multi-chip package (MCP) that exhibits attestable sub-components with roots of trust similar to configuration and operation of chiplets described above. For example, in a decomposable architecture, IP blocks, dies, etc., can be provided by heterogenous vendor sources, and the IP blocks can be produced on different fabrications/processes by different manufacturers in a supply chain. An IoT/edge compute lifecycle achieves security assurances by tracking the formation of various sub-components of a device, for example. Such formation can be managed and attested as described above.

Figure 9:
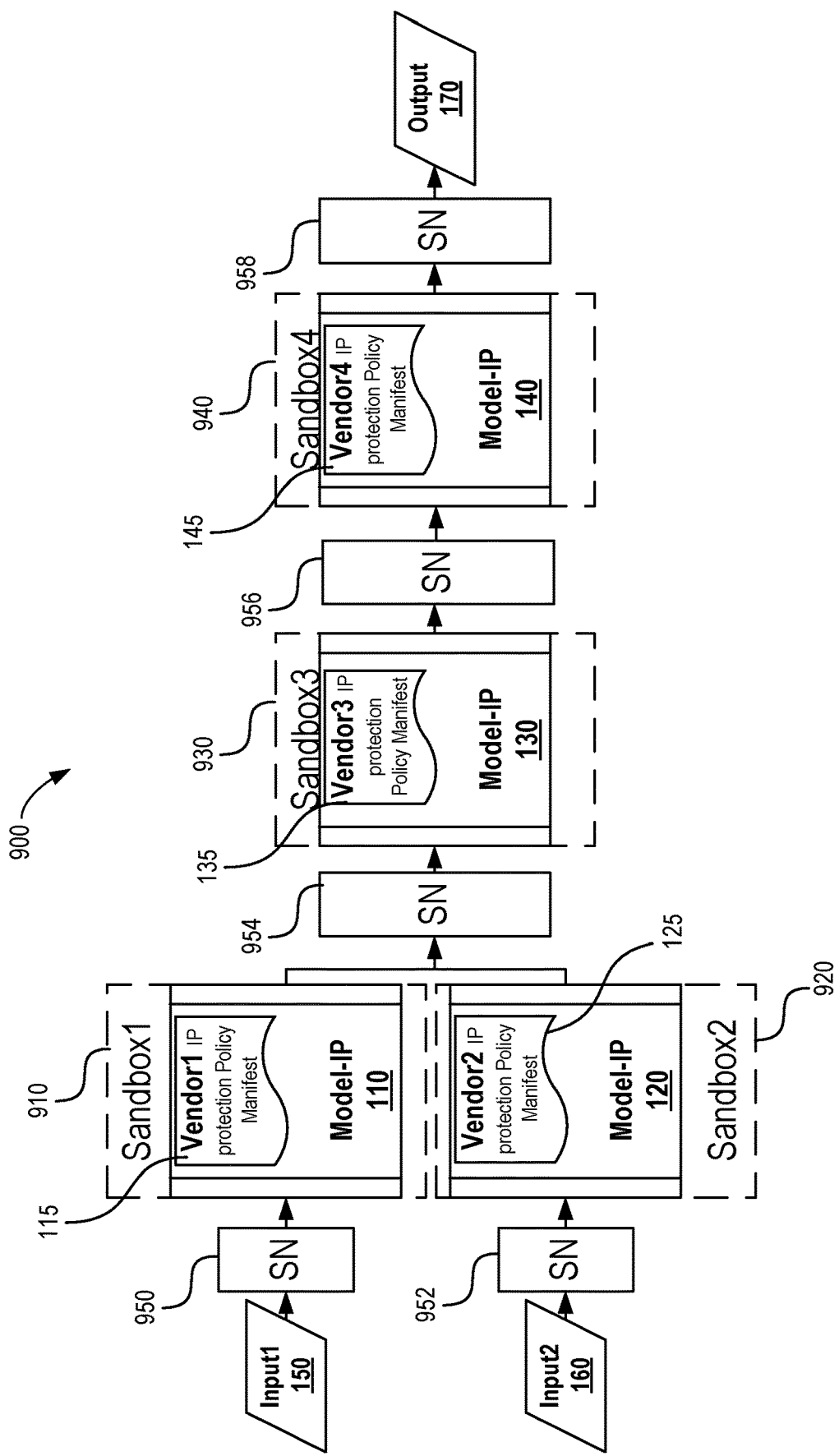
FIG. 9 is an example sandboxed pipeline including a plurality of models representing or implementing proprietary content.

FIG. 9 is an example pipeline or combination 900 of IP models similar to the example pipeline 100 of FIG. 1. However, the example pipeline 900 is a secure, sandboxed pipeline that can be used with MCPs, chiplets, and/or other circuitry to provide supply chain attestation, anti-tampering, and tracking using secure nodes and sandboxes. As shown in the example of FIG. 9, each model 110-140 has a manifest 115-145 to facilitate attestation, tamper-resistance, and tracking of the models 110-140 and model 110-140 access. Additionally, the example pipeline 900 includes a sandbox 910-940 for each model 110-140 to isolate the respective model 110-140 from unregulated access. Instead, access to each sandbox 910-940 and the associated model 110-140 is regulated by a secure node (SN) 950-958 associated with the example sandbox 910-40. The SN 950-958 can facilitate attestation of a requestor to access the model 110-140 inside the sandbox 910-940, for example.

Figure 10:
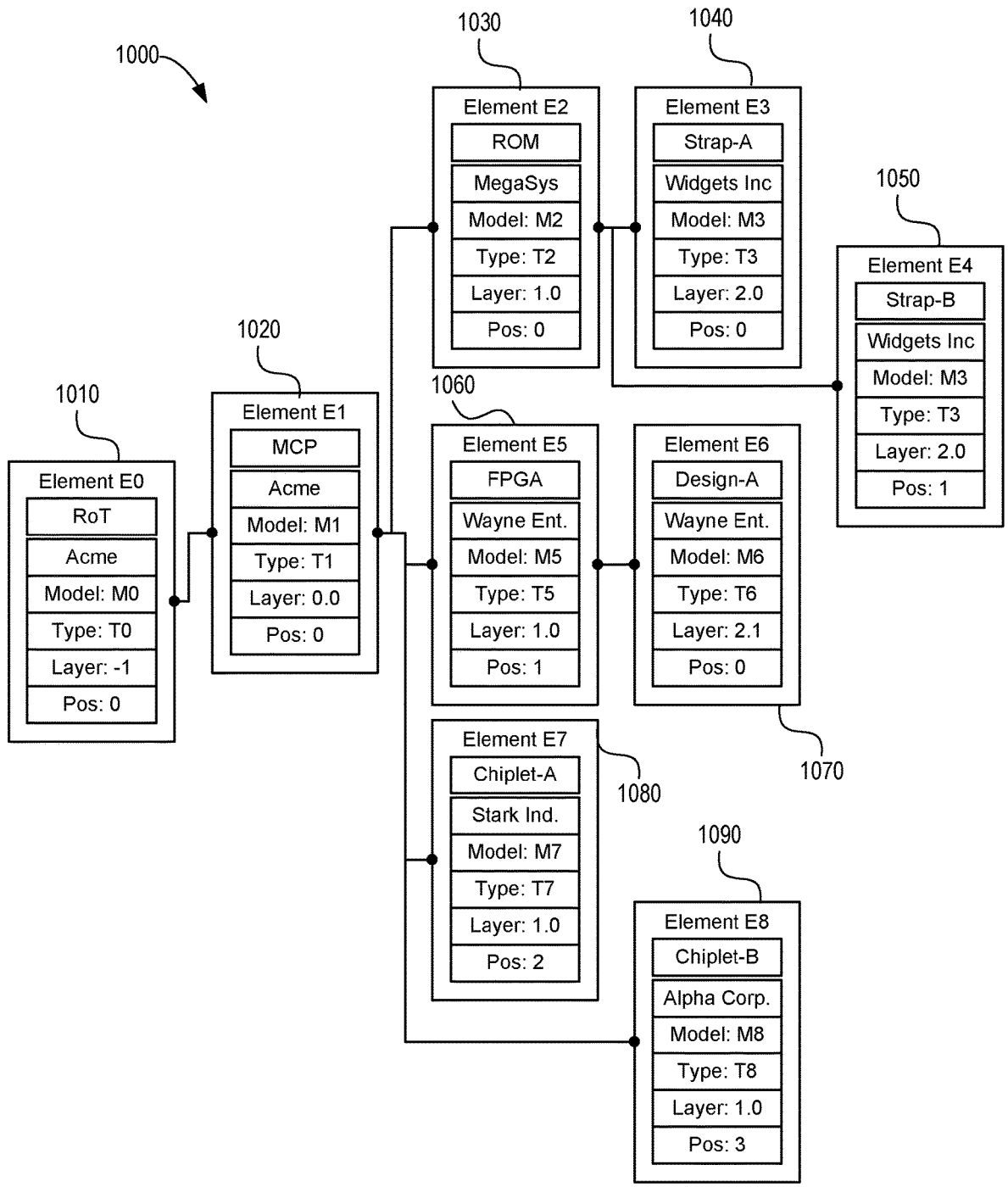
FIG. 10 shows an example decomposition of a computing apparatus or device into a plurality of elements.

FIG. 10 shows an example decomposition of a computing apparatus or device 1000 into a plurality of elements 1010-1090. The example decomposition 1000 includes MCPs, chiplets, and other hardware. While the example of FIG. 10 shows a mix of elements, certain examples provide elements that are all of a same type, are of only a few types, etc. The exact type of elements can vary. In the example of FIG. 10, each element 1010-1090 is logically described using an element descriptor that includes a label, identification of an associated vendor, a model string, a model type, a layer, and a position. The model type, for example, is a number that encodes a type of IP block, component, discrete logic, fuse, firmware, software, design, or other structure that can be incorporated into an IP block. The layer and position values are used as graph coordinates relating the various elements 1010-1090 to other elements 1010-1090 in the example device 1000.

In the example of FIG. 10, the device 1000 includes a plurality of elements 1010-1090 provided by a plurality of sources/manufacturers. For example, elements E0 1010 and E1 1020 are provided by a first source, element E2 1030 is provided by a second source, elements E3 1040 and E4 1050 are provided by a third source, elements E5 1060 and E6 1070 are provided by a fourth source, element E7 1080 is provided by a fifth source, and element E8 1090 is provided by a sixth source. The example of FIG. 1—illustrates a possible configuration of a MCP that has a Root of Trust (RoT) element 1010 and multiple sub-components 1020-1090 manufactured by other companies. The elements 1010-1090 of the example device 1000 can be logically arranged as shown in the example of FIG. 10 to provide a particular security configuration for navigation and drill down for authorized access and/or masking of functionality, data, other content, etc.

Figure 11:
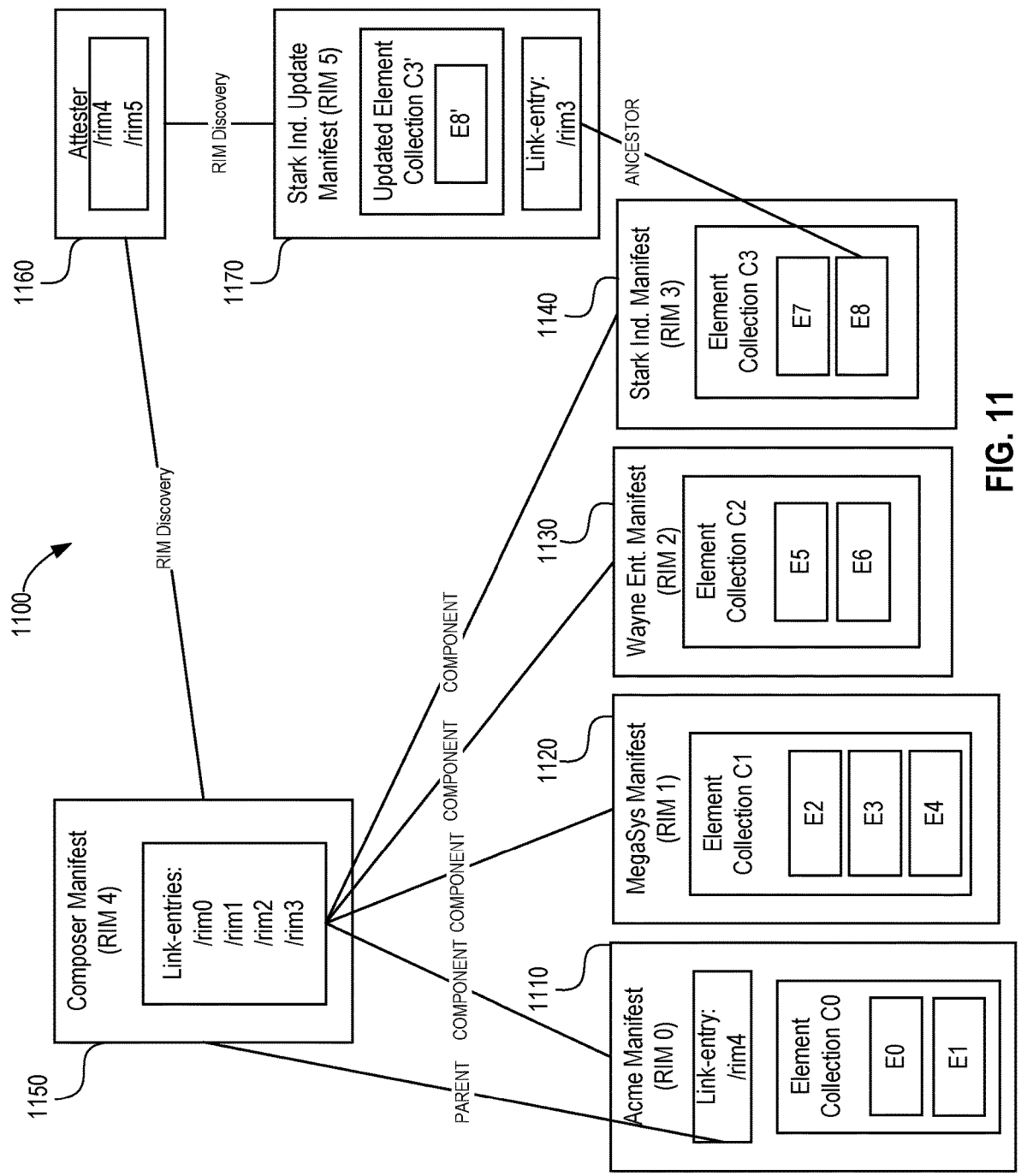
FIG. 11 shows an example multi-endorser manifest structure including manifests to provide integrity checking and security.

FIG. 11 shows an example multi-endorser manifest structure 1100 in which entities (e.g., supply chain entities, etc.) involved in building an MCP or other computing device can issue manifests 1110-1160 that provide integrity checking via an attestation protocol (e.g., attestation rules, etc.) and/or other supply chain integrity checking mechanism. As shown in the example of FIG. 11, a top-level device manufacturer creates a computing device, apparatus, of platform including nine elements E1-E8. One or more elements are associated with each manifest 1110-1160 based on their source/supplier/vendor. As shown in the example of FIG. 11, the manifests 1110-1160 are implemented as reference integrity manifests (RIMs) that provide a closed loop for attestation using one or more reference integrity measurement (e.g., stored register values for local attestation rather than reaching out to another entity via a network connection for attestation, etc.).

In the example of FIG. 11, a manifest 1110 from Acme includes two elements (E0, E1) with attestation reference measurements. A manifest 1120 from MegaSys includes three elements (E2-E4); where E2 is produced by MegaSys and E3, E4 are produced by a sub-contractor Widgets Inc. Since MegaSys accepts responsibility for managing supply chain integrity including the elements E3 and E4 from Widgets Inc., the example manifest (RIM1) 1120 includes reference values for elements E3 and E4 as well as E2. Wayne Enterprises produces a manifest RIM2 1130 with elements E5 and E6, while Stark Industries produces a manifest RIM3 1140 for elements E7 and E8. E8 is produced by a sub-contractor Alpha Corporation but is included with elements E7 and E8 in the manifest RIM3 1140.

A device composer manifest RIM4 1150 provides a composite manifest 1150 that includes links (e.g., uniform resource indicators (URIs), etc.) to the manifests 1110-1140 from the various 'component' suppliers. The composite manifest 1150 can be assembled (e.g., by a manager 510, 610, other processor, etc.) to organize and form the collection of links to individual component manifests 1110-1140, for example. The manifest 1150 uses "COMPONENT" to identify a type of relationship between the parent device and its sub-components. Alternatively or additionally, other labeling is associated with one or more links to one or more dependent manifests 1110-1140 such that a consumer of the link can project whether the linked manifest 1110-1140 describes additional detail about the current device or if there are sub-components to the device. Sub-components may be hardware, chiplet, firmware, software, etc. Layer and position information for each element E0-E8 provides device (e.g., device 1000, etc.) layout information. An attester 1160 provides for manifest 1110-1150 discovery and attestation verification. The example attester 1160 may parse the assembled set of manifests 1110-1150 to discover the device's intended logical structure and composition, for example.

As shown in the example of FIG. 11, a vendor may update a previously released component (such as a firmware update, etc.) and issue an updated manifest (RIM5) 1170 for that component/element. The updated manifest 1170 includes a reference to the updated component, which is linked with the original element (e.g., original element E8 and updated element E8' connected as ancestors in the example of FIG. 11, etc.) In certain examples, the updated element can be an ancestor, a patch, an update, etc. In certain examples, an ancestor replaces the previous manifest without updating the version, while a patch changes or replaces an element within the manifest without modifying the version, and an update replaces/changes an element in manifest and modifies the version.

In certain examples, the example attester 1160 collects information from the MCP and/or other computing device during testing, onboarding, and/or other supply chain process where the MCP part/device is active. The manifests 1110-1150, 1170 are obtained by the attester 1160. The example attester 1160 uses the example manifests 1110-1150, 1170 to construct a map of decomposition for the computing device (e.g., the example computing device or apparatus 1000, other MCP, etc.). Using the map and the manifests 1110-1150, 1170, the attester 1160 can identify known, good security element values to be compared with values in evidence to attest to elements E0-E8 in the example computing device or apparatus.

By compiling a map of elements and relationships, the map and associated manifests 1110-1150, 1170 can be used in comparison with bills of material, other supply chain data sets, etc., to detect supply chain routing and misdirection. The manifests 1110-1150, 1170 and associated mapping can be used to inform value added adjustments to a device during supply chain processing that may result in pre-configuration or installation of additional software. The value-added supplier may issue a second composer manifest that references the first composer manifest 1150, for example.

The example models 110-140, the example manifest 115-145, the example input 150-160, the example output 170, and/or, more generally, the example pipeline 100; the example models 210-240, the example CPU 250, the example FPGA 260, and/or, more generally, the example architecture 200; the example chiplets 310-390 and/or, more generally, the example SoC 300; the example domains 410-430 and/or, more generally the example SoC 440; the example chiplets 510-560, the example shared cache 570, the example external interfaces 580-590, the example interfaces 515-595, and/or, more generally, the example SoC 500; the example manager 610, the example circuits 620-630, the example communication interface 640, the example processor 611-631, the example memory 613-633, the example interface 615-635, the example models 627-637, the example internal communication interface 645, the example external communication interface 647, and/or, more generally, the example computing apparatus 600; the example procedure linkage table 730, the example global offset table 740, the example dynamic linker 800, the example access validator junction 810, the example address writer 820, the example sandbox 910-940, the example secure node 950-958; the example elements 1010-1090 and/or, more generally, the example computing apparatus or device 1000; the example manifest structure 1100, the example manifest 1110-1150, 1170, and/or the example attester 1160 in the illustrated examples of FIGS. 1-11 is/are implemented by a logic circuit such as a hardware processor. However, any other type of circuitry can additionally or alternatively be used such as one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. In some examples, the example models 110-140, the example manifest 115-145, the example input 150-160, the example output 170, and/or, more generally, the example pipeline 100; the example models 210-240, the example CPU 250, the example FPGA 260, and/or, more generally, the example architecture 200; the example chiplets 310-390 and/or, more generally, the example SoC 300; the example domains 410-430 and/or, more generally the example SoC 440; the example chiplets 510-560, the example shared cache 570, the example external interfaces 580-590, the example interfaces 515-595, and/or, more generally, the example SoC 500; the example manager 610, the example circuits 620-630, the example communication interface 640, the example processor 611-631, the example memory 613-633, the example interface 615-635, the example models 627-637, the example internal communication interface 645, the example external communication interface 647, and/or, more generally, the example computing apparatus 600; the example procedure linkage table 730, the example global offset table 740, the example dynamic linker 800, the example access validator junction 810, the example address writer 820, the example sandbox 910-940, the example secure node 950-958; the example elements 1010-1090 and/or, more generally, the example computing apparatus or device 1000; the example manifest structure 1100, the example manifest 1110-1150, 1170, and/or the example attester 1160 in the illustrated examples of FIGS. 1-11 is/are implemented by separate logic circuits. In some examples, the example manager 510 and/or the example manager 610 (and/or the included processor 611, etc.) implement a means for generating. In some examples, the example processor(s) 611-631 implement a means for generating. In some examples, the example interface(s) 515-595, 615-635, 645 implement means for enabling communication.

While example implementations of the computing architectures/apparatus 100, 200, 300, 440, 500, 600, 1000 are illustrated in FIGS. 1-11, one or more of the elements, processes and/or devices illustrated in FIGS. 1-11 can be combined, divided, re-arranged, omitted, eliminated and/or implemented in any other way. Further, the example models 110-140, the example manifest 115-145, the example input 150-160, the example output 170, and/or, more generally, the example pipeline 100; the example models 210-240, the example CPU 250, the example FPGA 260, and/or, more generally, the example architecture 200; the example chiplets 310-390 and/or, more generally, the example SoC 300; the example domains 410-430 and/or, more generally the example SoC 440; the example chiplets 510-560, the example shared cache 570, the example external interfaces 580-590, the example interfaces 515-595, and/or, more generally, the example SoC 500; the example manager 610, the example circuits 620-630, the example communication interface 640, the example processor 611-631, the example memory 613-633, the example interface 615-635, the example models 627-637, the example internal communication interface 645, the example external communication interface 647, and/or, more generally, the example computing apparatus 600; the example procedure linkage table 730, the example global offset table 740, the example dynamic linker 800, the example access validator junction 810, the example address writer 820, the example sandbox 910-940, the example secure node 950-958; the example elements 1010-1090 and/or, more generally, the example computing apparatus or device 1000; the example manifest structure 1100, the example manifest 1110-1150, 1170, and/or the example attester 1160 can be implemented by hardware, software, firmware and/or any combination of hardware, software and/or firmware. Thus, for example, any of the example models 110-140, the example manifest 115-145, the example input 150-160, the example output 170, and/or, more generally, the example pipeline 100; the example models 210-240, the example CPU 250, the example FPGA 260, and/or, more generally, the example architecture 200; the example chiplets 310-390 and/or, more generally, the example SoC 300; the example domains 410-430 and/or, more generally the example SoC 440; the example chiplets 510-560, the example shared cache 570, the example external interfaces 580-590, the example interfaces 515-595, and/or, more generally, the example SoC 500; the example manager 610, the example circuits 620-630, the example communication interface 640, the example processor 611-631, the example memory 613-633, the example interface 615-635, the example models 627-637, the example internal communication interface 645, the example external communication interface 647, and/or, more generally, the example computing apparatus 600; the example procedure linkage table 730, the example global offset table 740, the example dynamic linker 800, the example access validator junction 810, the example address writer 820, the example sandbox 910-940, the example secure node 950-958; the example elements 1010-1090 and/or, more generally, the example computing apparatus or device 1000; the example manifest structure 1100, the example manifest 1110-1150, 1170, and/or the example attester 1160 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example models 110-140, the example manifest 115-145, the example input 150-160, the example output 170, and/or, more generally, the example pipeline 100; the example models 210-240, the example CPU 250, the example FPGA 260, and/or, more generally, the example architecture 200; the example chiplets 310-390 and/or, more generally, the example SoC 300; the example domains 410-430 and/or, more generally the example SoC 440; the example chiplets 510-560, the example shared cache 570, the example external interfaces 580-590, the example interfaces 515-595, and/or, more generally, the example SoC 500; the example manager 610, the example circuits 620-630, the example communication interface 640, the example processor 611-631, the example memory 613-633, the example interface 615-635, the example models 627-637, the example internal communication interface 645, the example external communication interface 647, and/or, more generally, the example computing apparatus 600; the example procedure linkage table 730, the example global offset table 740, the example dynamic linker 800, the example access validator junction 810, the example address writer 820, the example sandbox 910-940, the example secure node 950-958; the example elements 1010-1090 and/or, more generally, the example computing apparatus or device 1000; the example manifest structure 1100, the example manifest 1110-1150, 1170, and/or the example attester 1160 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing architectures/apparatus 100, 200, 300, 440, 500, 600, 1000 of FIGS. 1-11 can include one or more elements, processes and/or devices in addition to, or instead of, those illustrated in FIGS. 1-11, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
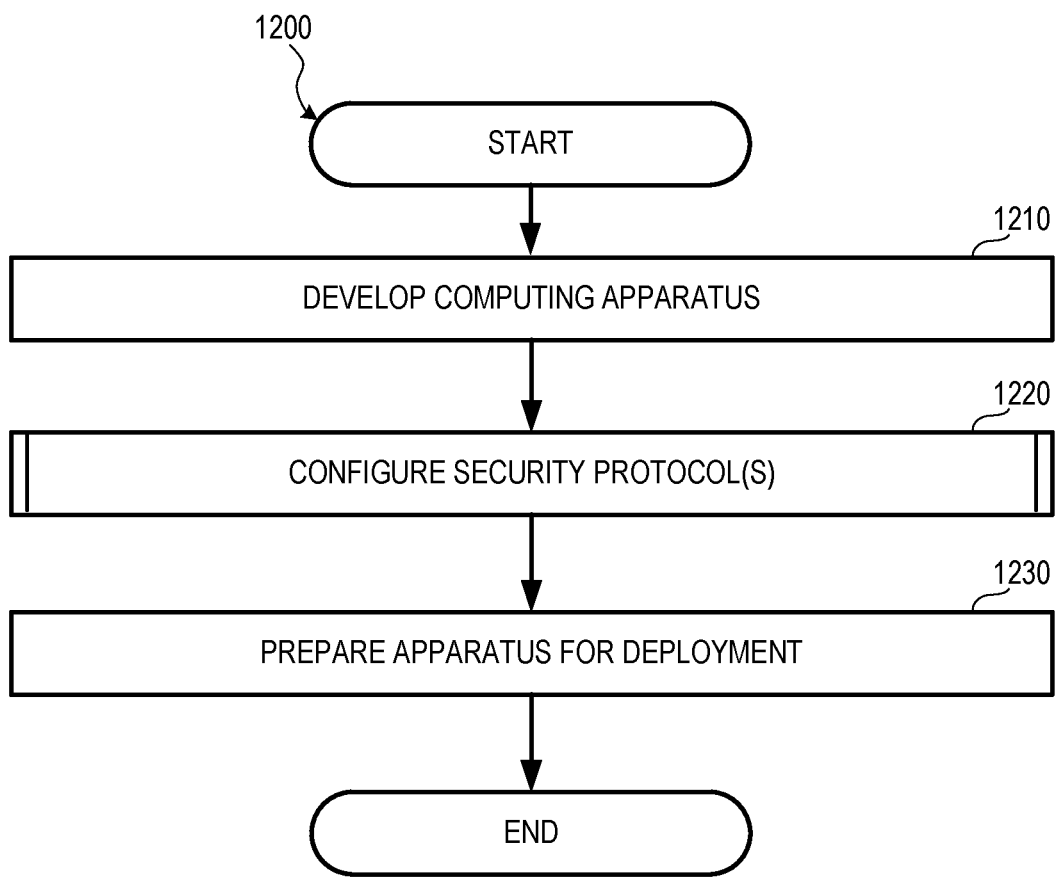
FIGS. 12-14 are flowcharts representative of example machine-readable instructions that can be executed to implement all or part of the example computing apparatus of FIGS. 1-11.
Figure 13:
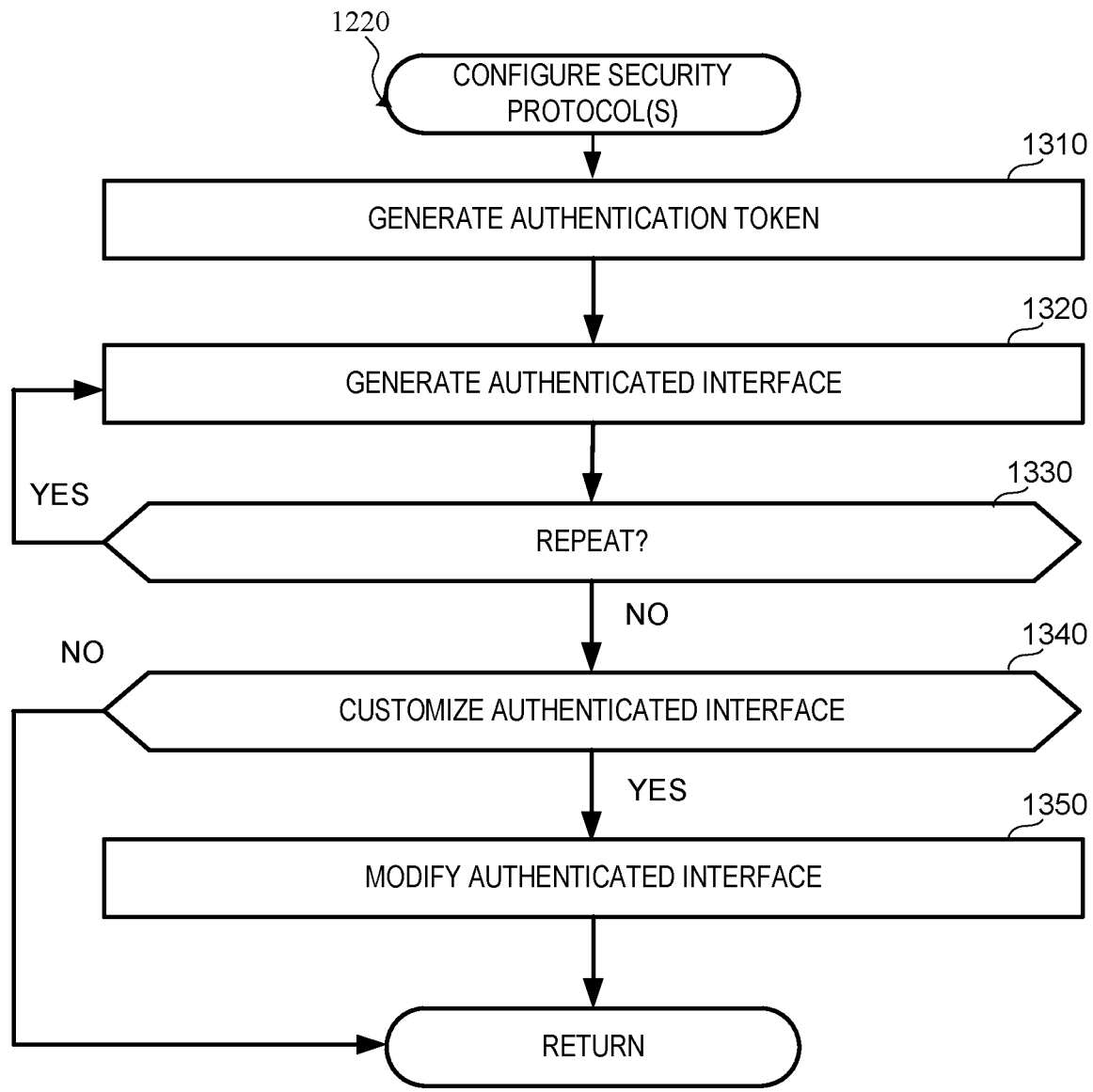
Figure 14:
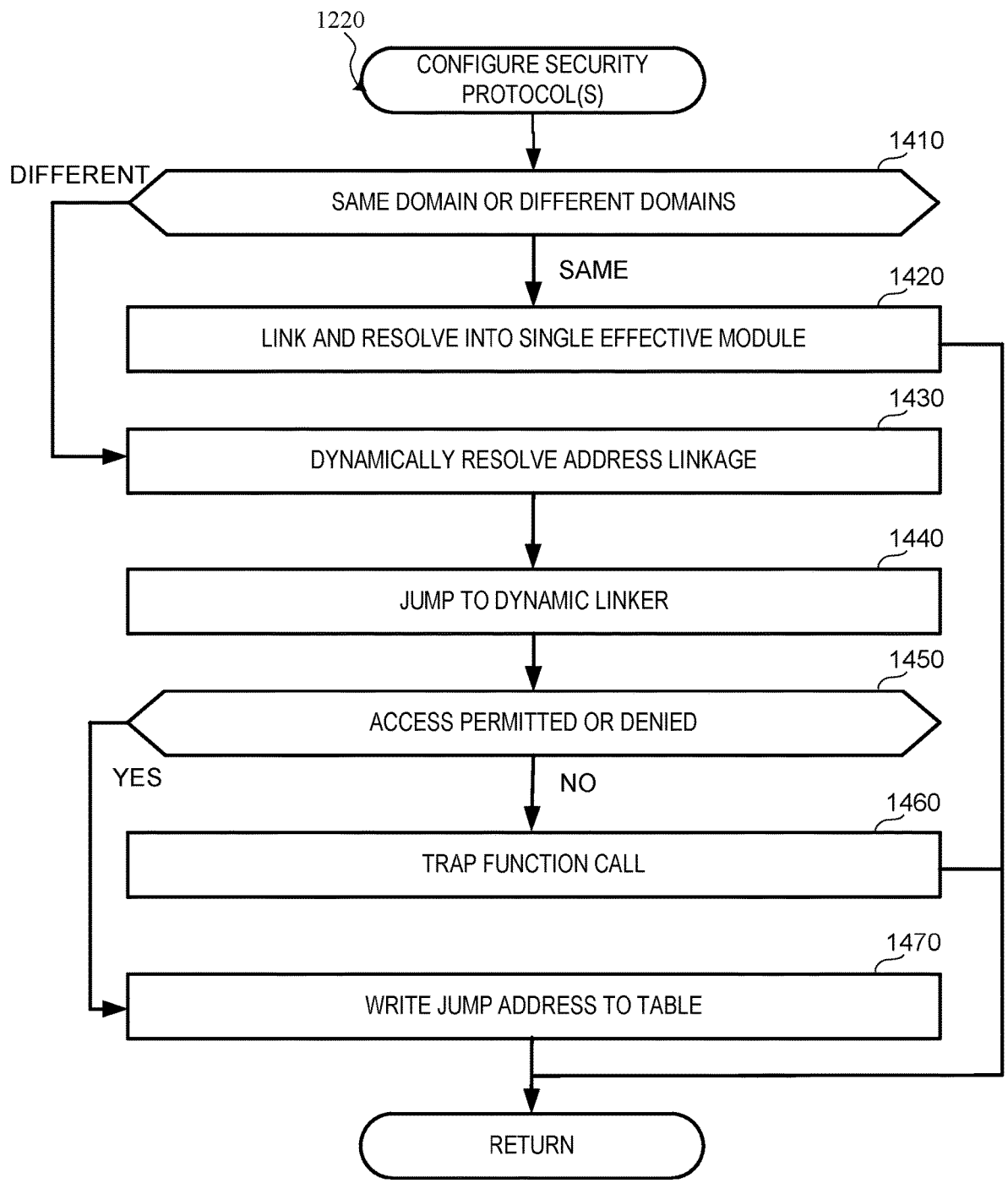

Flowcharts representative of example hardware logic, machine readable instructions, hardware implemented state machines, and/or any combination thereof for implementing the example computing architectures/apparatus 100, 200, 300, 440, 500, 600, and/or 1000 is/are shown in FIGS. 12-14. The machine readable instructions can be one or more executable programs or portion(s) of an executable program for execution by a computer processor and/or processor circuitry, such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory/memory circuitry associated with the processor 1512, but the entire program and/or parts thereof could alternatively be executed by a device other than the processor 1612 and/or embodied in firmware or dedicated hardware. The instructions stored on the non-transitory computer readable storage medium can cause at least one processor to perform at least one action or operation, implement at least one function, etc. Further, although the example program is described with reference to the flowcharts illustrated in FIGS. 12-14, many other methods of implementing the example computing architectures/apparatus 100, 200, 300, 440, 500, 600, and/or 1000 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more devices (e.g., a multi-core processor in a single machine, multiple processors distributed across a server rack, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., portions of instructions, code, representations of code, etc.) that may be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions may involve one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions can be stored in multiple parts, which are individually compressed, encrypted, and stored on separate computing devices, wherein the parts when decrypted, decompressed, and combined form a set of executable instructions that implement one or more functions that can together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 12, 13, and/or 14 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of example machine-readable instructions that can be executed to implement the example computing architecture/apparatus 100, 200, 300, 440, 500, 600, and/or 1000 of FIGS. 1-11. The example process 1200 of the illustrated example of FIG. 12 begins with development of the example circuitry for the example computing architecture, platform, apparatus, or device 100, 200, 300, 440, 500, 600, and/or 1000. (Block 1210). For example, one or more chiplets, MCPs, processors, memory, interfaces, etc., are placed on an SoC, MCP, and/or other circuit.

Security protocol(s) are then configured for the example computing architecture, platform, apparatus, or device 100, 200, 300, 440, 500, 600, 1000. (Block 1220). For example, one or more authentication tokens can be generated and associated with circuitry of the example computing architecture, platform, apparatus, or device 100, 200, 300, 440, 500, 600, 1000. Alternatively or additionally, a manifest 115-145, 1110-1150, 1170 including the token and/or other identification information, access rules(s), etc., can be generated and stored in or with an IP model 110-140, 210-240, 627-637 associated with the circuitry of the example computing architecture, platform, apparatus, or device 100, 200, 300, 440, 500, 600, 1000 (e.g., in the sandbox 910-940, in a circuit 620-630, in a chiplet 310-390, 510-560, in a domain 250, 260, etc.), for example. Alternatively or additionally, the example PLT 730 and GOT 740 can be configured to dynamically link or resolve jump addresses for one or more functions to enable cross-domain exchange of functionality without undue exposure of proprietary content, functionality, etc.

In certain examples, a single security protocol is selected and configured. In other examples, a plurality of security protocols are selected and configured. In some example, available security protocols are automatically configured. As such, an interface can be protected, an internal AI model can be protected, other hardware, software, and/or data can be protected internal to a circuitry while still enabling multiple circuits and/or multiple software programs to work together to produce a result for the example computing architecture, platform, apparatus, or device 100, 200, 300, 440, 500, 600, 1000, such as an SoC, MCP, collection of chiplets, other processor, etc.

The example computing architecture, platform, apparatus, or device 100, 200, 300, 440, 500, 600, 1000 is then prepared for deployment. (Block 1230). For example, the circuit package for the example computing architecture, platform, apparatus, or device 100, 200, 300, 440, 500, 600, 1000 is prepared to be distributed and installed to execute its functionality protected by the one or more security protocols and/or other safeguards programmed, hardwired, and/or configured into the computing architecture, platform, apparatus, or device 100, 200, 300, 440, 500, 600, 1000. For example, the example computing architecture, platform, apparatus, or device 100, 200, 300, 440, 500, 600, 1000 can use the stored token to authenticate and enable one or more interfaces 515-595, 580-590, 615-635, 645, 647. Content of the manifest 115-145, 1110-1150, 1170 can be compared to allow or deny access, for example. The circuitry (e.g., the manager 510, 610, etc.) can dynamically link across domains from a function call to a function based on verification, attestation, and/or other authorization, for example.

FIG. 13 is a flowchart providing further example detail regarding configuring security protocol(s) for the example computing architecture, platform, apparatus, or device 100, 200, 300, 440, 500, 600, 1000. (Block 1220 of the example of FIG. 12). An example authentication token is generated (e.g., by an example circuit 250, 260, 310-390, 510-560, 620-630 or manager 510, 610 using a root of trust, other trust anchor, etc.). (Block 1310). Using the authentication token, an authenticated interface is generated for one or more pins of an interface 515-595, 580-590, 615-635, 645, 647. (Block 1320). The authenticated interface can be specific to a particular circuit accessing the interface such that a plurality of authenticated interfaces can be generated for each requesting circuit, for example. (Block 1330). For example, Equations 1-2 can be used to generate an authenticated interface for a circuit.

In certain examples, a circuit can customize its authenticated interface. (Block 1340). If so, the authenticated interface can be modified using a salt or other seed value generated or provided by the associated circuit. (Block 1350). For example, Equations 3-5 can be used to generate a domain, customer, and/or circuit-specific salt value to generate or modify the authenticated interface.

FIG. 14 is a flowchart providing further example detail regarding configuring security protocol(s) for the example computing architecture, platform, apparatus, or device 100, 200, 300, 440, 500, 600, 1000. (Block 1220 of the example of FIG. 12). The example of FIG. 14, functions are linked among software code modules. For a given function call and function definition, the address of the function call and program code defining the function are compared to determine whether they are in the same domain or in different domains (e.g., domain A and domain B, etc.). (Block 1410). When the call and definition are in the same domain, then the software code modules for the call and the definition can be pre-linked before execution and resolved into a single effective module. (Block 1420). However, when the function call and definition are in different domains, then address linkage is dynamically resolved between the domains. (Block 1430).

A function call in domain A for function F in domain B triggers a jump to the dynamic linker 800 via the PLT 730. (Block 1440). The AVJ 810 is queried to determine whether the access is permitted or denied. (Block 1450). For example, the AVJ 810 checks whether the caller domain A is permitted to make the call to the callee domain B. The AVJ 810 obtains its answer (e.g., yes/no) by making a far call to a privileged host function, for example. If permission is denied, then the function call is trapped and not allowed to continue. (Block 1460). If permission is granted, then the address of function F in domain B is written into a GOT 740 stub to enable a jump from domain A to the function code in domain B. (Block 1470).

The example method of FIG. 14 is described above in connection with a function call. In certain examples, the example method of FIG. 14 can also be applied to resolve variables, etc., whose usage and definition cross domain boundaries.

Figure 15:
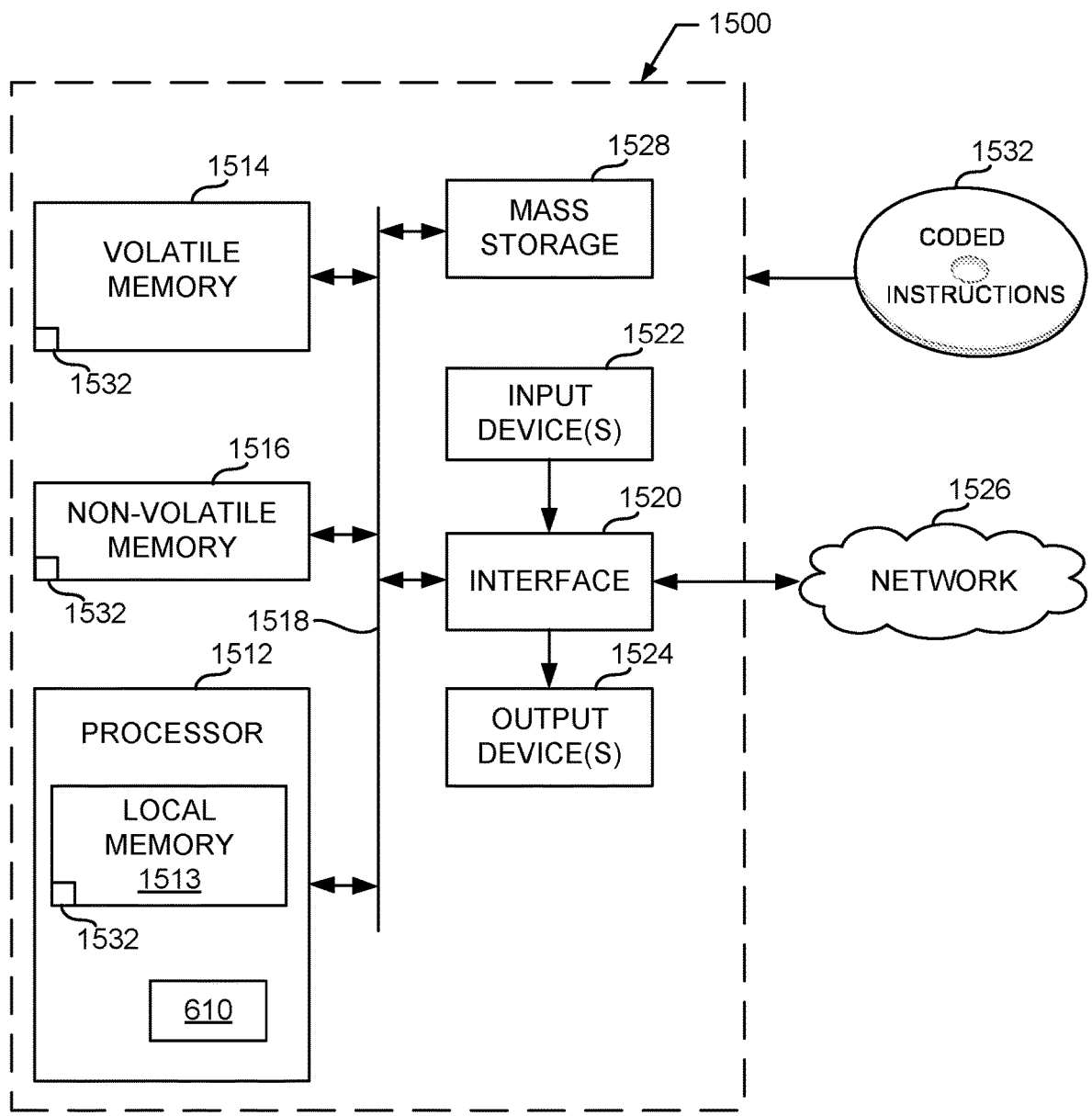
FIG. 15 is a block diagram of an example processor platform structured to execute the instructions of FIGS. 12-14 to implement the example computing apparatus of FIGS. 1-11.

FIG. 15 is a block diagram of an example processor platform 1100 structured to execute the instructions of FIGS. 12-14 to implement the example computing architecture, platform, apparatus, or device 100, 200, 300, 440, 500, 600, 1000 of FIGS. 1-11. The processor platform 1500 can be, for example, a server, a personal computer, a workstation, a self-learning machine (e.g., a neural network), a mobile device (e.g., a cell phone, a smart phone, a tablet such as an iPad™), an Internet appliance, a gaming console, a headset or other wearable device, or other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements the example manager 610. The example processor 1512 can similarly implement the example CPU 20, the example chiplets 310-390, 520-570, the example chip manager 510, the example circuits 620-630, the example dynamic linker 800, the example attester 1160, etc.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 can be implemented by flash memory and/or any other desired type of memory device. Access to the main memory 1514, 1516 is controlled by a memory controller.

The processor platform 1500 of the illustrated example also includes an interface circuit 1520. The interface circuit 1520 can be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip, and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 12-14 can be stored in the mass storage device 1528, in the volatile memory 1514, in the non-volatile memory 1516, and/or on a removable non-transitory computer readable storage medium such as a CD or DVD.

In certain examples, the above example computing apparatus 100, 200, 300, 440, 500, 600, 1000, etc., of FIGS. 1-11 can be implemented on an edge node of an edge network. The edge node, for example, is a computing endpoint that is deployed by an edge computing environment such as a base station that has a computing rack integrated into the base of a tower or a regional office that may have server racks as well as a mobile edge node such as a cell phone, smart automobile, drone etc. In an IoT network, mobile edge nodes can be considered as part of the IoT network as well as part of an edge network. IoT and industrial internet of things (IIoT) nodes may include stationary IoT nodes including an IoT network in which the main focus of the IoT node is to host a particular type of sensing technology or cyber-physical automation technology such as factory automation, robotics, autonomics, etc.

In certain examples, chiplets can be composed in various combinations in ASICs, FPGA, SoC, etc., on an IoT or other edge node to provide flexible configuration within a chiplet layout geometry. Security attestation and access regulation can then be dynamically determined based on configuration, task, other usage, location, etc.

Figure 16:
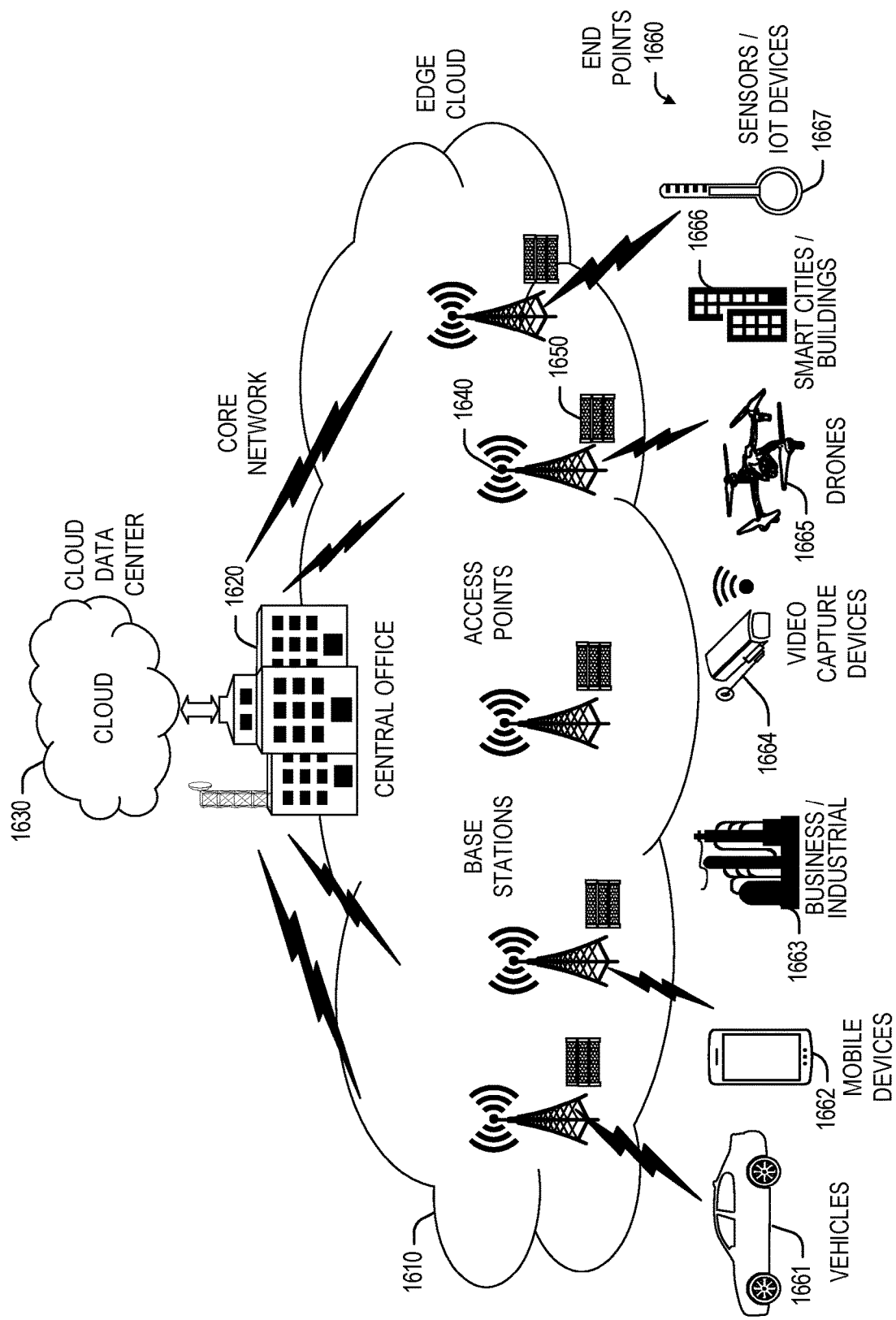
FIG. 16 illustrates an overview of an edge cloud configuration for edge computing.

FIG. 16 is a block diagram 1600 showing an overview of a configuration for edge computing, which includes a layer of processing referred to in many of the following examples as an "edge cloud". As shown, the edge cloud 1610 is co-located at an edge location, such as an access point or base station 1640, a local processing hub 1650, or a central office 1620, and thus may include multiple entities, devices, and equipment instances. The edge cloud 1610 is located much closer to the endpoint (consumer and producer) data sources 1660 (e.g., autonomous vehicles 1661, user equipment 1662, business and industrial equipment 1663, video capture devices 1664, drones 1665, smart cities and building devices 1666, sensors and IoT devices 1667, etc.) than the cloud data center 1630. Compute, memory, and storage resources which are offered at the edges in the edge cloud 1610 are critical to providing ultra-low latency response times for services and functions used by the endpoint data sources 1660 as well as reduce network backhaul traffic from the edge cloud 1610 toward cloud data center 1630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 17:
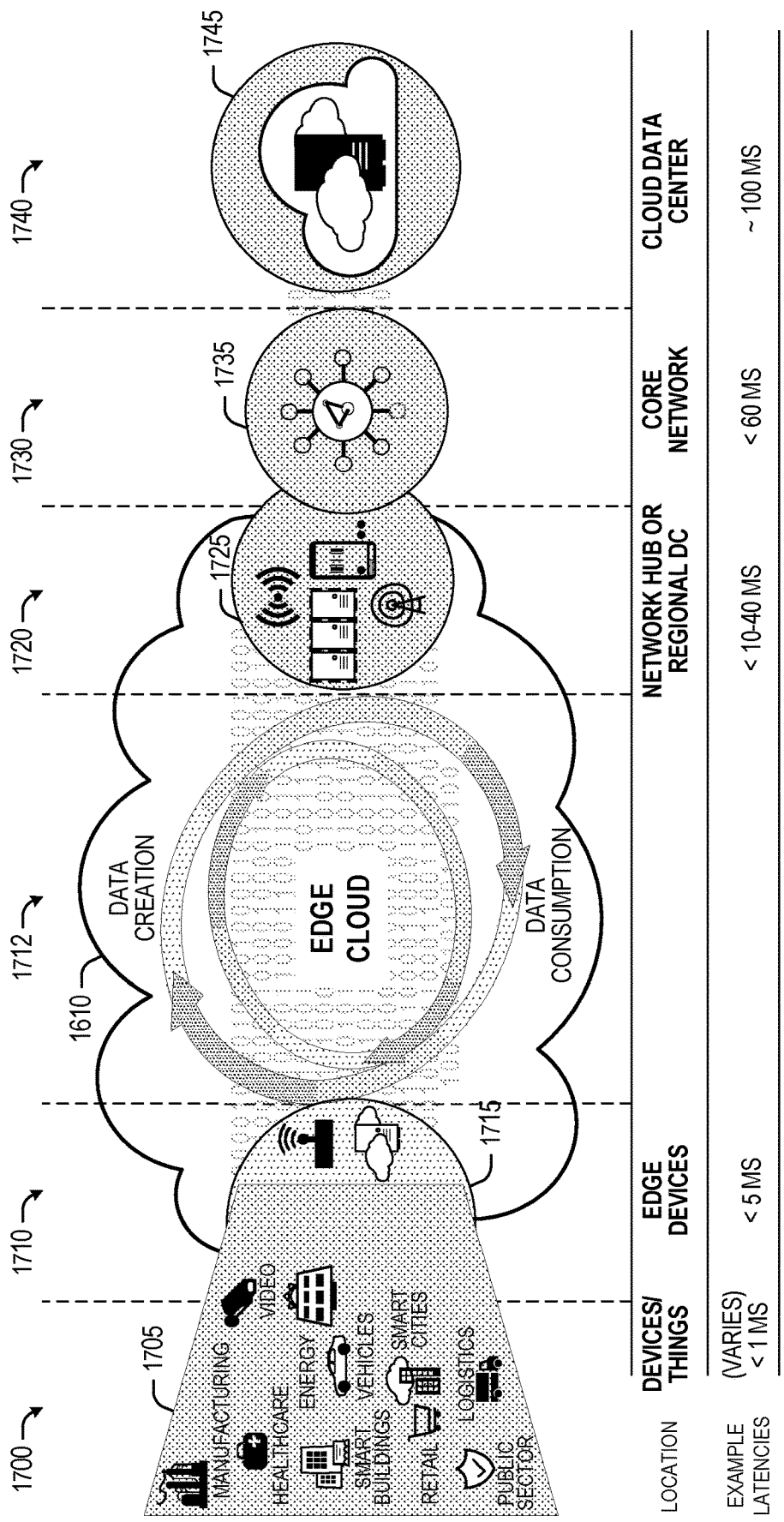
FIG. 17 illustrates operational layers among endpoints, an edge cloud, and cloud computing environments.

FIG. 17 illustrates operational layers among endpoints, an edge cloud, and cloud computing environments. Specifically, FIG. 17 depicts examples of computational use cases 1705, utilizing the edge cloud 1610 among multiple illustrative layers of network computing. The layers begin at an endpoint (devices and things) layer 1700, which accesses the edge cloud 1610 to conduct data creation, analysis, and data consumption activities. The edge cloud 1610 may span multiple network layers, such as an edge devices layer 1710 having gateways, on-premise servers, or network equipment (nodes 1715) located in physically proximate edge systems; a network access layer 1720, encompassing base stations, radio processing units, network hubs, regional data centers (DC), or local network equipment (equipment 1725); and any equipment, devices, or nodes located therebetween (in layer 1712, not illustrated in detail). The network communications within the edge cloud 1610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1700, under 5 ms at the edge devices layer 1710, to even between 10 to 40 ms when communicating with nodes at the network access layer 1720. Beyond the edge cloud 1610 are core network 1730 and cloud data center 1740 layers, each with increasing latency (e.g., between 50-60 ms at the core network layer 1730, to 100 or more ms at the cloud data center layer). As a result, operations at a core network data center 1735 or a cloud data center 1745, with latencies of at least 50 to 100 ms or more, will not be able to accomplish many time-critical functions of the use cases 1705. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1735 or a cloud data center 1745, a central office or content data network may be considered as being located within a "near edge" layer ("near" to the cloud, having high latency values when communicating with the devices and endpoints of the use cases 1705), whereas an access point, base station, on-premise server, or network gateway may be considered as located within a "far edge" layer ("far" from the cloud, having low latency values when communicating with the devices and endpoints of the use cases 1705). It will be understood that other categorizations of a particular network layer as constituting a "close", "local", "near", "middle", or "far" edge may be based on latency, distance, number of network hops, or other measurable characteristics, as measured from a source in any of the network layers 1700-1740.

The various use cases 1705 may access resources under usage pressure from incoming streams, due to multiple services utilizing the edge cloud. To achieve results with low latency, the services executed within the edge cloud 1610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1610 may provide the ability to serve and respond to multiple applications of the use cases 1705 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 1610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1610 (network layers 1700-1740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1610.

As such, the edge cloud 1610 is formed from network components and functional features operated by and within edge gateway nodes, edge aggregation nodes, or other edge compute nodes among network layers 1710-1730. The edge cloud 1610 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1610 may be servers, multi-tenant servers, appliance computing devices, and/or any other type of computing devices. For example, the edge cloud 1610 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 23B. The edge cloud 1610 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code, or scripts.

Figure 18:
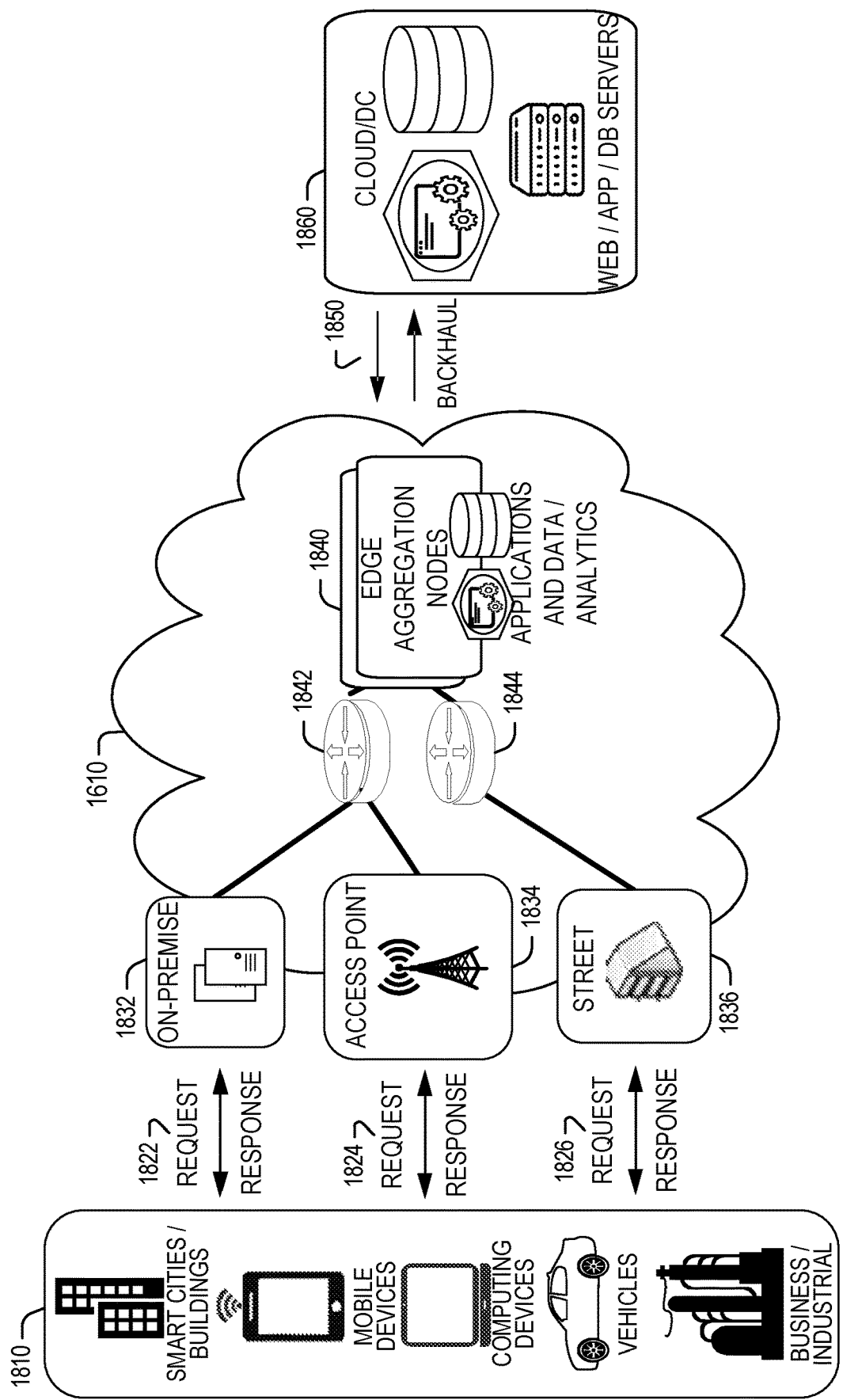
FIG. 18 illustrates an example approach for networking and services in an edge computing system.

In FIG. 18, various client endpoints 1810 (in the form of mobile devices, computers, autonomous vehicles, business computing equipment, industrial processing equipment) exchange requests and responses that are specific to the type of endpoint network aggregation. For instance, client endpoints 1810 may obtain network access via a wired broadband network, by exchanging requests and responses 1822 through an on-premise network system 1832. Some client endpoints 1810, such as mobile computing devices, may obtain network access via a wireless broadband network, by exchanging requests and responses 1824 through an access point (e.g., cellular network tower) 1834. Some client endpoints 1810, such as autonomous vehicles may obtain network access for requests and responses 1826 via a wireless vehicular network through a street-located network system 1836. However, regardless of the type of network access, the TSP may deploy aggregation points 1842, 1844 within the edge cloud 1610 to aggregate traffic and requests. Thus, within the edge cloud 1610, the TSP may deploy various compute and storage resources, such as at edge aggregation nodes 1840, to provide requested content. The edge aggregation nodes 1840 and other systems of the edge cloud 1610 are connected to a cloud or data center 1860, which uses a backhaul network 1850 to fulfill higher-latency requests from a cloud/data center for websites, applications, database servers, etc. Additional or consolidated instances of the edge aggregation nodes 1840 and the aggregation points 1842, 1844, including those deployed on a single server framework, may also be present within the edge cloud 1610 or other areas of the TSP infrastructure.

Figure 19:
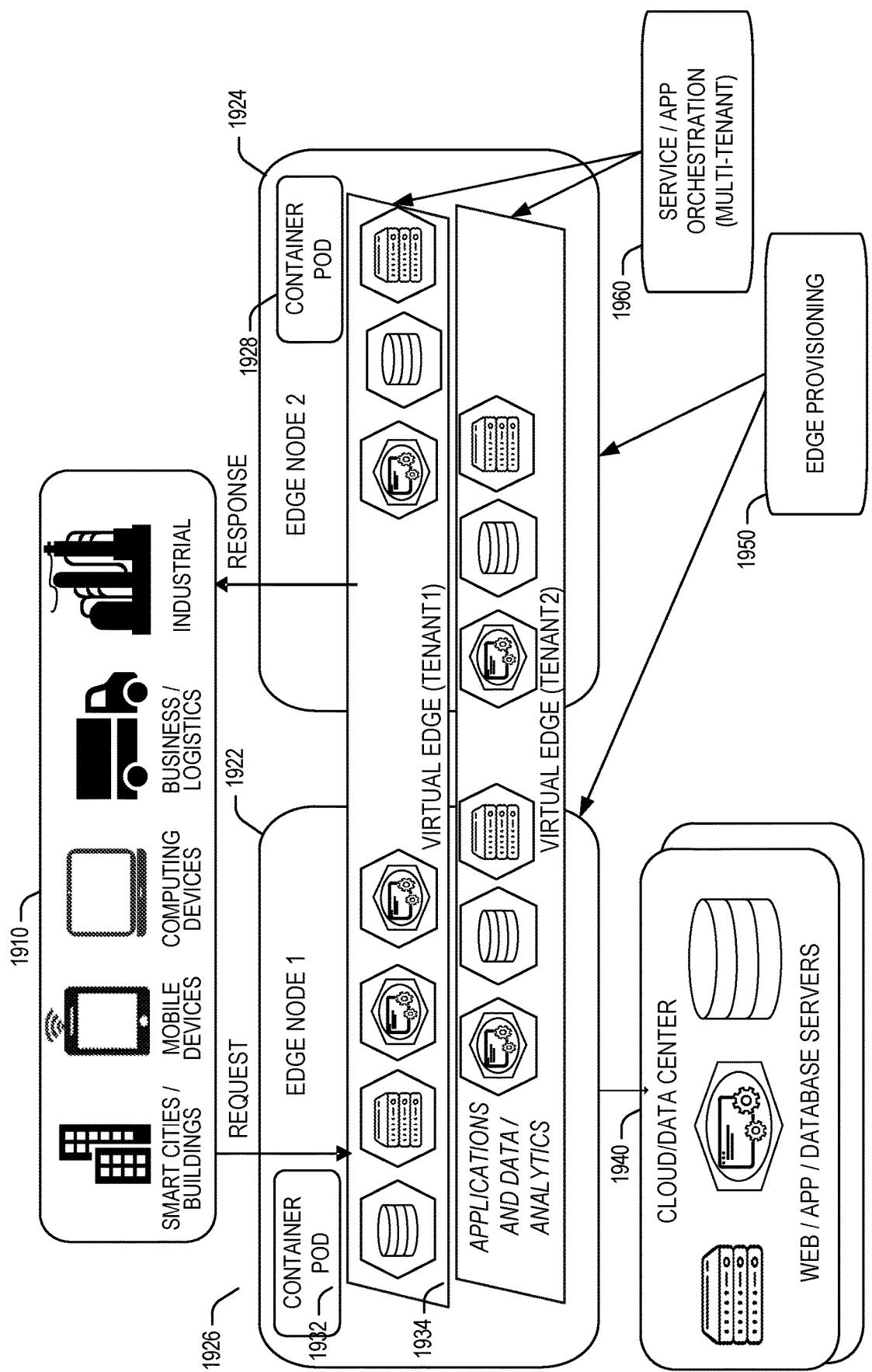
FIG. 19 illustrates deployment of a virtual edge configuration in an edge computing system operated among multiple edge nodes and multiple tenants.

FIG. 19 illustrates deployment and orchestration for virtualized and container-based edge configurations across an edge computing system operated among multiple edge nodes and multiple tenants (e.g., users, providers) which use such edge nodes. For example, sandboxes 910-940 and/or other model 110-140, etc., can be implemented using a container. Specifically, FIG. 19 depicts coordination of a first edge node 1922 and a second edge node 1924 in an edge computing system 1900, to fulfill requests and responses for various client endpoints 1910 (e.g., smart cities/building systems, mobile devices, computing devices, business/logistics systems, industrial systems, etc.), which access various virtual edge instances. Here, the virtual edge instances 1932, 1934 provide edge compute capabilities and processing in an edge cloud, with access to a cloud/data center 1940 for higher-latency requests for websites, applications, database servers, etc. However, the edge cloud enables coordination of processing among multiple edge nodes for multiple tenants or entities.

In the example of FIG. 19, these virtual edge instances include: a first virtual edge 1932, offered to a first tenant (Tenant 1), which offers a first combination of edge storage, computing, and services; and a second virtual edge 1934, offering a second combination of edge storage, computing, and services. The virtual edge instances 1932, 1934 are distributed among the edge nodes 1922, 1924, and may include scenarios in which a request and response are fulfilled from the same or different edge nodes. The configuration of the edge nodes 1922, 1924 to operate in a distributed yet coordinated fashion occurs based on edge provisioning functions 1950. The functionality of the edge nodes 1922, 1924 to provide coordinated operation for applications and services, among multiple tenants, occurs based on orchestration functions 1960.

It should be understood that some of the devices in 1910 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1922, 1924 may operate as security feature enforcement points for local resources allocated to multiple tenants per node. Additionally, tenant runtime and application execution (e.g., in instances 1932, 1934) may serve as an enforcement point for a security feature that creates a virtual edge abstraction of resources spanning potentially multiple physical hosting platforms. Finally, the orchestration functions 1960 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1910, 1922, and 1940 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 19. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1922, 1924 may implement the use of containers, such as with the use of a container "pod" 1926, 1928 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1932, 1934 are partitioned according to the needs of each container.

With the use of container pods, a pod controller oversees the partitioning and allocation of containers and resources. The pod controller receives instructions from an orchestrator (e.g., orchestrator 1960) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1960 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 20:
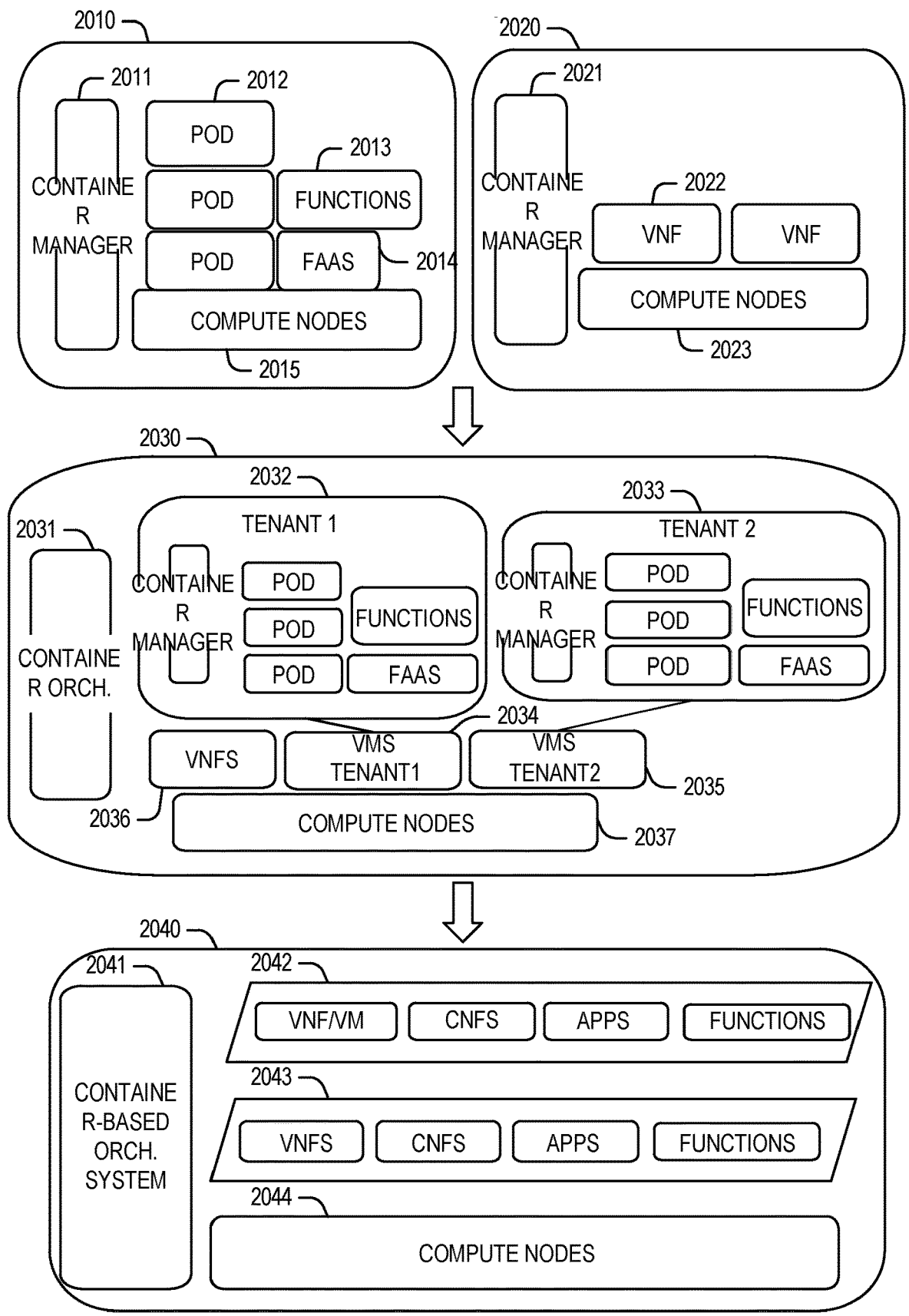
FIG. 20 illustrates various compute arrangements deploying containers in an edge computing system.

FIG. 20 illustrates additional compute arrangements deploying containers in an edge computing system. As a simplified example, system arrangements 2010, 2020 depict settings in which a pod controller (e.g., container managers 2011, 2021, and container orchestrator 2031) is adapted to launch containerized pods, functions, and functions-as-a-service instances through execution via compute nodes (2015 in arrangement 2010), or to separately execute containerized virtualized network functions through execution via compute nodes (2023 in arrangement 2020). This arrangement is adapted for use of multiple tenants in system arrangement 2030 (using compute nodes 2037), where containerized pods (e.g., pods 2012), functions (e.g., functions 2013, VNFs 2022, 2036), and functions-as-a-service instances (e.g., FaaS instance 2014) are launched within virtual machines (e.g., VMs 2034, 2035 for tenants 2032, 2033) specific to respective tenants (aside the execution of virtualized network functions). This arrangement is further adapted for use in system arrangement 2040, which provides containers 2042, 2043, or execution of the various functions, applications, and functions on compute nodes 2044, as coordinated by an container-based orchestration system 2041.

The system arrangements of depicted in FIG. 20 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 20, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 21:
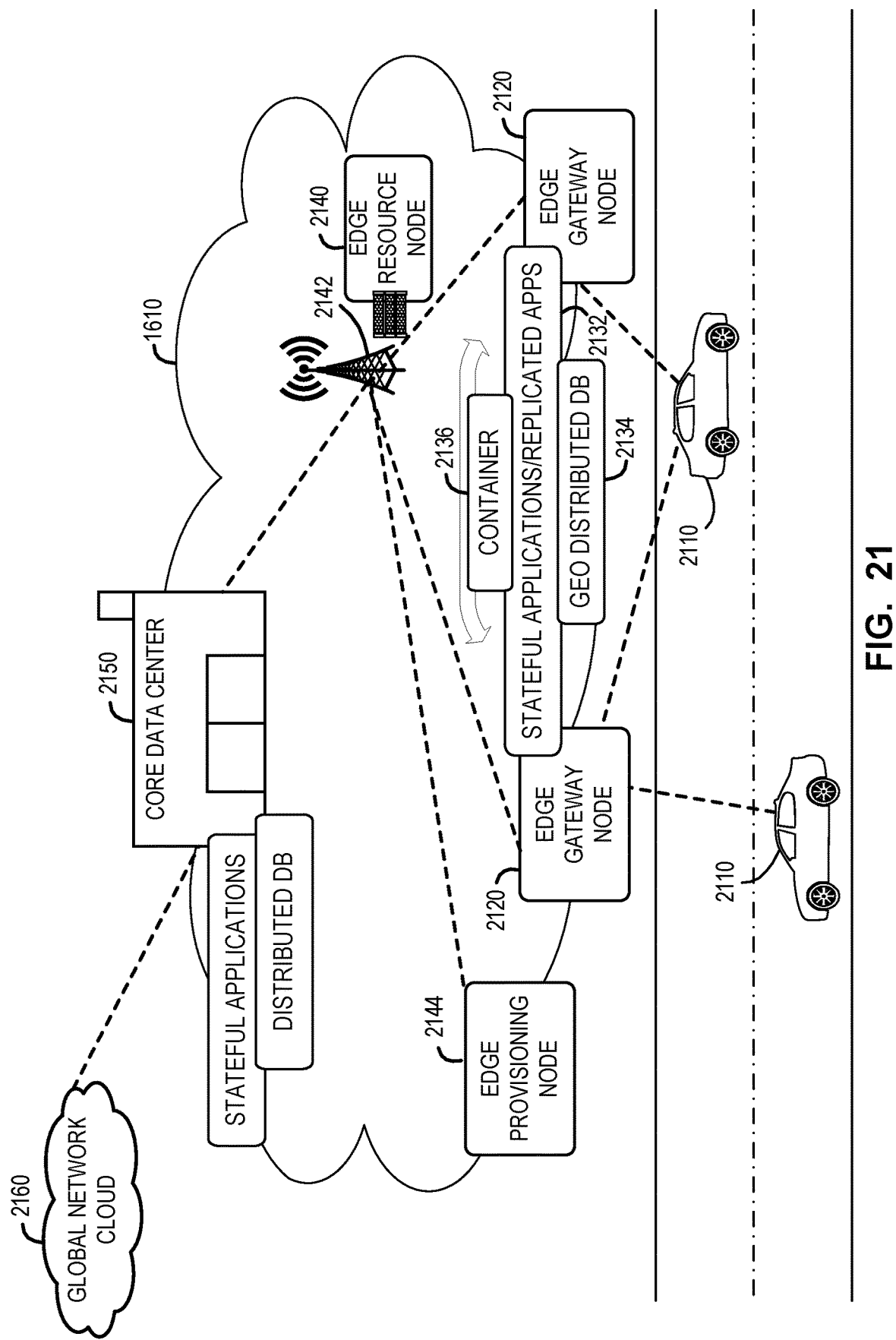
FIG. 21 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 21 shows a simplified vehicle compute and communication use case involving mobile access to applications in an edge computing system 2100 that implements an edge cloud 1610. In this use case, respective client compute nodes 2110 may be embodied as in-vehicle compute systems (e.g., in-vehicle navigation and/or infotainment systems) located in corresponding vehicles which communicate with the edge gateway nodes 2120 during traversal of a roadway. For instance, the edge gateway nodes 2120 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 2110 and a particular edge gateway device 2120 may propagate so as to maintain a consistent connection and context for the client compute node 2110. Likewise, mobile edge nodes may aggregate at the high priority services or according to the throughput or latency resolution requirements for the underlying service(s) (e.g., in the case of drones). The respective edge gateway devices 2120 include an amount of processing and storage capabilities and, as such, some processing and/or storage of data for the client compute nodes 2110 may be performed on one or more of the edge gateway devices 2120.

The edge gateway devices 2120 may communicate with one or more edge resource nodes 2140, which are illustratively embodied as compute servers, appliances or components located at or in a communication base station 2142 (e.g., a base station of a cellular network). As discussed above, the respective edge resource nodes 2140 include an amount of processing and storage capabilities and, as such, some processing and/or storage of data for the client compute nodes 2110 may be performed on the edge resource node 2140. For example, the processing of data that is less urgent or important may be performed by the edge resource node 2140, while the processing of data that is of a higher urgency or importance may be performed by the edge gateway devices 2120 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 2140 also communicate with the core data center 2150, which may include compute servers, appliances, and/or other components located in a central location (e.g., a central office of a cellular communication network). The core data center 2150 may provide a gateway to the global network cloud 2160 (e.g., the Internet) for the edge cloud 1610 operations formed by the edge resource node(s) 2140 and the edge gateway devices 2120. Additionally, in some examples, the core data center 2150 may include an amount of processing and storage capabilities and, as such, some processing and/or storage of data for the client compute devices may be performed on the core data center 2150 (e.g., processing of low urgency or importance, or high complexity).

The edge gateway nodes 2120 or the edge resource nodes 2140 may offer the use of stateful applications 2132 and a geographic distributed database 2134. Although the applications 2132 and database 2134 are illustrated as being horizontally distributed at a layer of the edge cloud 1610, it will be understood that resources, services, or other components of the application may be vertically distributed throughout the edge cloud (including, part of the application executed at the client compute node 2110, other parts at the edge gateway nodes 2120 or the edge resource nodes 2140, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 2136 (or pod of containers) may be flexibly migrated from an edge node 2120 to other edge nodes (e.g., 2120, etc.) such that the container with an application and workload does not need to be reconstituted, re-compiled, re-interpreted in order for migration to work. However, in such settings, there may be some remedial or "swizzling" translation operations applied. For example, the physical hardware at node 2140 may differ from edge gateway node 2120 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 21 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 2120, some others at the edge resource node 2140, and others in the core data center 2150 or global network cloud 2160.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 2100 can include or be in communication with an edge provisioning node 2144. The edge provisioning node 2144 can distribute software such as the example computer readable instructions 2382 of FIG. 23B, to various receiving parties for implementing any of the methods described herein. The example edge provisioning node 2144 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 2144. For example, the entity that owns and/or operates the edge provisioning node 2144 may be a developer, a seller, and/or a licensor (or a customer and/or consumer thereof) of software instructions such as the example computer readable instructions 2382 of FIG. 23B. The receiving parties may be consumers, service providers, users, retailers, OEMs, etc., who purchase and/or license the software instructions for use and/or re-sale and/or sub-licensing.

In an example, edge provisioning node 2144 includes one or more servers and one or more storage devices. The storage devices host computer readable instructions such as the example computer readable instructions 2382 of FIG. 23B, as described below. Similar to the edge gateway devices 2120 described above, the one or more servers of the edge provisioning node 2144 are in communication with a base station 2142 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 2382 from the edge provisioning node 2144. For example, the software instructions, which may correspond to the example computer readable instructions 2382 of FIG. 23B, may be downloaded to the example processor platform/s, which is to execute the computer readable instructions 2382 to implement the methods described herein.

In some examples, the processor platform(s) that execute the computer readable instructions 2382 can be physically located in different geographic locations, legal jurisdictions, etc. In some examples, one or more servers of the edge provisioning node 2144 periodically offer, transmit, and/or force updates to the software instructions (e.g., the example computer readable instructions 2382 of FIG. 23B) to ensure improvements, patches, updates, etc. are distributed and applied to the software instructions implemented at the end user devices. In some examples, different components of the computer readable instructions 2382 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 22:
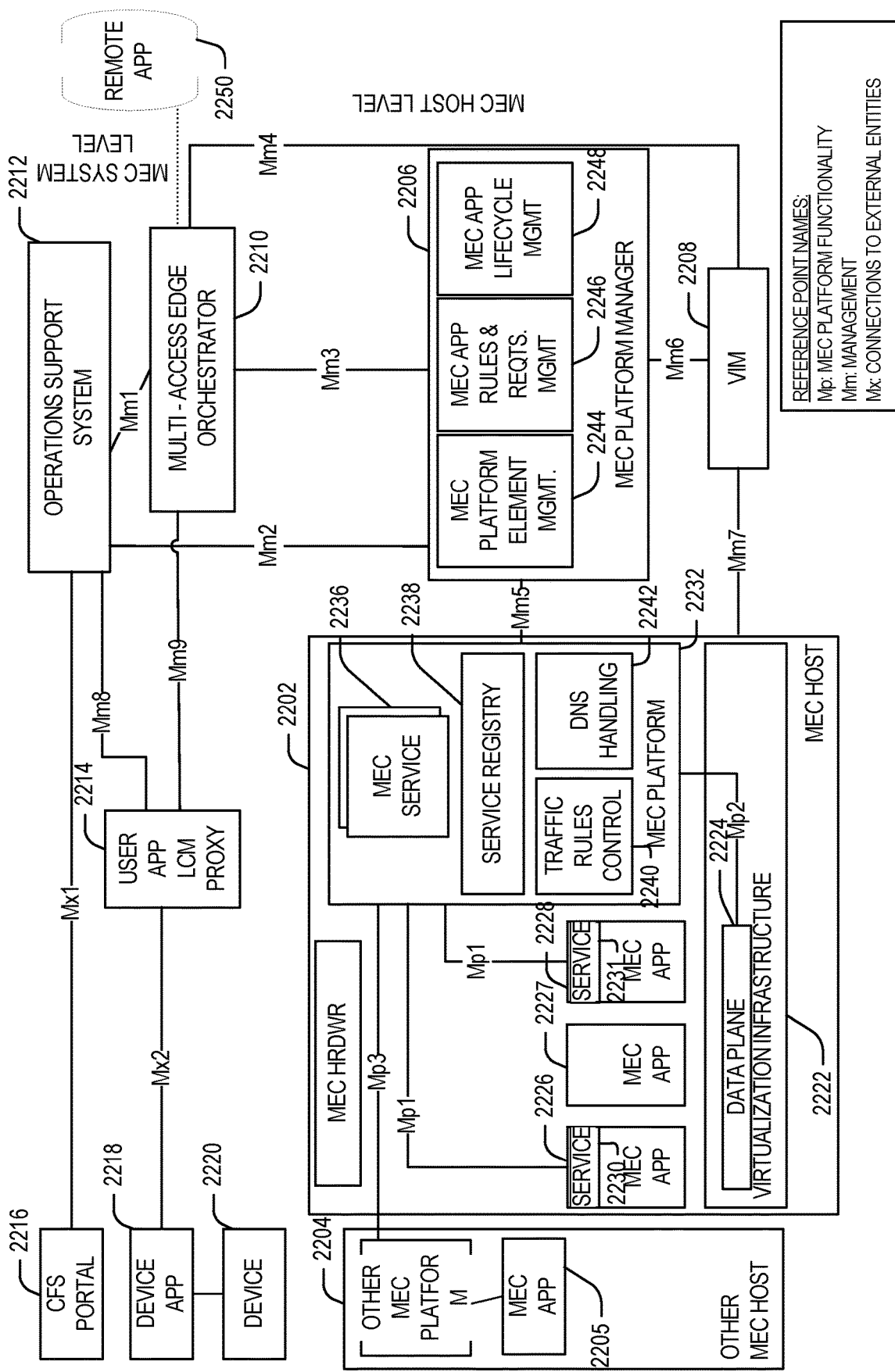
FIG. 22 illustrates an example mobile edge system reference architecture, arranged according to an ETSI Multi-Access Edge Computing (MEC) specification.

FIG. 22 illustrates a mobile edge system reference architecture (or MEC architecture) 2200, such as is indicated by ETSI MEC specifications. FIG. 22 specifically illustrates a MEC architecture 2200 with MEC hosts 2202 and 2204 providing functionalities in accordance with the ETSI GS MEC-003 specification. In some aspects, enhancements to the MEC platform 2232 and the MEC platform manager 2206 may be used for providing specific computing functions within the MEC architecture 2200. For example, the models 110-140, chiplets 310-390, 520-570, manager 510, 610, circuits 620-630, interfaces 570-580, 640, and/or other circuit components described above can be implemented using the example MEC architectures 2200.

Referring to FIG. 22, the MEC network architecture 2200 can include MEC hosts 2202 and 2204, a virtualization infrastructure manager (VIM) 2208, an MEC platform manager 2206, an MEC orchestrator 2210, an operations support system 2212, a user app proxy 2214, a UE app 2218 running on UE 2220, and CFS portal 2216. The MEC host 2202 can include a MEC platform 2232 with filtering rules control component 2240, a DNS handling component 2242, a service registry 2238, and MEC services 2236. The MEC services 2236 can include at least one scheduler, which can be used to select resources for instantiating MEC apps (or NFVs) 2226, 2227, and 2228 upon virtualization infrastructure 2222. The MEC apps 2226 and 2228 can be configured to provide services 2230 and 2231, which can include processing network communications traffic of different types associated with one or more wireless connections (e.g., connections to one or more RAN or telecom-core network entities). The MEC app 2205 instantiated within MEC host 2204 can be similar to the MEC apps 2226-2228 instantiated within MEC host 2202. The virtualization infrastructure 2222 includes a data plane 2224 coupled to the MEC platform via an MP2 interface. Additional interfaces between various network entities of the MEC architecture 2200 are illustrated in FIG. 22.

The MEC platform manager 2206 can include MEC platform element management component 2244, MEC app rules and requirements management component 2246, and MEC app lifecycle management component 2248. The various entities within the MEC architecture 2200 can perform functionalities as disclosed by the ETSI GS MEC-003 specification.

In some aspects, the remote application (or app) 2250 is configured to communicate with the MEC host 2202 (e.g., with the MEC apps 2226-2228) via the MEC orchestrator 2210 and the MEC platform manager 2206.

In further examples, any of the compute nodes or devices discussed with reference to the present edge computing systems and environment may be fulfilled based on the components depicted in FIGS. 23A and 23B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 23A:
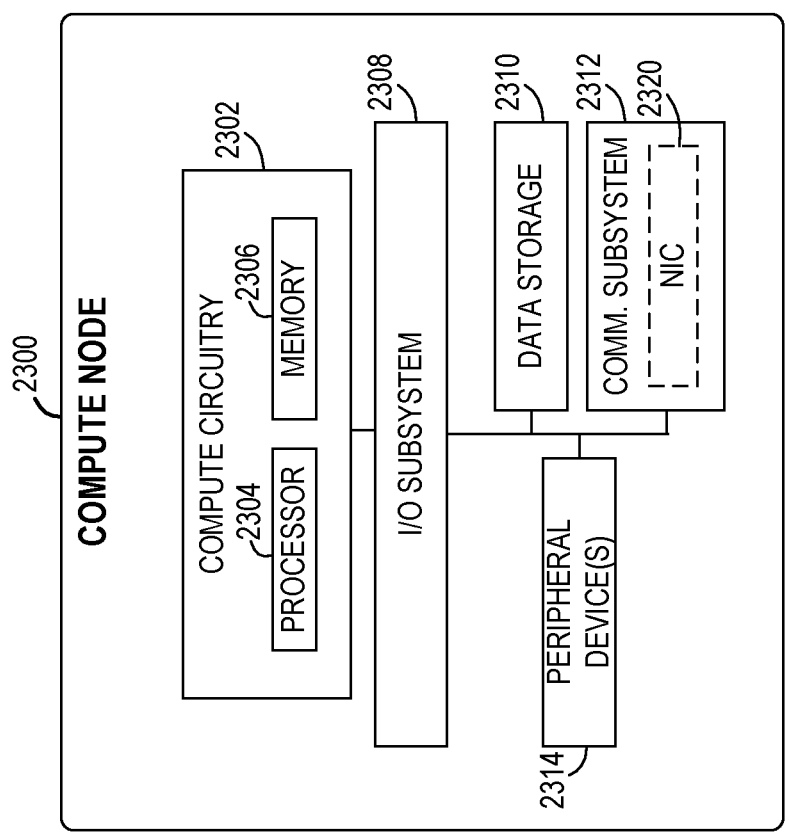
FIG. 23A provides an overview of example components for compute deployed at a compute node in an edge computing system.

In the simplified example depicted in FIG. 23A, an edge compute node 2300 includes a compute engine (also referred to herein as "compute circuitry") 2302, an input/output (I/O) subsystem 2308, data storage 2310, a communication circuitry subsystem 2312, and, optionally, one or more peripheral devices 2314. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 2300 may be embodied as any type of engine, device, or collection of devices capable of performing various compute functions. In some examples, the compute node 2300 may be embodied as a single device such as an integrated circuit, an embedded system, a field-programmable gate array (FPGA), a system-on-a-chip (SOC), or other integrated system or device. In the illustrative example, the compute node 2300 includes or is embodied as a processor 2304 and a memory 2306. The processor 2304 may be embodied as any type of processor capable of performing the functions described herein (e.g., executing an application). For example, the processor 2304 may be embodied as a multi-core processor(s), a microcontroller, a processing unit, a specialized or special purpose processing unit, or other processor or processing/controlling circuit.

In some examples, the processor 2304 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 2304 may work in coordination with each other to execute many types of operations and instructions within and on behalf of the compute node 2300.

The memory 2306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 2306 may be integrated into the processor 2304.

The memory 2306 may store various software and data used during operation such as one or more applications, data operated on by the application(s), libraries, and drivers.

The compute circuitry 2302 is communicatively coupled to other components of the compute node 2300 via the I/O subsystem 2308, which may be embodied as circuitry and/or components to facilitate input/output operations with the compute circuitry 2302 (e.g., with the processor 2304 and/or the main memory 2306) and other components of the compute circuitry 2302. For example, the I/O subsystem 2308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2308 may form a portion of a system-on-a-chip (SoC) and be incorporated, along with one or more of the processor 2304, the memory 2306, and other components of the compute circuitry 2302, into the compute circuitry 2302.

The one or more illustrative data storage devices 2310 may be embodied as any type of devices configured for short-term or long-term storage of data such as, for example, memory devices and circuits, memory cards, hard disk drives, solid-state drives, or other data storage devices. Individual data storage devices 2310 may include a system partition that stores data and firmware code for the data storage device 2310. Individual data storage devices 2310 may also include one or more operating system partitions that store data files and executables for operating systems depending on, for example, the type of compute node 2300.

The communication circuitry 2312 may be embodied as any communication circuit, device, or collection thereof, capable of enabling communications over a network between the compute circuitry 2302 and another compute device (e.g., an edge gateway of an implementing edge computing system). The communication circuitry 2312 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 2312 includes a network interface controller (NIC) 2320, which may also be referred to as a host fabric interface (HFI). The NIC 2320 may be embodied as one or more add-in-boards, daughter cards, network interface cards, controller chips, chipsets, or other devices that may be used by the compute node 2300 to connect with another compute device (e.g., an edge gateway node). In some examples, the NIC 2320 may be embodied as part of a system-on-a-chip (SoC) that includes one or more processors, or included on a multichip package that also contains one or more processors. In some examples, the MC 2320 may include a local processor (not shown) and/or a local memory (not shown) that are both local to the NIC 2320. In such examples, the local processor of the NIC 2320 may be capable of performing one or more of the functions of the compute circuitry 2302 described herein. Additionally, or alternatively, in such examples, the local memory of the NIC 2320 may be integrated into one or more components of the client compute node at the board level, socket level, chip level, and/or other levels.

Additionally, in some examples, a respective compute node 2300 may include one or more peripheral devices 2314. Such peripheral devices 2314 may include any type of peripheral device found in a compute device or server such as audio input devices, a display, other input/output devices, interface devices, and/or other peripheral devices, depending on the particular type of the compute node 2300. In further examples, the compute node 2300 may be embodied by a respective edge compute node (whether a client, gateway, or aggregation node) in an edge computing system or like forms of appliances, computers, subsystems, circuitry, or other components.

Figure 23B:
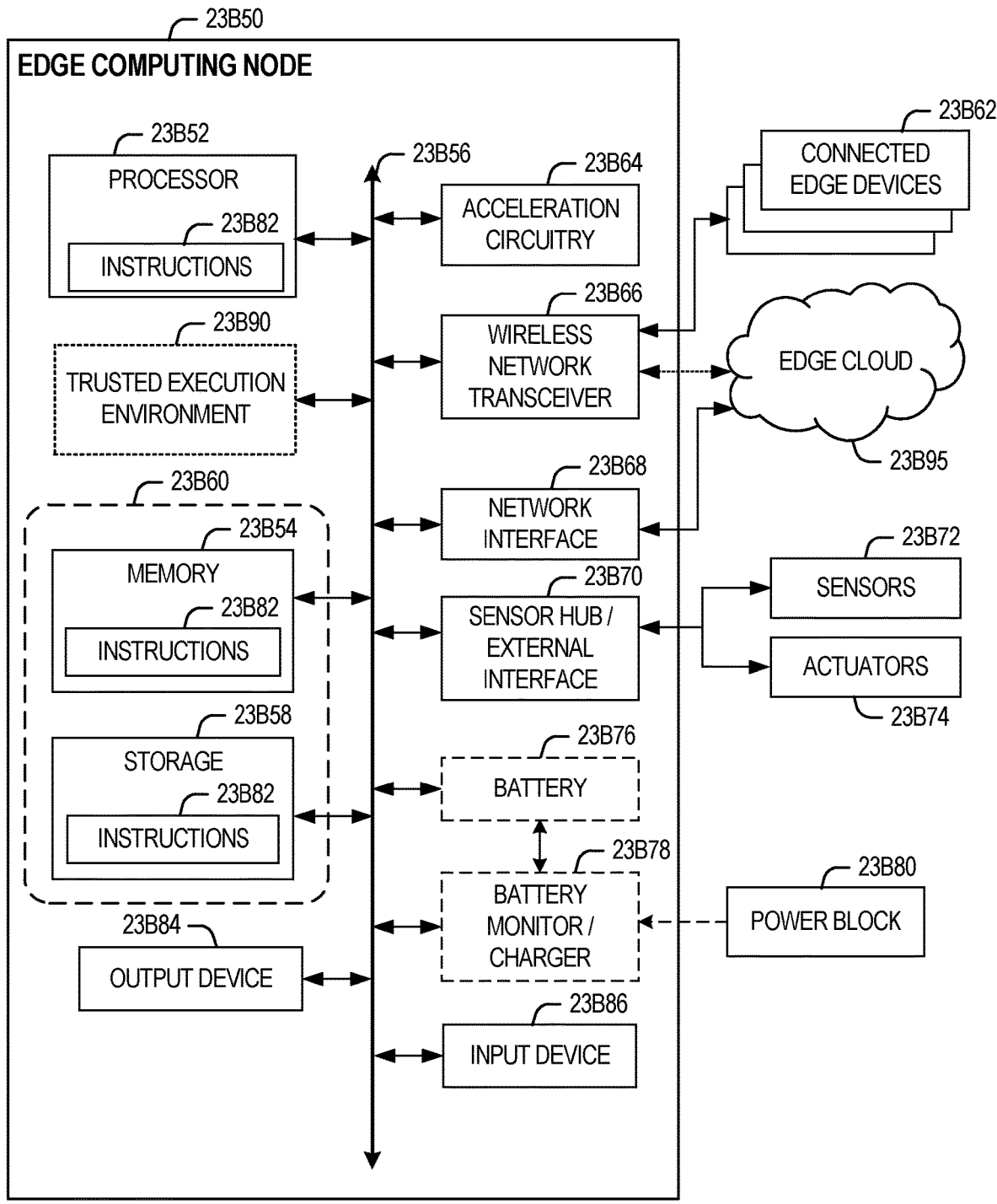
FIG. 23B provides a further overview of example components within a computing device in an edge computing system.

In a more detailed example, FIG. 23B illustrates a block diagram of an example of components that may be present in an edge computing node 2350 for implementing the techniques (e.g., operations, processes, methods, and methodologies) described herein. This edge computing node 2350 provides a closer view of the respective components of node 2300 when implemented as or as part of a computing device (e.g., as a mobile device, a base station, server, gateway, etc.). The edge computing node 2350 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 2350, or as components otherwise incorporated within a chassis of a larger system.

The edge computing device 2350 may include processing circuitry in the form of a processor 2352, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 2352 may be a part of a system on a chip (SoC) in which the processor 2352 and other components are formed into a single integrated circuit, or a single package, such as the Edison™ or Galileo™ SoC boards from Intel Corporation, Santa Clara, Calif. As an example, the processor 2352 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 2352 and accompanying circuitry may be provided in a single socket form factor, multiple socket form factor, or a variety of other formats, including in limited hardware configurations or configurations that include fewer than all elements shown in FIG. 23B.

The processor 2352 may communicate with a system memory 2354 over an interconnect 2356 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2358 may also couple to the processor 2352 via the interconnect 2356. In an example, the storage 2358 may be implemented via a solid-state disk drive (SSDD). Other devices that may be used for the storage 2358 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 2358 may be on-die memory or registers associated with the processor 2352. However, in some examples, the storage 2358 may be implemented using a micro hard disk drive (HDD). Further, any number of new technologies may be used for the storage 2358 in addition to, or instead of, the technologies described, such resistance change memories, phase change memories, holographic memories, or chemical memories, among others.

The components may communicate over the interconnect 2356. The interconnect 2356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2356 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 2356 may couple the processor 2352 to a transceiver 2366, for communications with the connected edge devices 2362. The transceiver 2366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 2366 (or multiple transceivers) may communicate using multiple standards or radios for communications at a different range. For example, the edge computing node 2350 may communicate with close devices, e.g., within about 10 meters, using a local transceiver based on Bluetooth Low Energy (BLE), or another low power radio, to save power. More distant connected edge devices 2362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2366 (e.g., a radio transceiver) may be included to communicate with devices or services in a cloud (e.g., an edge cloud 2395) via local or wide area network protocols. The wireless network transceiver 2366 may be a low-power wide-area (LPWA) transceiver that follows the IEEE 802.15.4, or IEEE 802.15.4 g standards, among others. The edge computing node 2350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2366, as described herein. For example, the transceiver 2366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 2366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 2368 may be included to provide a wired communication to nodes of the edge cloud 2395 or to other devices, such as the connected edge devices 2362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 2368 may be included to enable connecting to a second network, for example, a first NIC 2368 providing communications to the cloud over Ethernet, and a second NIC 2368 providing communications to other devices over another type of network.

Given the variety of types of applicable communications from the device to another component or network, applicable communications circuitry used by the device may include or be embodied by any one or more of components 2364, 2366, 2368, or 2370. Accordingly, in various examples, applicable means for communicating (e.g., receiving, transmitting, etc.) may be embodied by such communications circuitry.

The edge computing node 2350 may include or be coupled to acceleration circuitry 2364, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 2356 may couple the processor 2352 to a sensor hub or external interface 2370 that is used to connect additional devices or subsystems. The devices may include sensors 2372, such as accelerometers, level sensors, flow sensors, optical light sensors, camera sensors, temperature sensors, global navigation system (e.g., GPS) sensors, pressure sensors, barometric pressure sensors, and the like. The hub or interface 2370 further may be used to connect the edge computing node 2350 to actuators 2374, such as power switches, valve actuators, an audible sound generator, a visual warning device, and the like.

In some optional examples, various input/output (I/O) devices may be present within or connected to, the edge computing node 2350. For example, a display or other output device 2384 may be included to show information, such as sensor readings or actuator position. An input device 2386, such as a touch screen or keypad may be included to accept input. An output device 2384 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 2350. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2376 may power the edge computing node 2350, although, in examples in which the edge computing node 2350 is mounted in a fixed location, it may have a power supply coupled to an electrical grid, or the battery may be used as a backup or for temporary capabilities. The battery 2376 may be a lithium ion battery, or a metal-air battery, such as a zinc-air battery, an aluminum-air battery, a lithium-air battery, and the like.

A battery monitor/charger 2378 may be included in the edge computing node 2350 to track the state of charge (SoCh) of the battery 2376, if included. The battery monitor/charger 2378 may be used to monitor other parameters of the battery 2376 to provide failure predictions, such as the state of health (SoH) and the state of function (SoF) of the battery 2376. The battery monitor/charger 2378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2378 may communicate the information on the battery 2376 to the processor 2352 over the interconnect 2356. The battery monitor/charger 2378 may also include an analog-to-digital (ADC) converter that enables the processor 2352 to directly monitor the voltage of the battery 2376 or the current flow from the battery 2376. The battery parameters may be used to determine actions that the edge computing node 2350 may perform, such as transmission frequency, mesh network operation, sensing frequency, and the like.

A power block 2380, or other power supply coupled to a grid, may be coupled with the battery monitor/charger 2378 to charge the battery 2376. In some examples, the power block 2380 may be replaced with a wireless power receiver to obtain the power wirelessly, for example, through a loop antenna in the edge computing node 2350. A wireless battery charging circuit, such as an LTC4020 chip from Linear Technologies of Milpitas, Calif., among others, may be included in the battery monitor/charger 2378. The specific charging circuits may be selected based on the size of the battery 2376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2358 may include instructions 2382 in the form of software, firmware, or hardware commands to implement the techniques described herein. Although such instructions 2382 are shown as code blocks included in the memory 2354 and the storage 2358, it may be understood that any of the code blocks may be replaced with hardwired circuits, for example, built into an application specific integrated circuit (ASIC).

In an example, the instructions 2382 provided via the memory 2354, the storage 2358, or the processor 2352 may be embodied as a non-transitory, machine-readable medium 2360 including code to direct the processor 2352 to perform electronic operations in the edge computing node 2350. The processor 2352 may access the non-transitory, machine-readable medium 2360 over the interconnect 2356. For instance, the non-transitory, machine-readable medium 2360 may be embodied by devices described for the storage 2358 or may include specific storage units such as optical disks, flash drives, or any number of other hardware devices. The non-transitory, machine-readable medium 2360 may include instructions to direct the processor 2352 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 2382 on the processor 2352 (separately, or in combination with the instructions 2382 of the machine readable medium 2360) may configure execution or operation of a trusted execution environment (TEE) 2390. In an example, the TEE 2390 operates as a protected area accessible to the processor 2352 for secure execution of instructions and secure access to data. Various implementations of the TEE 2390, and an accompanying secure area in the processor 2352 or the memory 2354 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 2350 through the TEE 2390 and the processor 2352.

Figure 24:
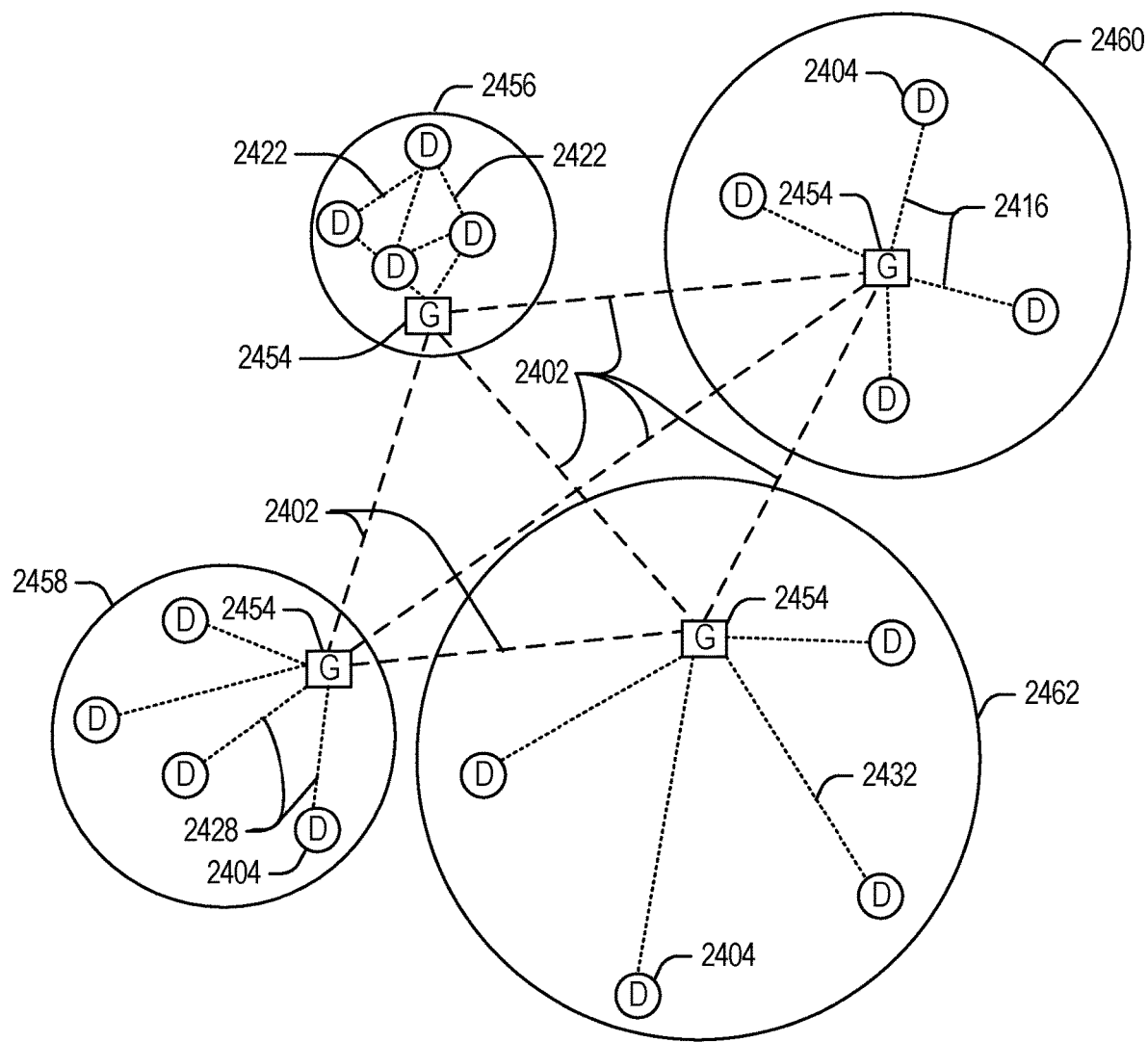
FIG. 24 illustrates a domain topology for respective internet-of-things (IoT) networks coupled through links to respective gateways, according to an example.

FIG. 24 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 25:
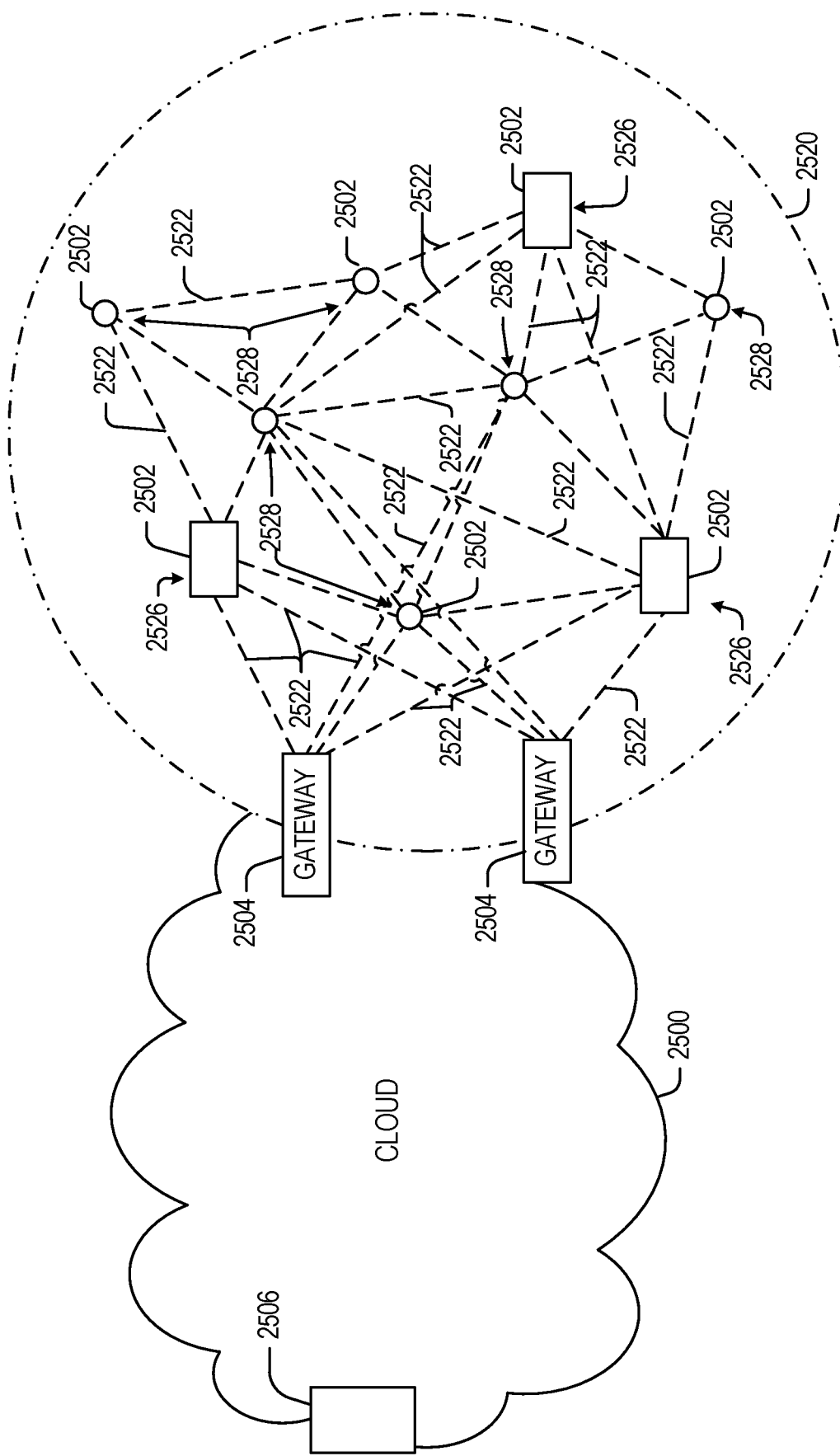
FIG. 25 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time, or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 24 and 25, present a number of new challenges in a heterogeneous network of connectivity comprising a combination of wired and wireless technologies.

FIG. 24 specifically provides a simplified drawing of a domain topology that may be used for a number of internet-of-things (IoT) networks comprising IoT devices 2404, with the IoT networks 2456, 2458, 2460, 2462, coupled through backbone links 2402 to respective gateways 2454. For example, a number of IoT devices 2404 may communicate with a gateway 2454, and with each other through the gateway 2454. To simplify the drawing, not every IoT device 2404, or communications link (e.g., link 2416, 2422, 2428, or 2432) is labeled. The backbone links 2402 may include any number of wired or wireless technologies, including optical networks, and may be part of a local area network (LAN), a wide area network (WAN), or the Internet. Additionally, such communication links facilitate optical signal paths among both IoT devices 2404 and gateways 2454, including the use of MUXing/deMUXing components that facilitate interconnection of the various devices.

The network topology may include any number of types of IoT networks, such as a mesh network provided with the network 2456 using Bluetooth low energy (BLE) links 2422. Other types of IoT networks that may be present include a wireless local area network (WLAN) network 2458 used to communicate with IoT devices 2404 through IEEE 802.11 (Wi-Fi®) links 2428, a cellular network 2460 used to communicate with IoT devices 2404 through an LTE/LTE-A (4G) or 5G cellular network, and a low-power wide area (LPWA) network 2462, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 2404, such as over the backbone links 2402, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration, and quality of service (QoS) based swarming and fusion of resources. Some of the individual examples of network-based resource processing include the following.

The mesh network 2456, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 2458, for instance, may use systems that perform standards conversion to provide multi-standard connectivity, enabling IoT devices 2404 using different protocols to communicate. Further systems may provide seamless interconnectivity across a multi-standard infrastructure comprising visible Internet resources and hidden Internet resources.

Communications in the cellular network 2460, for instance, may be enhanced by systems that offload data, extend communications to more remote devices, or both. The LPWA network 2462 may include systems that perform non-Internet protocol (IP) to IP interconnections, addressing, and routing. Further, each of the IoT devices 2404 may include the appropriate transceiver for wide area communications with that device. Further, each IoT device 2404 may include other transceivers for communications using additional protocols and frequencies. This is discussed further with respect to the communication environment and hardware of an IoT processing device depicted in FIGS. 26 and 27.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 25 below.

FIG. 25 illustrates a cloud computing network in communication with a mesh network of IoT devices (devices 2502) operating as a fog platform in a networked scenario. The mesh network of IoT devices may be termed a fog network 2520, established from a network of devices operating at the edge of the cloud 2500. To simplify the diagram, not every IoT device 2502 is labeled.

The fog network 2520 may be considered to be a massively interconnected network wherein a number of IoT devices 2502 are in communications with each other, for example, by radio links 2522. The fog network 2520 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 2520 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 2502 are shown in this example, gateways 2504, data aggregators 2526, and sensors 2528, although any combinations of IoT devices 2502 and functionality may be used. The gateways 2504 may be edge devices that provide communications between the cloud 2500 and the fog network 2520, and may also provide the backend process function for data obtained from sensors 2528, such as motion data, flow data, temperature data, and the like. The data aggregators 2526 may collect data from any number of the sensors 2528, and perform the back end processing function for the analysis. The results, raw data, or both may be passed along to the cloud 2500 through the gateways 2504. The sensors 2528 may be full IoT devices 2502, for example, capable of both collecting data and processing the data. In some cases, the sensors 2528 may be more limited in functionality, for example, collecting the data and allowing the data aggregators 2526 or gateways 2504 to process the data.

Communications from any IoT device 2502 may be passed along a convenient path between any of the IoT devices 2502 to reach the gateways 2504. In these networks, the number of interconnections provide substantial redundancy, allowing communications to be maintained, even with the loss of a number of IoT devices 2502. Further, the use of a mesh network may allow IoT devices 2502 that are very low power or located at a distance from infrastructure to be used, as the range to connect to another IoT device 2502 may be much less than the range to connect to the gateways 2504.

The fog network 2520 provided from these IoT devices 2502 may be presented to devices in the cloud 2500, such as a server 2506, as a single device located at the edge of the cloud 2500, e.g., a fog network operating as a device or platform. In this example, the alerts coming from the fog platform may be sent without being identified as coming from a specific IoT device 2502 within the fog network 2520. In this fashion, the fog network 2520 may be considered a distributed platform that provides computing and storage resources to perform processing or data-intensive tasks such as data analytics, data aggregation, and machine-learning, among others.

In some examples, the IoT devices 2502 may be configured using an imperative programming style, e.g., with each IoT device 2502 having a specific function and communication partners. However, the IoT devices 2502 forming the fog platform may be configured in a declarative programming style, enabling the IoT devices 2502 to reconfigure their operations and communications, such as to determine needed resources in response to conditions, queries, and device failures. As an example, a query from a user located at a server 2506 about the operations of a subset of equipment monitored by the IoT devices 2502 may result in the fog network 2520 device the IoT devices 2502, such as particular sensors 2528, needed to answer the query. The data from these sensors 2528 may then be aggregated and analyzed by any combination of the sensors 2528, data aggregators 2526, or gateways 2504, before being sent on by the fog network 2520 to the server 2506 to answer the query. In this example, IoT devices 2502 in the fog network 2520 may select the sensors 2528 used based on the query, such as adding data from flow sensors or temperature sensors. Further, if some of the IoT devices 2502 are not operational, other IoT devices 2502 in the fog network 2520 may provide analogous data, if available.

In other examples, the operations and functionality described herein may be embodied by an IoT or edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 26:
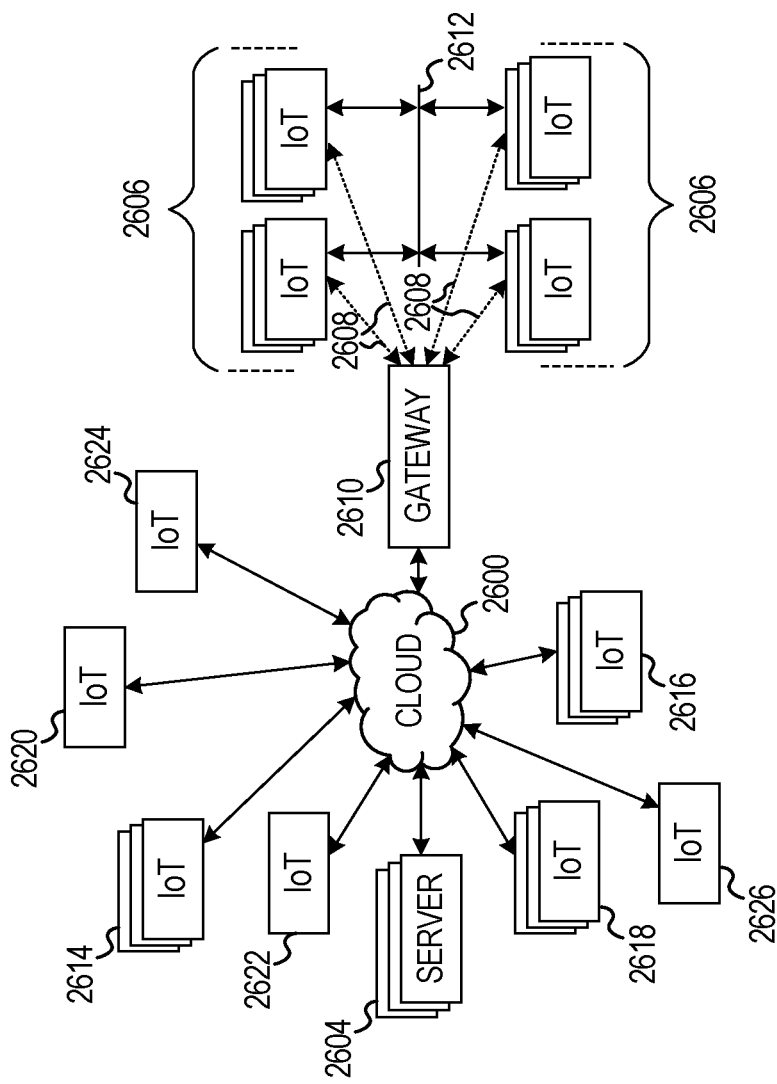
FIG. 26 illustrates a drawing of a cloud computing network, or cloud, in communication with a number of Internet of Things (IoT) devices, according to an example.

FIG. 26 illustrates a drawing of a cloud computing network, or cloud 2600, in communication with a number of Internet of Things (IoT) devices. The cloud 2600 may represent the Internet, or may be a local area network (LAN), or a wide area network (WAN), such as a proprietary network for a company. The IoT devices may include any number of different types of devices, grouped in various combinations. For example, a traffic control group 2606 may include IoT devices along streets in a city. These IoT devices may include stoplights, traffic flow monitors, cameras, weather sensors, and the like. The traffic control group 2606, or other subgroups, may be in communication with the cloud 2600 through wired or wireless links 2608, such as LPWA links, and the like. Further, a wired or wireless sub-network 2612 may allow the IoT devices to communicate with each other, such as through a local area network, a wireless local area network, and the like. The IoT devices may use another device, such as a gateway 2610 or 2628 to communicate with remote locations such as the cloud 2600; the IoT devices may also use one or more servers 2630 to facilitate communication with the cloud 2600 or with the gateway 2610. For example, the one or more servers 2630 may operate as an intermediate network node to support a local edge cloud or fog implementation among a local area network. Further, the gateway 2628 that is depicted may operate in a cloud-to-gateway-to-many edge devices configuration, such as with the various IoT devices 2614, 2620, 2624 being constrained or dynamic to an assignment and use of resources in the cloud 2600.

Other example groups of IoT devices may include remote weather stations 2614, local information terminals 2616, alarm systems 2618, automated teller machines 2620, alarm panels 2622, or moving vehicles, such as emergency vehicles 2624 or other vehicles 2626, among many others. Each of these IoT devices may be in communication with other IoT devices, with servers 2604, with another IoT fog device or system (not shown, but depicted in FIG. 25), or a combination therein. The groups of IoT devices may be deployed in various residential, commercial, and industrial settings (including in both private or public environments).

As may be seen from FIG. 26, a large number of IoT devices may be communicating through the cloud 2600. This may allow different IoT devices to request or provide information to other devices autonomously. For example, a group of IoT devices (e.g., the traffic control group 2606) may request a current weather forecast from a group of remote weather stations 2614, which may provide the forecast without human intervention. Further, an emergency vehicle 2624 may be alerted by an automated teller machine 2620 that a burglary is in progress. As the emergency vehicle 2624 proceeds towards the automated teller machine 2620, it may access the traffic control group 2606 to request clearance to the location, for example, by lights turning red to block cross traffic at an intersection in sufficient time for the emergency vehicle 2624 to have unimpeded access to the intersection.

Clusters of IoT devices, such as the remote weather stations 2614 or the traffic control group 2606, may be equipped to communicate with other IoT devices as well as with the cloud 2600. This may allow the IoT devices to form an ad-hoc network between the devices, allowing them to function as a single device, which may be termed a fog device or system (e.g., as described above with reference to FIG. 25).

Figure 27:
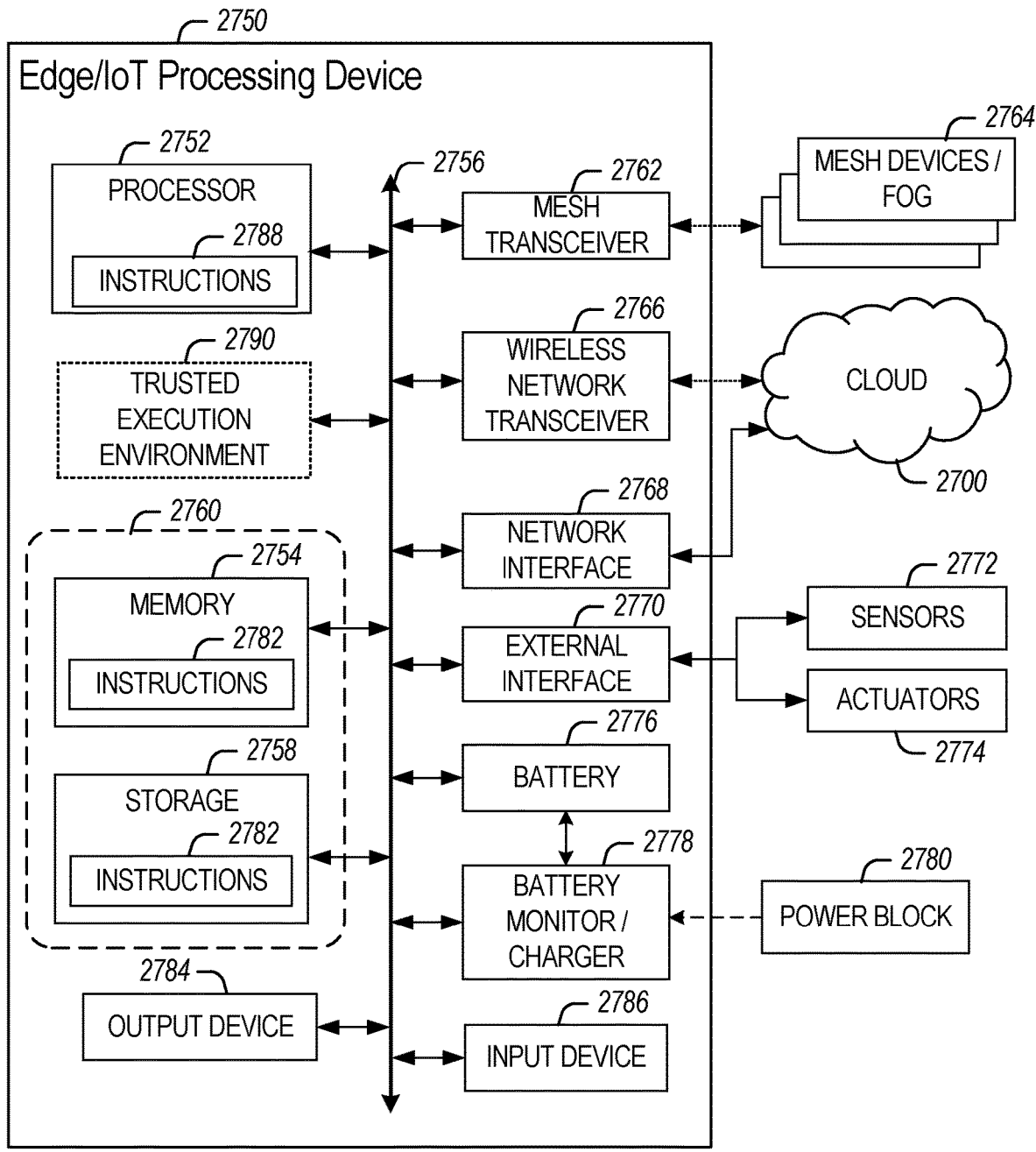
FIG. 27 illustrates a block diagram for an example IoT processing system architecture upon which any one or more of the techniques (e.g., operations, processes, methods, and methodologies) discussed herein may be performed, according to an example.

FIG. 27 is a block diagram of an example of components that may be present in an IoT device 2750 for implementing the techniques described herein. The IoT device 2750 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2750, or as components otherwise incorporated within a chassis of a larger system. Additionally, the block diagram of FIG. 27 is intended to depict a high-level view of components of the IoT device 2750. However, some of the components shown may be omitted, additional components may be present, and different arrangement of the components shown may occur in other implementations.

The IoT device 2750 may include processing circuitry in the form of a processor 2752, which may be a microprocessor, a multi-core processor, a multithreaded processor, an ultra-low voltage processor, an embedded processor, or other known processing elements. The processor 2752 may be a part of a system on a chip (SoC) in which the processor 2752 and other components are formed into a single integrated circuit, or a single package, such as the Edison™ or Galileo™ SoC boards from Intel. As an example, the processor 2752 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 2752 may communicate with a system memory 2754 over an interconnect 2756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2758 may also couple to the processor 2752 via the interconnect 2756. In an example the storage 2758 may be implemented via a solid state disk drive (SSDD). Other devices that may be used for the storage 2758 include flash memory cards, such as SD cards, microSD cards, xD picture cards, and the like, and USB flash drives. In low power implementations, the storage 2758 may be on-die memory or registers associated with the processor 2752. However, in some examples, the storage 2758 may be implemented using a micro hard disk drive (HDD). Further, any number of new technologies may be used for the storage 2758 in addition to, or instead of, the technologies described, such resistance change memories, phase change memories, holographic memories, or chemical memories, among others.

The components may communicate over the interconnect 2756. The interconnect 2756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2756 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more components 2762, 2766, 2768, or 2770. Accordingly, in various examples, applicable means for communicating (e.g., receiving, transmitting, etc.) may be embodied by such communications circuitry.

The interconnect 2756 may couple the processor 2752 to a mesh transceiver 2762, for communications with other mesh devices 2764. The mesh transceiver 2762 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2764. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 2762 may communicate using multiple standards or radios for communications at different range. For example, the IoT device 2750 may communicate with close devices, e.g., within about 10 meters, using a local transceiver based on BLE, or another low power radio, to save power. More distant mesh devices 2764, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2766 may be included to communicate with devices or services in the cloud 2700 via local or wide area network protocols. The wireless network transceiver 2766 may be a LPWA transceiver that follows the IEEE 802.15.4, or IEEE 802.15.4 g standards, among others. The IoT device 2750 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2762 and wireless network transceiver 2766, as described herein. For example, the radio transceivers 2762 and 2766 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2762 and 2766 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2766, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2768 may be included to provide a wired communication to the cloud 2700 or to other devices, such as the mesh devices 2764. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2768 may be included to allow connect to a second network, for example, a NIC 2768 providing communications to the cloud over Ethernet, and a second NIC 2768 providing communications to other devices over another type of network.

The interconnect 2756 may couple the processor 2752 to an external interface 2770 that is used to connect external devices or subsystems. The external devices may include sensors 2772, such as accelerometers, level sensors, flow sensors, optical light sensors, camera sensors, temperature sensors, a global positioning system (GPS) sensors, pressure sensors, barometric pressure sensors, and the like. The external interface 2770 further may be used to connect the IoT device 2750 to actuators 2774, such as power switches, valve actuators, an audible sound generator, a visual warning device, and the like.

In some optional examples, various input/output (I/O) devices may be present within, or connected to, the IoT device 2750. For example, a display or other output device 2784 may be included to show information, such as sensor readings or actuator position. An input device 2786, such as a touch screen or keypad may be included to accept input. An output device 2786 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2750.

A battery 2776 may power the IoT device 2750, although in examples in which the IoT device 2750 is mounted in a fixed location, it may have a power supply coupled to an electrical grid. The battery 2776 may be a lithium ion battery, or a metal-air battery, such as a zinc-air battery, an aluminum-air battery, a lithium-air battery, and the like.

A battery monitor/charger 2778 may be included in the IoT device 2750 to track the state of charge (SoCh) of the battery 2776. The battery monitor/charger 2778 may be used to monitor other parameters of the battery 2776 to provide failure predictions, such as the state of health (SoH) and the state of function (SoF) of the battery 2776. The battery monitor/charger 2778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 2778 may communicate the information on the battery 2776 to the processor 2752 over the interconnect 2756. The battery monitor/charger 2778 may also include an analog-to-digital (ADC) convertor that allows the processor 2752 to directly monitor the voltage of the battery 2776 or the current flow from the battery 2776. The battery parameters may be used to determine actions that the IoT device 2750 may perform, such as transmission frequency, mesh network operation, sensing frequency, and the like.

A power block 2780, or other power supply coupled to a grid, may be coupled with the battery monitor/charger 2778 to charge the battery 2776. In some examples, the power block 2780 may be replaced with a wireless power receiver to obtain the power wirelessly, for example, through a loop antenna in the IoT device 2750. A wireless battery charging circuit, such as an LTC4020 chip from Linear Technologies of Milpitas, Calif., among others, may be included in the battery monitor/charger 2778. The specific charging circuits chosen depend on the size of the battery 2776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2758 may include instructions 2782 in the form of software, firmware, or hardware commands to implement the techniques described herein. Although such instructions 2782 are shown as code blocks included in the memory 2754 and the storage 2758, it may be understood that any of the code blocks may be replaced with hardwired circuits, for example, built into an application specific integrated circuit (ASIC).

In an example, the instructions 2782 provided via the memory 2754, the storage 2758, or the processor 2752 may be embodied as a non-transitory, machine readable medium 2760 including code to direct the processor 2752 to perform electronic operations in the IoT device 2750. The processor 2752 may access the non-transitory, machine readable medium 2760 over the interconnect 2756. For instance, the non-transitory, machine readable medium 2760 may be embodied by devices described for the storage 2758 of FIG. 27 or may include specific storage units such as optical disks, flash drives, or any number of other hardware devices. The non-transitory, machine readable medium 2760 may include instructions to direct the processor 2752 to perform a specific sequence or flow of actions, for example, as described with respect to the flowchart(s) and block diagram(s) of operations and functionality depicted above.

Also in a specific example, the instructions 2788 on the processor 2752 (separately, or in combination with the instructions 2788 of the machine readable medium 2760) may configure execution or operation of a trusted execution environment (TEE) 2790. In an example, the TEE 2790 operates as a protected area accessible to the processor 2752 for secure execution of instructions and secure access to data. Various implementations of the TEE 2790, and an accompanying secure area in the processor 2752 or the memory 2754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 2750 through the TEE 2790 and the processor 2752.

Figure 28:
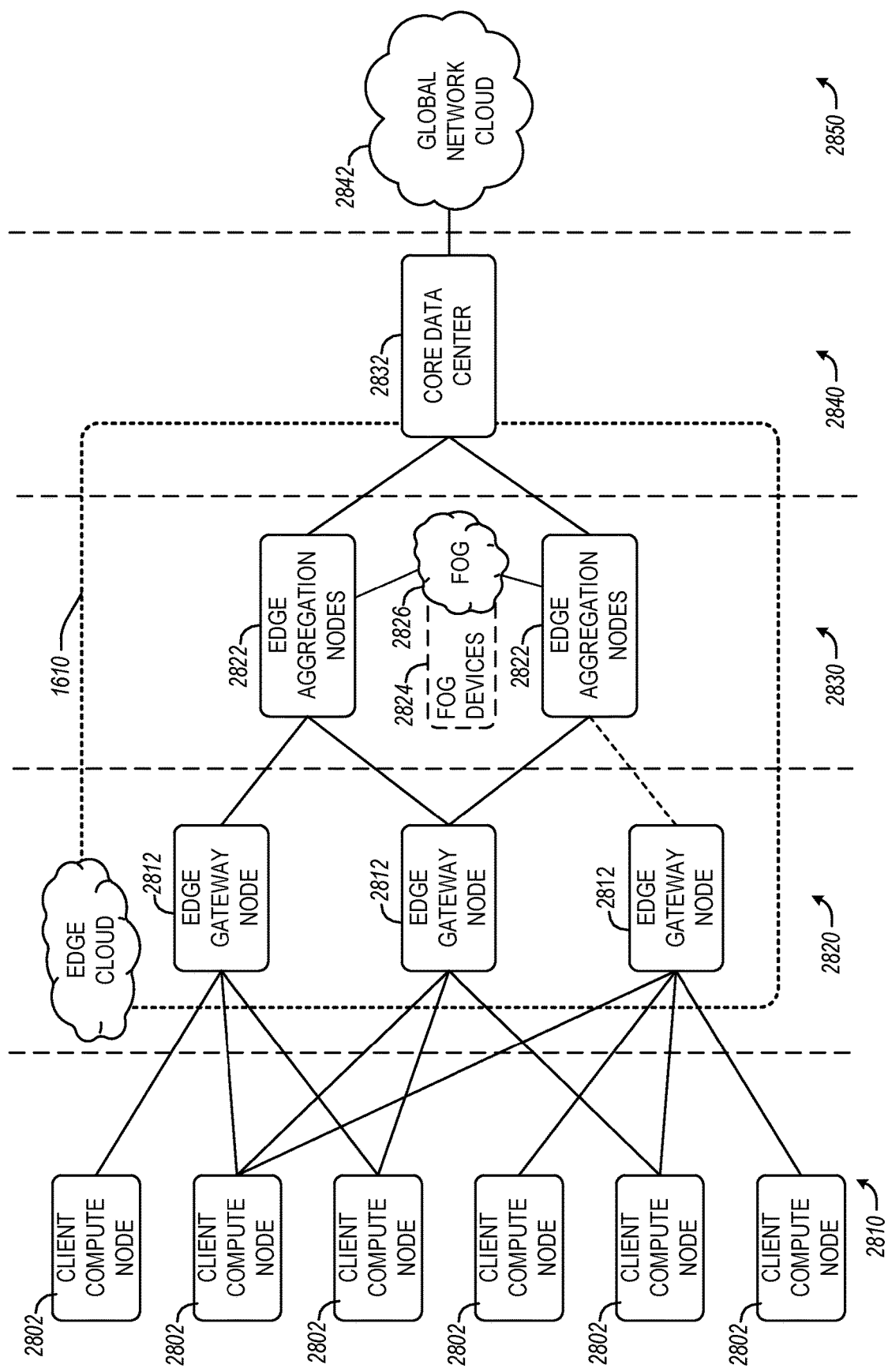
FIG. 28 illustrates an overview of layers of distributed compute deployed among an edge computing system, according to an example.

At a more generic level, an edge computing system may be described to encompass any number of deployments operating in an edge cloud 1610, which provide coordination from client and distributed computing devices. FIG. 28 provides a further abstracted overview of layers of distributed compute deployed among an edge computing environment for purposes of illustration.

FIG. 28 generically depicts an edge computing system for providing edge services and applications to multi-stakeholder entities, as distributed among one or more client compute nodes 2802, one or more edge gateway nodes 2812, one or more edge aggregation nodes 2822, one or more core data centers 2832, and a global network cloud 2842, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 2810, 2820, 2830, 2840, 2850. For example, the client compute nodes 2802 are each located at an endpoint layer 2810, while each of the edge gateway nodes 2812 are located at an edge devices layer 2820 (local level) of the edge computing system. Additionally, each of the edge aggregation nodes 2822 (and/or fog devices 2824, if arranged or operated with or among a fog networking configuration 2826) are located at a network access layer 2830 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 2832 is located at a core network layer 2840 (e.g., a regional or geographically-central level), while the global network cloud 2842 is located at a cloud data center layer 2850 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 2832 may be located within, at, or near the edge cloud 1610.

Although an illustrative number of client compute nodes 2802, edge gateway nodes 2812, edge aggregation nodes 2822, core data centers 2832, global network clouds 2842 are shown in FIG. 28, it should be appreciated that the edge computing system may include more or fewer devices or systems at each layer. Additionally, as shown in FIG. 28, the number of components of each layer 2810, 2820, 2830, 2840, 2850 generally increases at each lower level (i.e., when moving closer to endpoints). As such, one edge gateway node 2812 may service multiple client compute nodes 2802, and one edge aggregation node 2822 may service multiple edge gateway nodes 2812.

Consistent with the examples provided herein, each client compute node 2802 may be embodied as any type of end point component, device, appliance, or "thing" capable of communicating as a producer or consumer of data. Further, the label "node" or "device" as used in the edge computing system 2800 does not necessarily mean that such node or device operates in a client or agent/minion/follower role; rather, any of the nodes or devices in the edge computing system 2800 refer to individual entities, nodes, or subsystems which include discrete or connected hardware or software configurations to facilitate or use the edge cloud 1610.

As such, the edge cloud 1610 is formed from network components and functional features operated by and within the edge gateway nodes 2812 and the edge aggregation nodes 2822 of layers 2820, 2830, respectively. The edge cloud 1610 may be embodied as any type of network that provides edge computing and/or storage resources which are proximately located to radio access network (RAN) capable endpoint devices (e.g., mobile computing devices, IoT devices, smart devices, etc.), which are shown in FIG. 28 as the client compute nodes 2802. In other words, the edge cloud 1610 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1610 may form a portion of or otherwise provide an ingress point into or across a fog networking configuration 2826 (e.g., a network of fog devices 2824, not shown in detail), which may be embodied as a system-level horizontal and distributed architecture that distributes resources and services to perform a specific function. For instance, a coordinated and distributed network of fog devices 2824 may perform computing, storage, control, or networking aspects in the context of an IoT system arrangement. Other networked, aggregated, and distributed functions may exist in the edge cloud 1610 between the cloud data center layer 2850 and the client endpoints (e.g., client compute nodes 2802). Some of these are discussed in the following sections in the context of network functions or service virtualization, including the use of virtual edges and virtual services which are orchestrated for multiple stakeholders.

The edge gateway nodes 2812 and the edge aggregation nodes 2822 cooperate to provide various edge services and security to the client compute nodes 2802. Furthermore, because each client compute node 2802 may be stationary or mobile, each edge gateway node 2812 may cooperate with other edge gateway devices to propagate presently provided edge services and security as the corresponding client compute node 2802 moves about a region. To do so, each of the edge gateway nodes 2812 and/or edge aggregation nodes 2822 may support multiple tenancy and multiple stakeholder configurations, in which services from (or hosted for) multiple service providers and multiple consumers may be supported and coordinated across a single or multiple compute devices.

From the foregoing, it will be appreciated that example methods, apparatus, systems, and articles of manufacture have been disclosed that provide security, attestation, and other protection of hardware and software of a computing apparatus and/or other processing infrastructure. Certain examples use tokens to form authenticated interfaces providing access to attested, authorized circuits. Certain examples obscure and dynamically resolve links between domains to enable cross-domain exercise of functionality, content, etc., while obscuring and protecting a source of such functionality, content, etc. Certain examples provide improved systems and methods for model pipeline and supply chain management through manifest-driven protection of models and other content. As such, the disclosed methods, apparatus, systems, and articles of manufacture improve the security and effectiveness of using a computing device across a system formed from different sources in different domains. Cross-domain interaction is achieved while safeguarding the integrity and privacy of the source device. Disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to dynamically control orchestration of meshes in a cloud-edge computing environment are disclosed herein. Further examples and combinations thereof include the following:

Example 1 is a computer apparatus including a first circuit including a first interface, the first circuit associated with a first domain; a second circuit including a second interface, the second circuit associated with a second domain; and a chip manager to generate a first authenticated interface for the first interface using a first token and to generate a second authenticated interface for the second interface using a second token to enable communication between the first authenticated interface and the second authenticated interface.

Example 2 includes the example computer apparatus of example 1, wherein the computer apparatus is a system on a chip.

Example 3 includes the computer apparatus of example 1, wherein the computer apparatus is a multi-chip package.

Example 4 includes the computer apparatus of example 1, wherein at least one of the first circuit or the second circuit is a chiplet.

Example 5 includes the computer apparatus of example 1, further including a third circuit associated with the first domain, the third circuit including a third interface to communicate with the first interface.

Example 6 includes the computer apparatus of example 1, wherein at least one of the first circuit or the second circuit includes a manifest including attestation rules.

Example 7 includes the computer apparatus of example 1, wherein the first circuit includes a first model and the second circuit includes a second model.

Example 8 includes the computer apparatus of example 7, wherein the first model is in a first sandbox associated with a first secure node and the second model is in a second sandbox associated with a second secure node.

Example 9 includes the computer apparatus of example 7, wherein the first model and the second model are represented as elements in a composite manifest relating the first circuit and the second circuit.

Example 10 includes the computer apparatus of example 1, wherein the first circuit includes a first function call and the second circuit includes software code defining the first function, wherein access of the first circuit to the software code is validated to dynamically provide an address to the first circuit to execute the software code defining the first function.

Example 11 includes the computer apparatus of example 10, wherein the address is dynamically resolved at a first execution of the first function call and stored in a table for a second execution.

Example 12 includes the computer apparatus of example 1, wherein the first circuit is to customize the first authenticated interface using a salt value.

Example 13 is at least one non-transitory computer readable storage medium including instructions that, when executed, cause at least one processor to at least: generate a first authenticated interface for a first interface of a first circuit using a first token, the first circuit associated with a first domain; generate a second authenticated interface for a second interface of a second circuit using a second token, the second circuit associated with a second domain; and enable communication between the first circuit and the second circuit using the first authenticated interface and the second authenticated interface to execute a first function.

Example 14 includes the at least one non-transitory computer readable storage medium of example 13, wherein the instructions, when executed, cause the at least one processor to facilitate communication between the first circuit and a third circuit, the third circuit associated with the first domain, the third circuit including a third interface to communicate with the first interface.

Example 15 includes the at least one non-transitory computer readable storage medium of example 13, wherein the instructions, when executed, cause the at least one processor to assemble a composite manifest including representations of the first circuit and second circuit as elements, the first circuit including a first model and the second circuit including a second model.

Example 16 includes the at least one non-transitory computer readable storage medium of example 13, wherein the first circuit includes a first function call and the second circuit includes software code defining the first function, and wherein the instructions, when executed, cause the at least one processor to dynamically provide an address to execute the software code when access of the first circuit to the software code is validated.

Example 17 includes the at least one non-transitory computer readable storage medium of example 16, wherein the address is dynamically resolved at a first execution of the first function call, and wherein the instructions, when executed, cause the at least one processor to store the address in a table for a second execution.

Example 18 includes the at least one non-transitory computer readable storage medium of example 13, wherein the instructions, when executed, cause the at least one processor to customize the first authenticated interface using a salt value.

Example 19 is a method including: generating, by executing an instruction with at least one processor, a first authenticated interface for a first interface of a first circuit using a first token, the first circuit associated with a first domain; generating, by executing an instruction with the at least one processor, a second authenticated interface for a second interface of a second circuit using a second token, the second circuit associated with a second domain; and enabling communication between the first circuit and the second circuit using the first authenticated interface and the second authenticated interface to execute a first function.

Example 20 includes the method of example 19, further including assembling a composite manifest including representations of the first circuit and second circuit as elements, the first circuit including a first model and the second circuit including a second model.

Example 21 includes the method of example 19, wherein the first circuit includes a first function call and the second circuit includes software code defining the first function, and wherein the method further includes dynamically providing an address to execute the software code when access of the first circuit to the software code is validated.

Example 22 includes the method of example 19, further including customizing the first authenticated interface using a salt value.

Example 23 is an apparatus including: memory circuitry to include instructions; and at least one processor to execute the instructions to at least: generate a first authenticated interface for a first interface of a first circuit using a first token, the first circuit associated with a first domain; generate a second authenticated interface for a second interface of a second circuit using a second token, the second circuit associated with a second domain; and enable communication between the first circuit and the second circuit using the first authenticated interface and the second authenticated interface to execute a first function.

Example 24 is an apparatus including: means for generating a first authenticated interface for a first interface of a first circuit using a first token and a second authenticated interface for a second interface of a second circuit using a second token, the first circuit associated with a first domain and the second circuit associated with a second domain; and means for enabling communication between the first circuit and the second circuit using the first authenticated interface and the second authenticated interface to execute a first function.

Example 25 is an apparatus including a first circuit including a first authenticated interface, the first circuit associated with a first domain; a second circuit including a second authenticated interface, the second circuit associated with a second domain; and a manager to use a token to enable communication between the first authenticated interface and the second authenticated interface.

Example 26 includes any of examples 1-25, implemented on an edge node in a computing architecture.

Example 27 includes any of examples 1-15, implemented on an IoT node in a distributed network architecture.

Example 28 is an edge node including a first circuit including a first interface, the first circuit associated with a first domain; a second circuit including a second interface, the second circuit associated with a second domain; and a manager to generate a first authenticated interface for the first interface using a first token and to generate a second authenticated interface for the second interface using a second token to enable communication between the first authenticated interface and the second authenticated interface.

Example 29 is an edge node including a first circuit including a first authenticated interface, the first circuit associated with a first domain; a second circuit including a second authenticated interface, the second circuit associated with a second domain; and a manager to use a token to enable communication between the first authenticated interface and the second authenticated interface.

Example 30 is an IoT node including a first circuit including a first interface, the first circuit associated with a first domain; a second circuit including a second interface, the second circuit associated with a second domain; and a manager to generate a first authenticated interface for the first interface using a first token and to generate a second authenticated interface for the second interface using a second token to enable communication between the first authenticated interface and the second authenticated interface.

Example 31 is an IoT node including a first circuit including a first authenticated interface, the first circuit associated with a first domain; a second circuit including a second authenticated interface, the second circuit associated with a second domain; and a manager to use a token to enable communication between the first authenticated interface and the second authenticated interface.

Example 32 includes any of examples 1-31, included in a stationary network.

Example 33 includes any of examples 1-31, included in a mobile network.

The following claims are hereby incorporated into this Detailed Description by this reference, with each claim standing on its own as a separate embodiment of the present disclosure.

What is claimed is:

1. A computer apparatus comprising:
   a first circuit including a first circuit interface having a first set of scrambled pins, the first circuit associated with a first domain;
   a second circuit including a second circuit interface having a second set of scrambled pins, the second circuit associated with a second domain; and
   a chip manager circuit to generate a first authenticated interface from the first circuit interface using a first token, the first authenticated interface having a first set of unscrambled pins, and to generate a second authenticated interface from the second circuit interface using a second token, the second authenticated interface having a second set of unscrambled pins, to enable communication between the first authenticated interface and the second authenticated interface.

2. The computer apparatus of claim 1, wherein the computer apparatus is a system on a chip.

3. The computer apparatus of claim 1, wherein the computer apparatus is a multi-chip package.

4. The computer apparatus of claim 1, wherein at least one of the first circuit or the second circuit is a chiplet.

5. The computer apparatus of claim 1, further including a third circuit associated with the first domain, the third circuit including a third interface to communicate with the first circuit interface.

6. The computer apparatus of claim 1, wherein at least one of the first circuit or the second circuit includes a manifest including attestation rules.

7. The computer apparatus of claim 1, wherein the first circuit includes a first model and the second circuit includes a second model.

8. The computer apparatus of claim 7, wherein the first model is in a first sandbox associated with a first secure node and the second model is in a second sandbox associated with a second secure node.

9. The computer apparatus of claim 7, wherein the first model and the second model are represented as elements in a composite manifest relating the first circuit and the second circuit.

10. The computer apparatus of claim 1, wherein the first circuit includes a first function call to a first function and the second circuit includes software code defining the first function, wherein access of the first circuit to the software code is validated to dynamically provide an address to the first circuit to execute the software code defining the first function.

11. The computer apparatus of claim 10, wherein the address is dynamically resolved at a first execution of the first function call and stored in a table for a second execution.

12. The computer apparatus of claim 1, wherein the first circuit is to customize the first authenticated interface using a salt value.

13. At least one non-transitory computer readable storage medium comprising instructions to cause at least one processor circuit to at least:
  generate a first authenticated interface for a first circuit interface of a first circuit using a first token, the first circuit associated with a first domain, the first circuit interface having a first set of scrambled pins, the first authenticated interface having a first set of unscrambled pins;
  generate a second authenticated interface for a second circuit interface of a second circuit using a second token, the second circuit associated with a second domain, the second circuit interface having a second set of scrambled pins, the second authenticated interface having a second set of unscrambled pins; and
  enable communication between the first circuit and the second circuit using the first authenticated interface and the second authenticated interface to execute a first function.

14. The at least one non-transitory computer readable storage medium of claim 13, wherein the instructions, when executed, cause one or more of the at least one processor circuit to facilitate communication between the first circuit and a third circuit, the third circuit associated with the first domain, the third circuit including a third interface to communicate with the first circuit interface.

15. The at least one non-transitory computer readable storage medium of claim 13, wherein the instructions, when executed, cause one or more of the at least one-processor circuit to assemble a composite manifest including representations of the first circuit and second circuit as elements, the first circuit including a first model and the second circuit including a second model.

16. The at least one non-transitory computer readable storage medium of claim 13, wherein the first circuit includes a first function call to a first function and the second circuit includes software code defining the first function, and wherein the instructions, when executed, cause one or more of the at least one processor circuit to dynamically provide an address to execute the software code when access of the first circuit to the software code is validated.

17. The at least one non-transitory computer readable storage medium of claim 16, wherein the address is dynamically resolved at a first execution of the first function call, and wherein the instructions, when executed, cause one or more of the at least one processor circuit to store the address in a table for a second execution.

18. The at least one non-transitory computer readable storage medium of claim 13, wherein the instructions, when executed, cause one or more of the at least one processor circuit to customize the first authenticated interface using a salt value.

19. A method comprising:
  generating, by executing an instruction with at least one processor circuit, a first authenticated interface for a first interface of a first circuit using a first token to decode the first interface including a first set of scrambled pins to form the first authenticated interface including a first set of unscrambled pins, the first circuit associated with a first domain;
  generating, by executing an instruction with one or more of the at least one processor circuit, a second authenticated interface for a second interface of a second circuit using a second token to decode the second interface including a second set of scrambled pins to form the second authenticated interface including a second set of unscrambled pins, the second circuit associated with a second domain; and
  enabling communication between the first circuit and the second circuit using the first authenticated interface and the second authenticated interface to execute a first function.

20. The method of claim 19, further including assembling a composite manifest including representations of the first circuit and second circuit as elements, the first circuit including a first model and the second circuit including a second model.

21. The method of claim 19, wherein the first circuit includes a first function call to a first function and the second circuit includes software code defining the first function, and wherein the method further includes dynamically providing an address to execute the software code when access of the first circuit to the software code is validated.

22. The method of claim 19, further including customizing the first authenticated interface using a salt value.

23. An apparatus comprising:
  memory circuitry;
  computer readable instructions; and
  at least one processor circuit to be programmed by the instructions to at least:
    generate a first authenticated interface for a first interface of a first circuit using a first token, the first circuit associated with a first domain, the first interface including a first set of scrambled pins, the first authenticated interface including a first set of unscrambled pins;
    generate a second authenticated interface for a second interface of a second circuit using a second token, the second circuit associated with a second domain, the second interface including a second set of scrambled pins, the second authenticated interface including a second set of unscrambled pins; and
    enable communication between the first circuit and the second circuit using the first authenticated interface and the second authenticated interface to execute a first function.

24. An apparatus comprising:
  means for generating a first authenticated interface for a first interface of a first circuit using a first token to unscramble pins of the first interface to form the first authenticated interface and a second authenticated interface for a second interface of a second circuit using a second token to unscramble pins of the second interface to form the second authenticated interface, the first circuit associated with a first domain and the second circuit associated with a second domain; and
  means for enabling communication between the first circuit and the second circuit using the first authenticated interface and the second authenticated interface to execute a first function.

* * * * *

UNITED STATES PATENT AND TRADEMARK OFFICE
CERTIFICATE OF CORRECTION

| | | |
|---|---|---|
| PATENT NO. | : 12,153,722 B2 | Page 1 of 1 |
| APPLICATION NO. | : 17/132748 | |
| DATED | : November 26, 2024 | |
| INVENTOR(S) | : Cheruvu et al. | |

It is certified that error appears in the above-identified patent and that said Letters Patent is hereby corrected as shown below:

On the Title Page

Item [73], Insert --Intel Corporation, Santa Clara, CA (US)--

Signed and Sealed this
Seventh Day of January, 2025

Derrick Brent
*Acting Director of the United States Patent and Trademark Office*